United States Patent
Park et al.

(10) Patent No.: US 11,184,838 B2
(45) Date of Patent: Nov. 23, 2021

(54) METHOD FOR REGISTERING TERMINAL IN WIRELESS COMMUNICATION SYSTEM AND APPARATUS THEREFOR

(71) Applicant: LG ELECTRONICS INC., Seoul (KR)

(72) Inventors: Sangmin Park, Seoul (KR); Jinsook Ryu, Seoul (KR); Hyunsook Kim, Seoul (KR)

(73) Assignee: LG Electronics Inc., Seoul (KR)

(*) Notice: Subject to any disclaimer, the term of this patent is extended or adjusted under 35 U.S.C. 154(b) by 15 days.

(21) Appl. No.: 16/623,757

(22) PCT Filed: Jun. 18, 2018

(86) PCT No.: PCT/KR2018/006851
§ 371 (c)(1),
(2) Date: Dec. 17, 2019

(87) PCT Pub. No.: WO2018/231029
PCT Pub. Date: Dec. 20, 2018

(65) Prior Publication Data
US 2020/0137675 A1     Apr. 30, 2020

Related U.S. Application Data

(60) Provisional application No. 62/521,385, filed on Jun. 17, 2017.

(51) Int. Cl.
*H04W 60/00* (2009.01)
*H04W 48/16* (2009.01)
*H04W 8/08* (2009.01)
(Continued)

(52) U.S. Cl.
CPC .......... *H04W 48/16* (2013.01); *H04W 8/08* (2013.01); *H04W 60/00* (2013.01); *H04W 68/005* (2013.01); *H04W 80/10* (2013.01)

(58) Field of Classification Search
CPC ..... H04W 76/12; H04W 48/18; H04W 76/27; H04W 60/00; H04W 36/00; H04W 76/10;
(Continued)

(56) References Cited

U.S. PATENT DOCUMENTS 9,055,546 B2  6/2015  Keller et al.
9,654,964 B1  5/2017  Carames et al.
(Continued)

FOREIGN PATENT DOCUMENTS

KR  20170041036  4/2017
WO  2018141269   8/2018

OTHER PUBLICATIONS

3GPP TS 23.501 V1.0.0, dated Jun. 2017 p. 35 (Year: 2017).*
PCT International Application No. PCT/KR2018/006851, International Search Report dated Oct. 2, 2018, 3 pages.
(Continued)

*Primary Examiner* — Daniel Lai
(74) *Attorney, Agent, or Firm* — Lee, Hong, Degerman, Kang & Waimey

(57) ABSTRACT

A method for registering a terminal of an access and mobility management function (AMF) in a wireless communication system, according to one aspect of the present invention, comprises the steps of: receiving, from a terminal, a registration request message requesting registration of the terminal; and transmitting, to the terminal, a registration response message in response to the registration request message, wherein the registration request message may include: a session management (SM) message for requesting the establishment of a packet data unit (PDU) session for the terminal; and an indicator for indicating whether the establishment of the PDU session is essential.

9 Claims, 18 Drawing Sheets

(51) Int. Cl.
*H04W 68/00* (2009.01)
*H04W 80/10* (2009.01)

(58) Field of Classification Search
CPC ............ H04W 76/16; H04W 36/0011; H04W 8/02; H04W 76/19; H04W 28/12; H04W 36/08; H04W 60/005; H04W 28/06; H04W 4/90; H04W 60/06; H04W 76/18; H04W 76/34; H04W 24/02; H04W 76/50; H04W 4/20; H04W 76/20; H04W 8/00; H04W 8/06; H04W 48/16; H04W 8/08; H04W 68/005; H04W 80/10; H04L 65/1073; H04L 67/14
See application file for complete search history.

(56) References Cited

U.S. PATENT DOCUMENTS

2017/0150467 A1   5/2017   Tamura et al.
2018/0227873 A1*  8/2018   Vrzic ................... H04W 76/27
2019/0007921 A1*  1/2019   Schliwa-Bertling ................ H04W 76/25

OTHER PUBLICATIONS

3rd Generation Partnership Project (3GPP), "Technical Specification Group Services and System Aspects; Procedures for the 5G System; Stage 2 (Release 15)," 3GPP TS 23.502 V0.4.0, May 2017, 125 pages.
European Patent Office Application Serial No. 18817292.8, Search Report dated Feb. 19, 2021, 11 pages.
Nokia et al., "23.502 §4.2.2: PDU session establishment independent of Registration procedure," S2-172191, SA WG2 Meeting #120, Mar. 2017, 7 pages.
LG Electronics et al., "TS 23.502: Update of Registration procedure," S2-173607, SA WG2 Meeting #121, May 2017, 5 pages.
Huawei et al., "TS23.502: Clarifications on Registration, PDU Session Establishment procedures and Network Slicing," S2-171509, 3GPP TSG SA WG2 Meeting #119, Feb. 2017, 6 pages.

* cited by examiner

[Fig. 1]
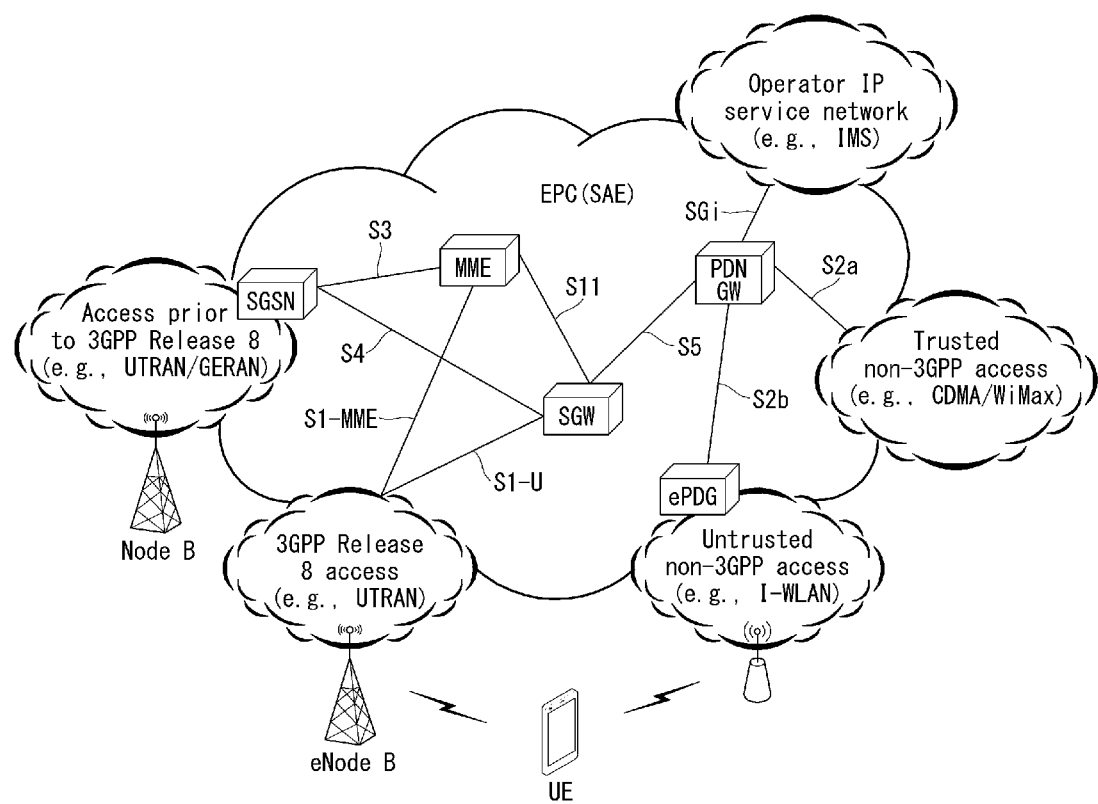

[Fig. 2]
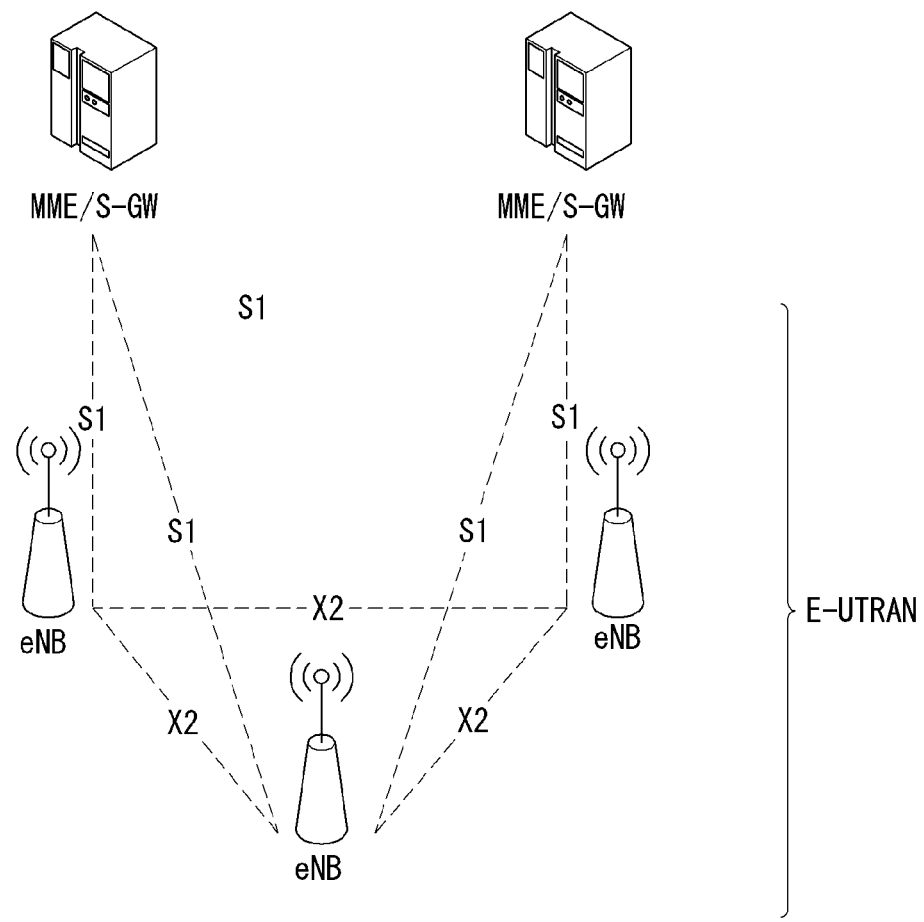

【Fig. 3】
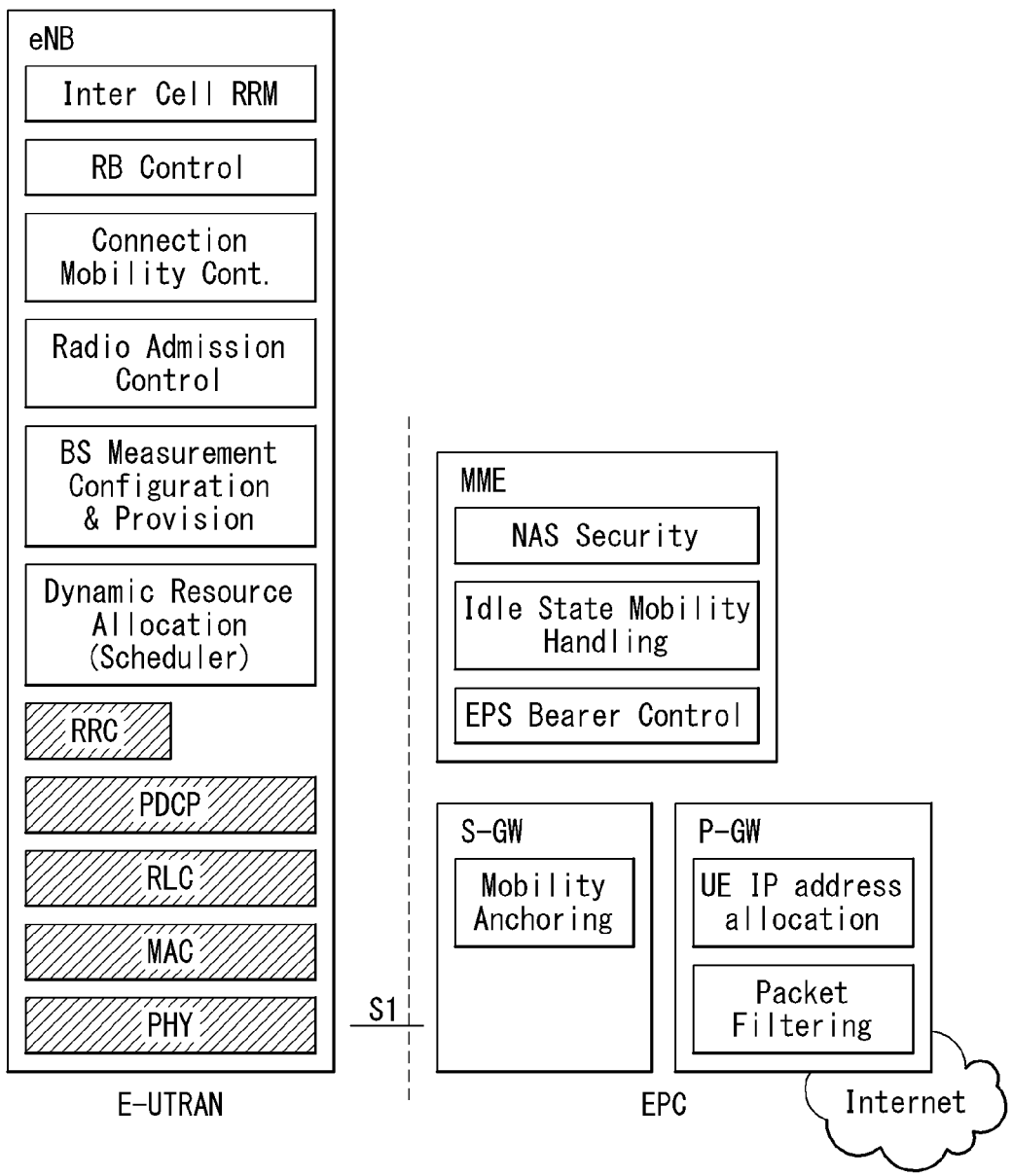

[Fig. 4]
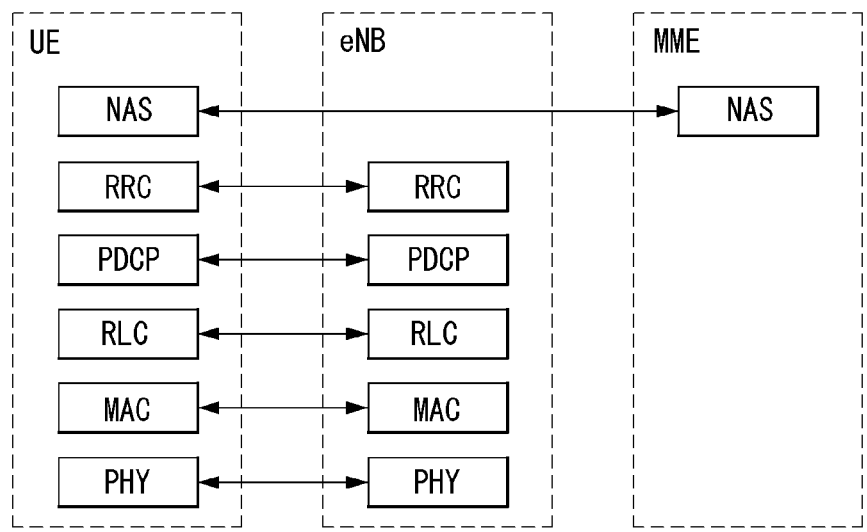
(a) Control plane protocol stack
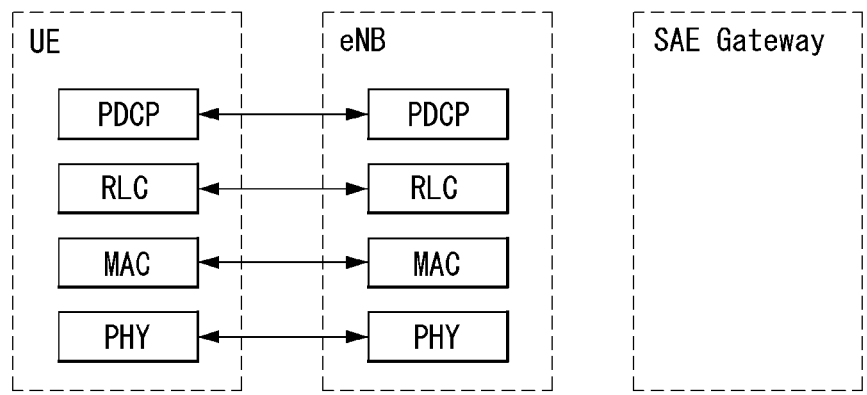
(b) User plane protocol stack

[Fig. 5]
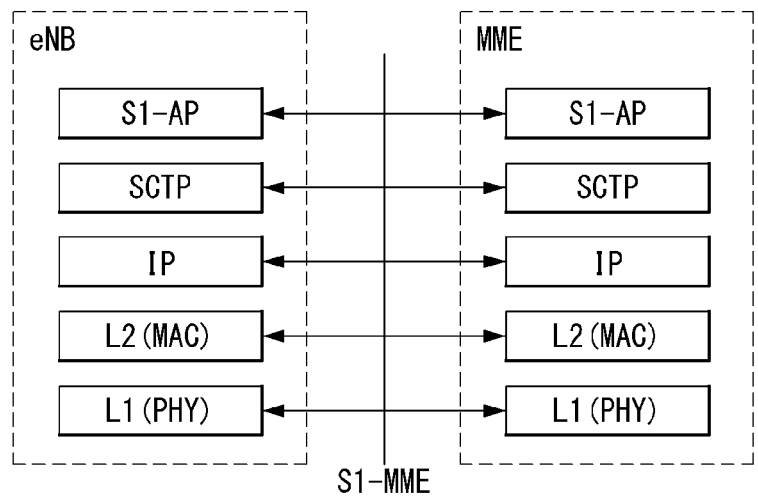
(a) Control plane protocol stack
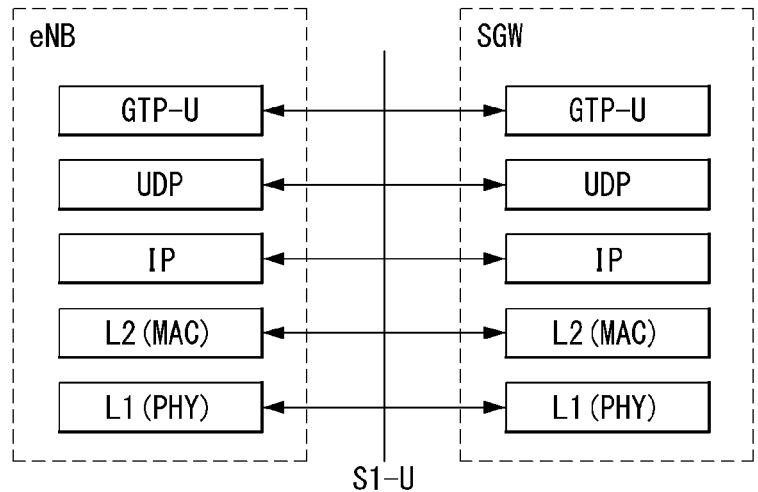
(b) User plane protocol stack

[Fig. 6]
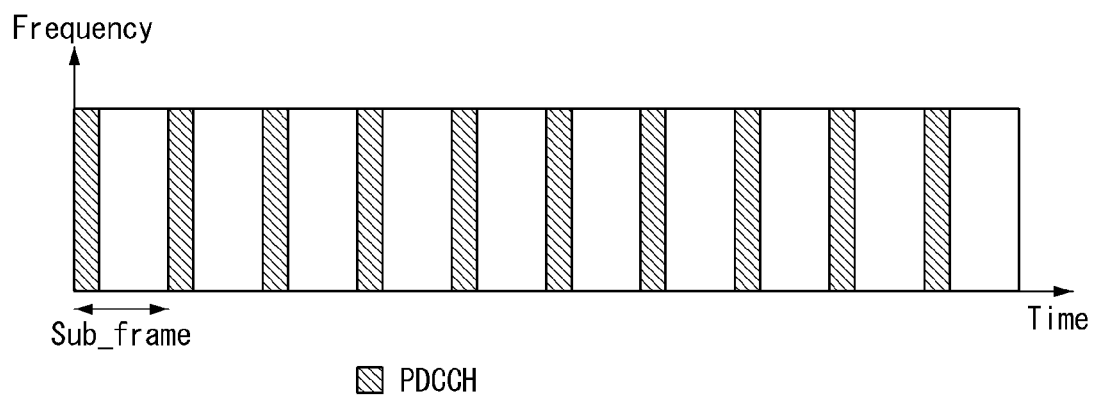
[Fig. 7]
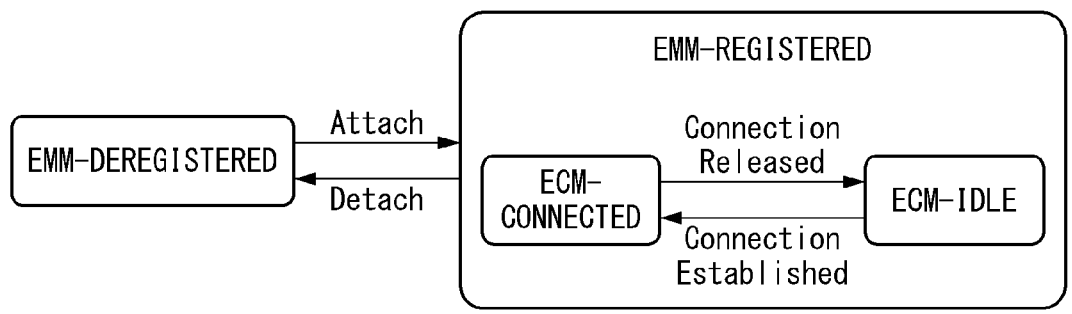

【Fig. 8】
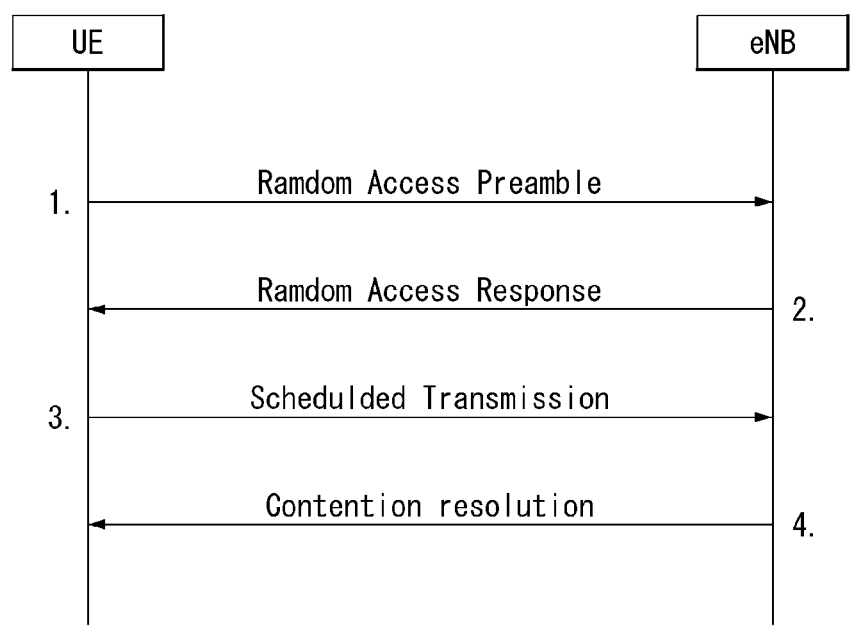

【Fig. 9】
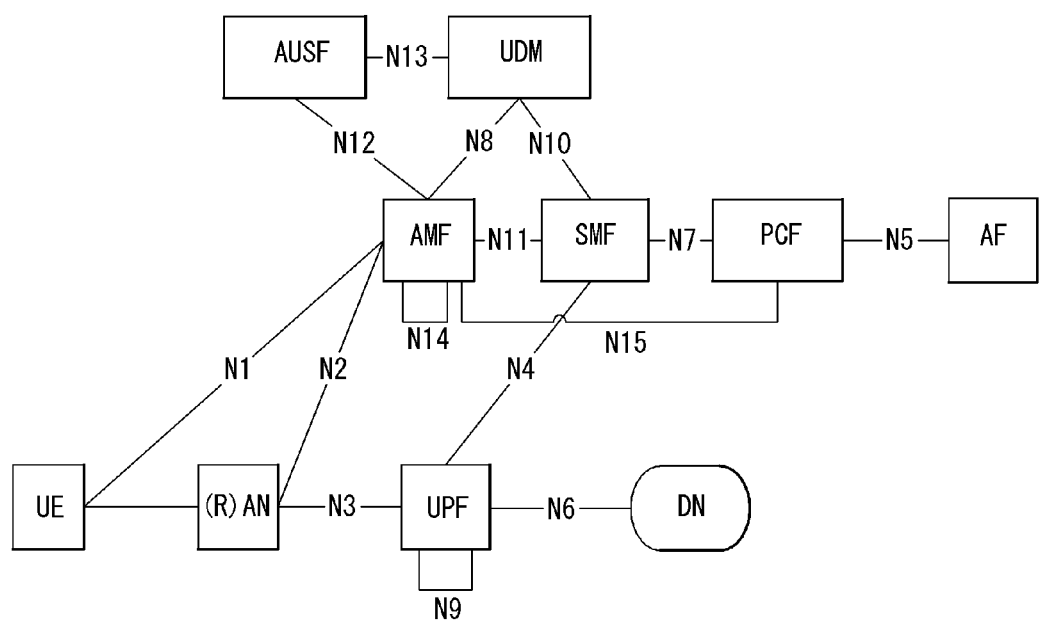

[Fig. 10]
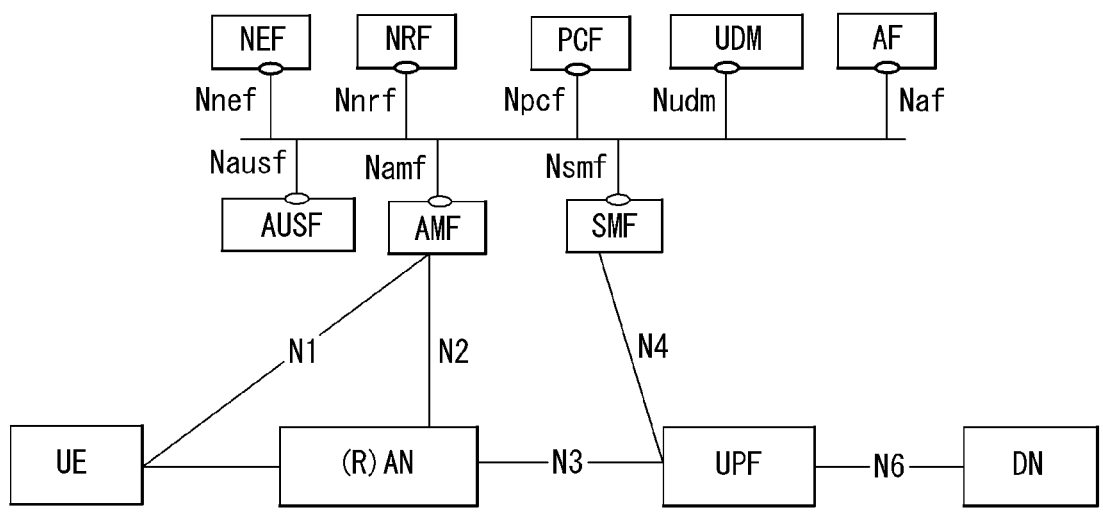

[Fig. 11]
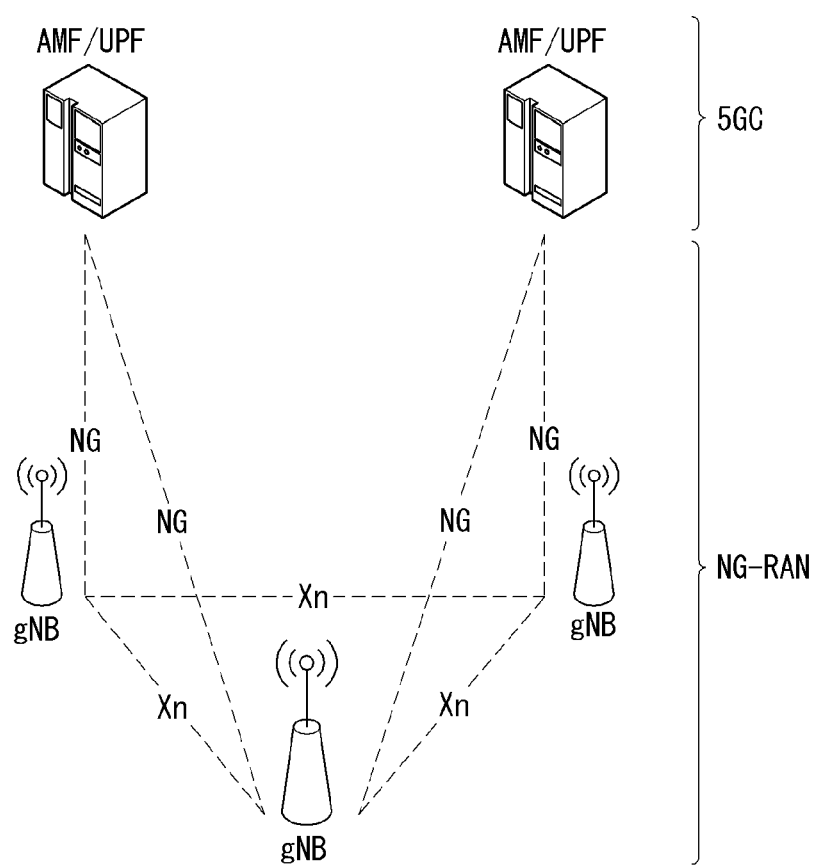

[Fig. 12]
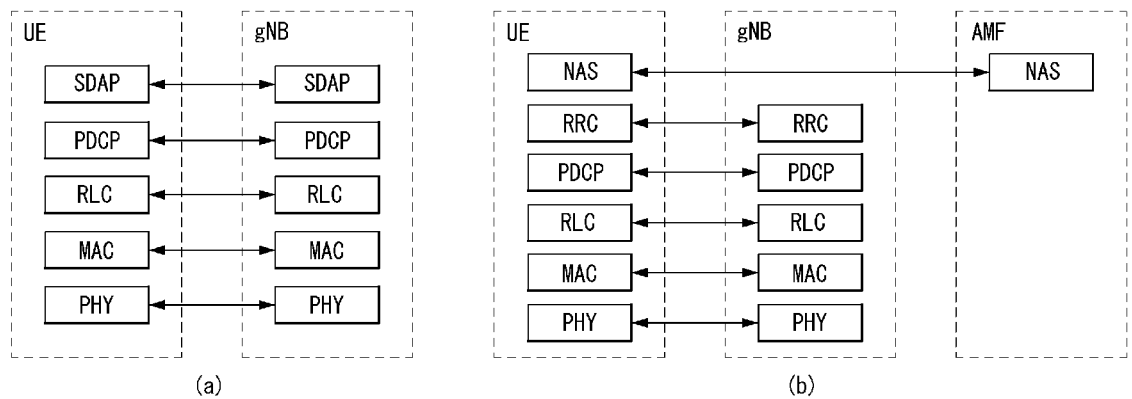
[Fig. 13]
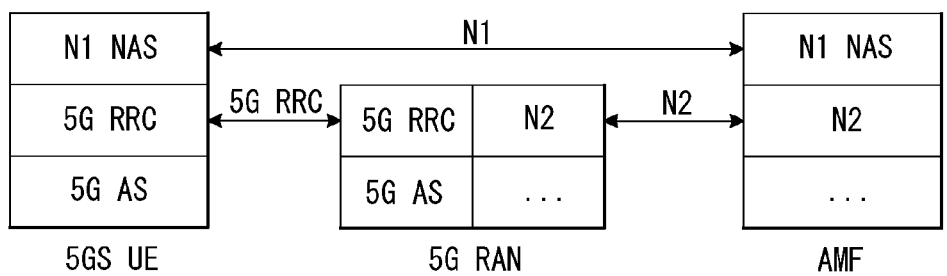

[Fig. 14]
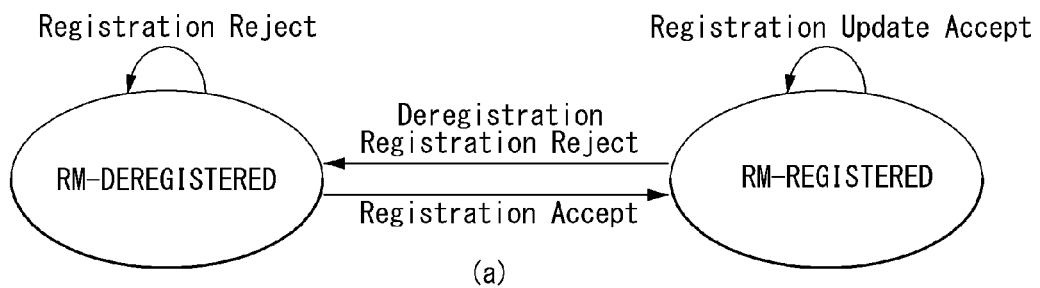
(a)
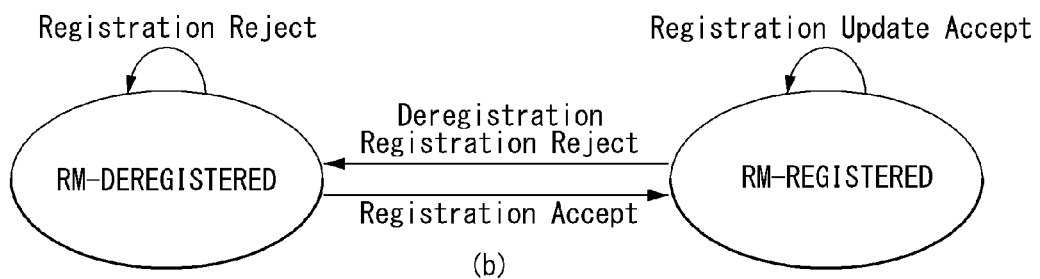
(b)

[Fig. 15]
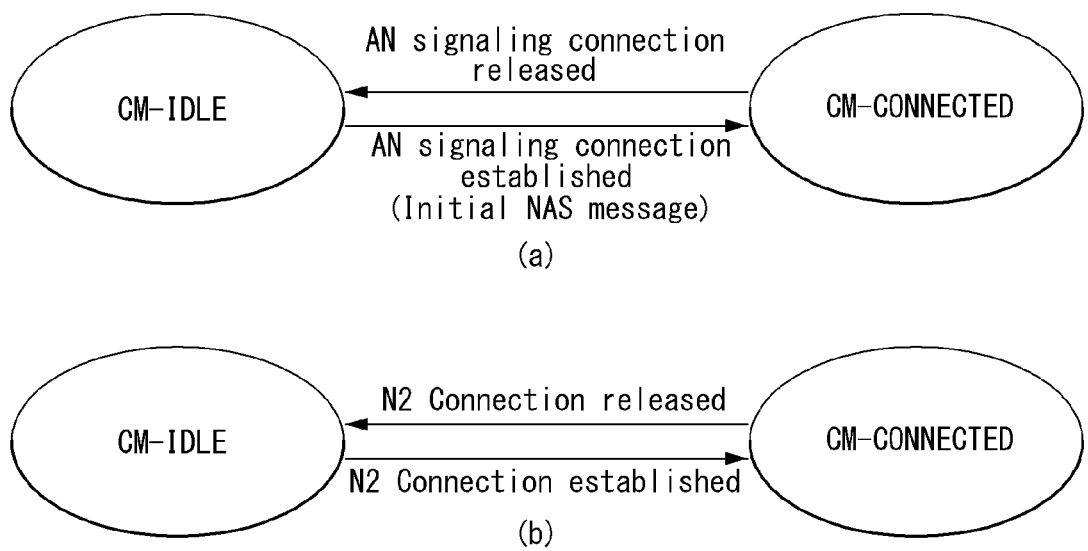

[Fig. 16]
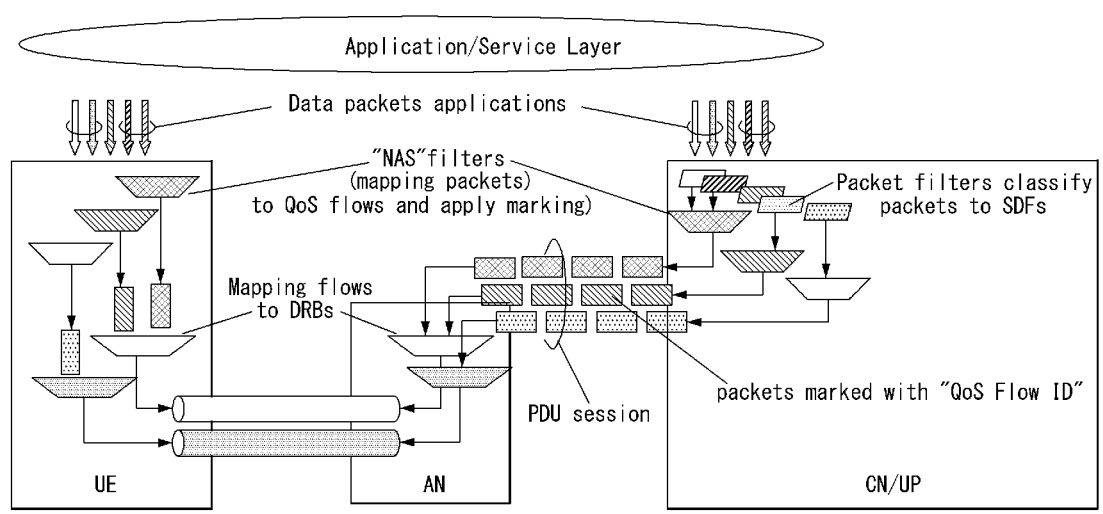

[Fig. 17]
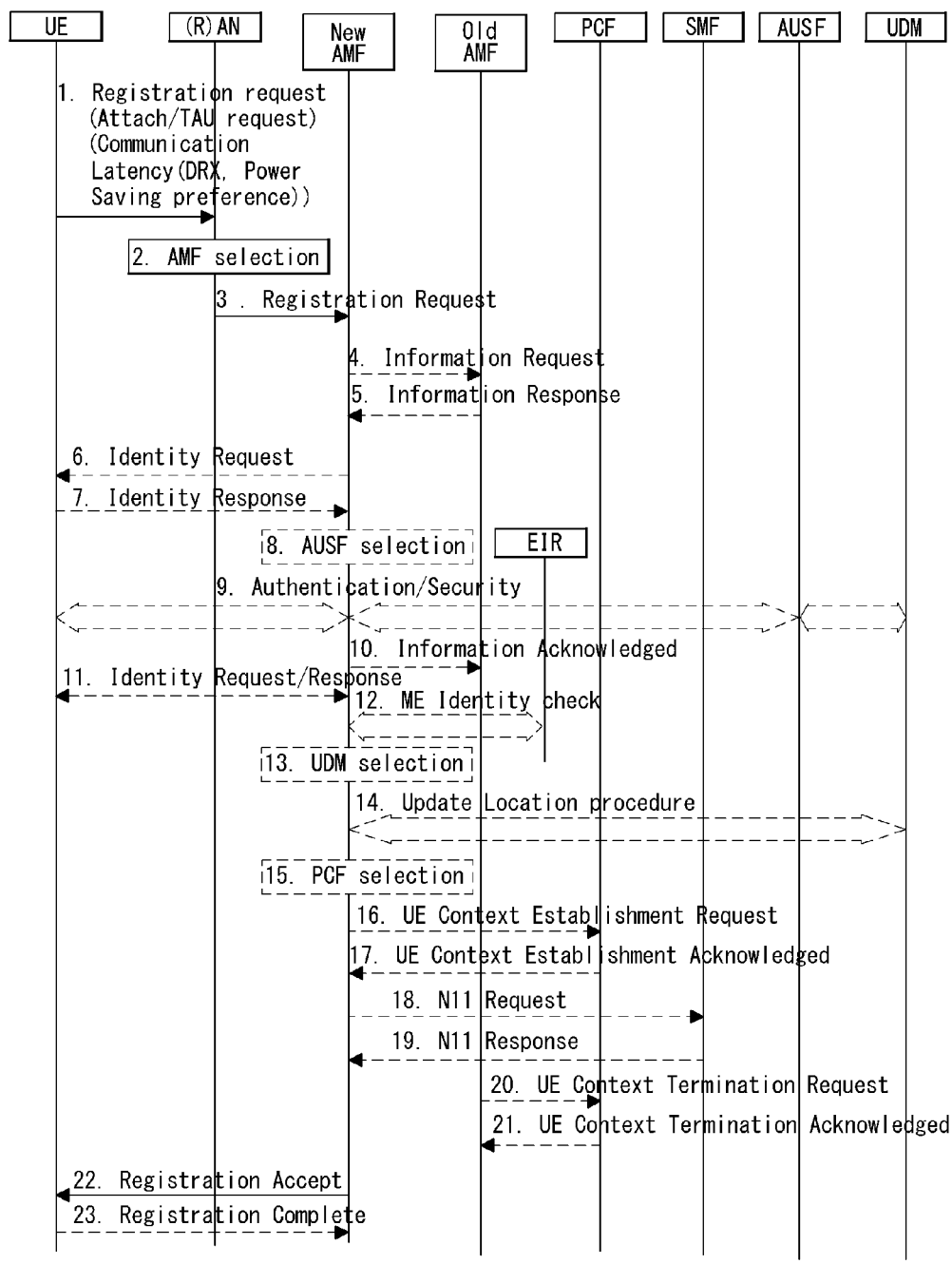

【Fig. 18】
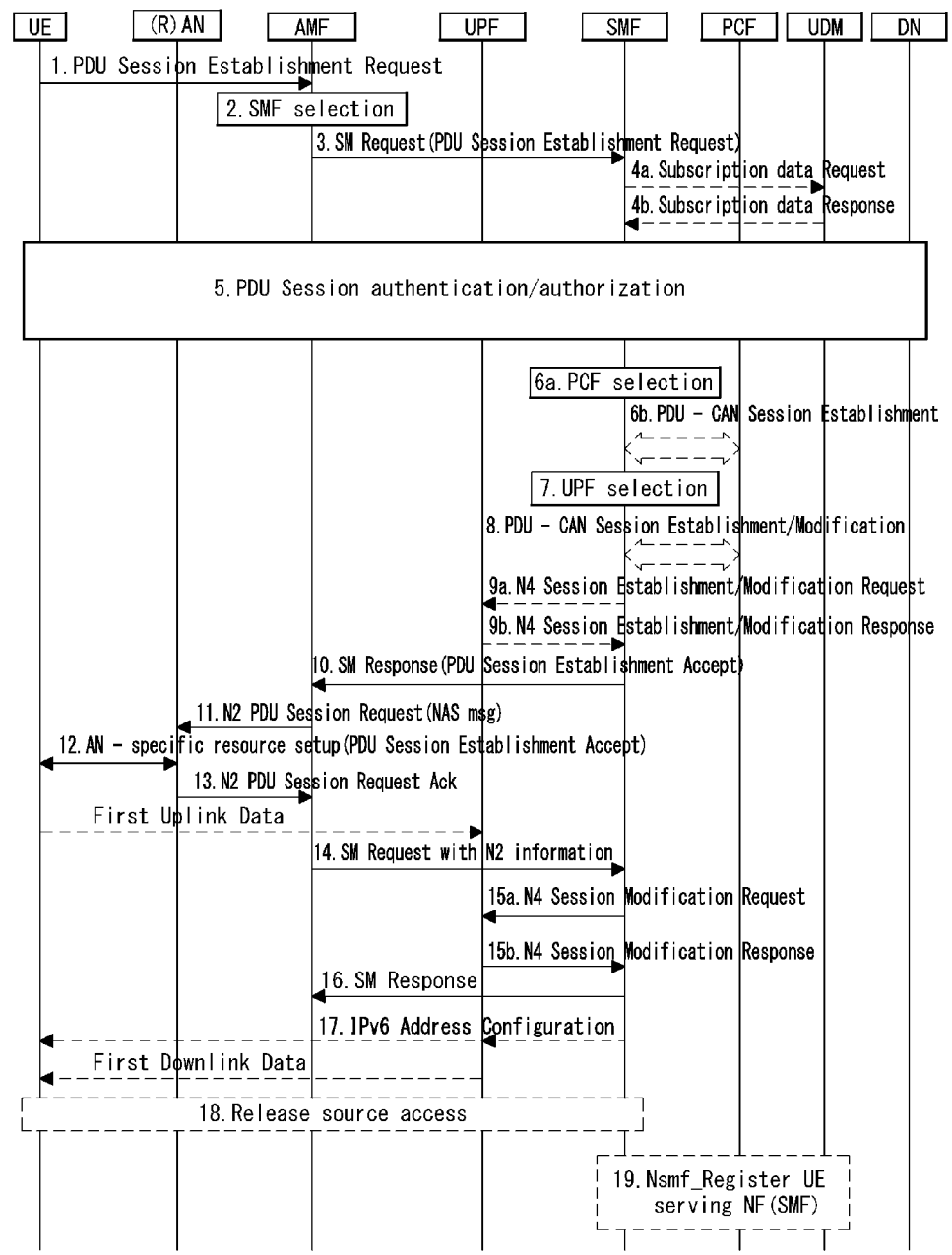

【Fig. 19】
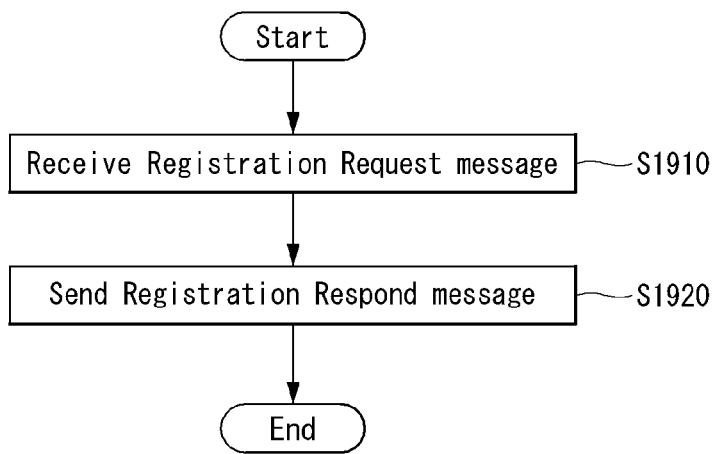
【Fig. 20】
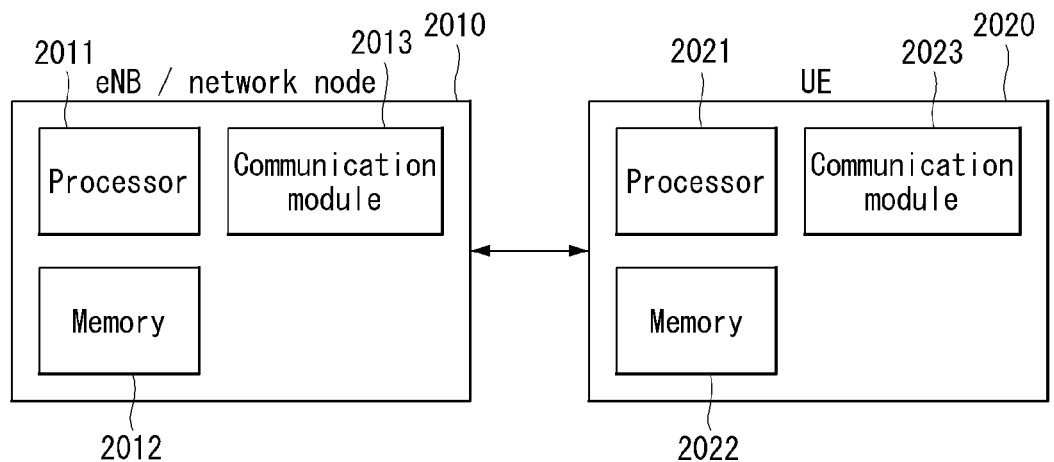

[Fig. 21]
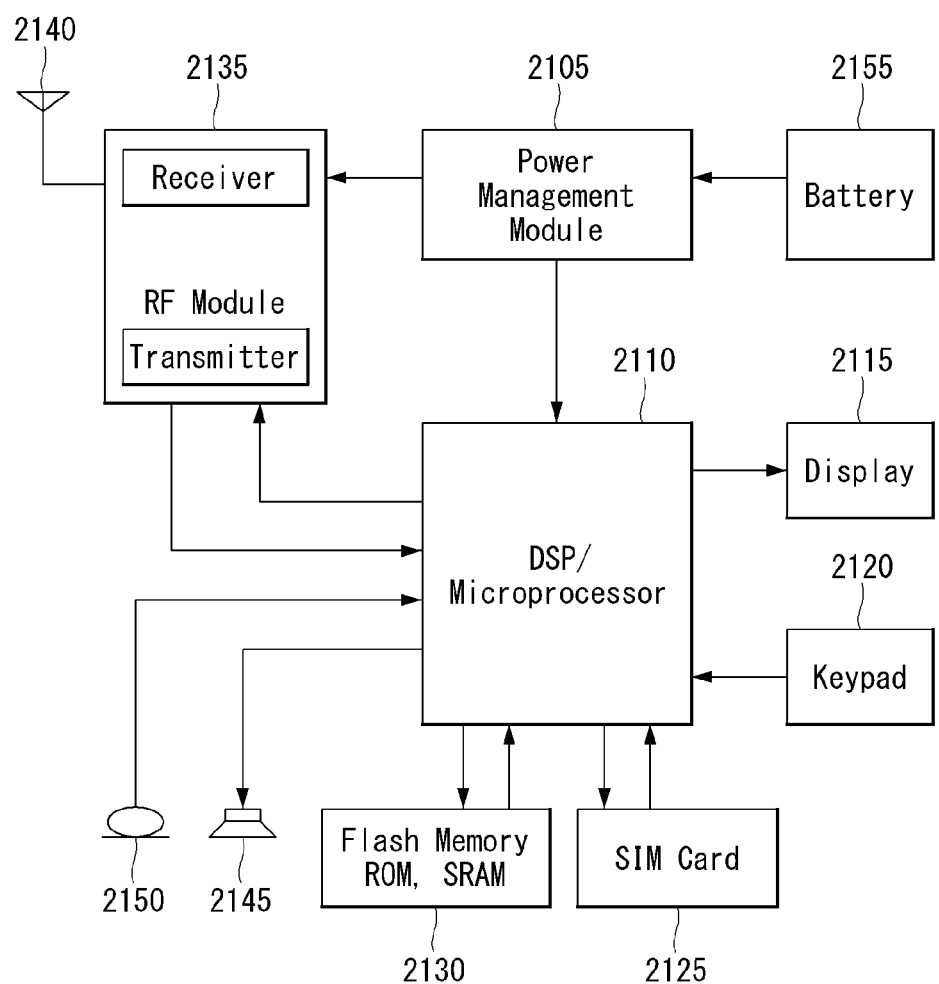

METHOD FOR REGISTERING TERMINAL IN WIRELESS COMMUNICATION SYSTEM AND APPARATUS THEREFOR

CROSS-REFERENCE TO RELATED APPLICATIONS

This application is the National Stage filing under 35 U.S.C. 371 of International Application No. PCT/KR2018/006851, filed on Jun. 18, 2018, which claims the benefit of U.S. Provisional Application No. 62/521,385, filed on Jun. 17, 2017, the contents of which are all hereby incorporated by reference herein in their entireties.

TECHNICAL FIELD

The disclosure relates to a wireless communication system, and more specifically, to a method of requesting/indicating to establish a PDU session using a UE's registration procedure and apparatus for the same.

BACKGROUND ART

A mobile communication system has been developed to provide a voice service while guaranteeing activity of a user. However, the mobile communication system extends an area up to a data service as well as a voice and at present, a short phenomenon of a resource is caused due to an explosive increase of traffic and uses require a higher-speed service, and as a result, a more developed mobile communication system is required.

Requirements of a next-generation mobile communication system largely need to support accommodation of explosive data traffic, an epochal increase of transmission rate per user, accommodation of the significantly increased number of connection devices, very low end-to-end latency, and high energy efficiency. To this end, various technologies have been researched, which include dual connectivity, massive multiple input multiple output (MIMO), in-band full duplex, non-orthogonal multiple access (NOMA), super wideband supporting, device networking, and the like.

Particularly, for the device in which power consumption significantly influences on the life of the device, various techniques for decreasing the power consumption has been vigorously developed.

DETAILED DESCRIPTION OF THE DISCLOSURE

Technical Problem

In 5G systems, RM functionality and SM functionality are separately defined. Such an occasion may arise where there is no PDU session even when the UE is in RM-registered state (i.e., decoupling between RM authorization and SM authorization). In this case, if requiring establishment of a PDU session, the UE may simply consume battery power without receiving a service function from the network.

Thus, the disclosure aims to propose an efficient registration procedure for UEs which essentially need establishment of a PDU session to address such issues.

There are proposed embodiments regarding methods and apparatuses for addressing the foregoing technical issues. Objects of the disclosure are not limited to the foregoing, and other unmentioned objects would be apparent to one of ordinary skill in the art from the following description.

Technical Solution

In an aspect of the disclosure, a method of registration of a UE by an access and mobility management function (AMF) in a wireless communication system includes receiving a registration request message for requesting to register the UE from the UE and transmitting a registration response message responsive to the registration request message to the UE, wherein the registration request message may include a session management (SM) message for requesting to establish a packet data unit (PDU) session for the UE and an indicator indicating whether the PDU session establishment is required.

Further, whether to transfer the SM message to a session management function (SMF) may be determined based on a switch of a registration management (RM) state of the UE according to the registration request message.

Further, determining whether to transfer the SM message may be transferring the SM message to the SMF when the RM state of the UE switches from RM-DEREGISTERED to RM-REGISTERED according to the registration request message and may be transferring a registration reject message, as the registration response message, rather than transferring the SM message to the SMF when the RM state of the UE remains RM-DEREGISTERED according to the registration request message.

Further, when the SM message is transferred to the SMF, transmitting the registration response message may be performed after an SM response message responsive to the SM message is received when the indicator indicates that the PDU session establishment is required and may be performed regardless of whether the SM response message is received when the indicator indicates that the PDU session establishment is not required.

Further, the SM response message may include information as to whether the PDU session establishment request is authorized and/or, when the PDU session establishment request is rejected, information regarding a cause for the rejection.

Further, when the indicator indicates that the PDU session establishment is required, a type of the registration response message may be determined based on the SM response message.

Further, when the SM response message indicates authorization of the PDU session establishment, the type of the registration response message may be determined to be a registration accept message and, when the SM response message indicates rejection of the PDU session establishment, the type of the registration response message may be determined to be a registration reject message.

Further, the indicator may be included in a request type field, user equipment (UE) network capability field, or session management (SM) payload type field in the registration request message.

In another aspect of the disclosure, an access and mobility management function (AMF) performing a UE registration method in a wireless communication system includes a communication module for transmitting or receiving a signal and a processor controlling the communication module, wherein the processor may receive a registration request message for requesting to register a UE from the UE and transmit a registration response message responsive to the registration request message to the UE, wherein the registration request message may include a session management (SM) message for requesting to establish a packet data unit (PDU) session for the UE and an indicator indicating whether the PDU session establishment is required.

Further, the processor may determine whether to transfer the SM message to a session management function (SMF) based on a switch of a registration management (RM) state of the UE according to the registration request message.

Further, the processor, upon determining whether to transfer the SM message, may transfer the SM message to the SMF when the RM state of the UE switches from RM-DEREGISTERED to RM-REGISTERED according to the registration request message and may transfer a registration reject message, as the registration response message, rather than transferring the SM message to the SMF when the RM state of the UE remains RM-DEREGISTERED according to the registration request message.

Further, when the SM message is transferred to the SMF, the processor may transmit the registration message after an SM response message responsive to the SM message is received when the indicator indicates that the PDU session establishment is required and transmit the registration message regardless of whether the SM response message is received when the indicator indicates that the PDU session establishment is not required.

Further, the SM response message may include information as to whether the PDU session establishment request is authorized and/or, when the PDU session establishment request is rejected, information regarding a cause for the rejection.

Further, when the indicator indicates that the PDU session establishment is required, a type of the registration response message may be determined based on the SM response message.

Further, when the SM response message indicates authorization of the PDU session establishment, the type of the registration response message may be determined to be a registration accept message and, when the SM response message indicates rejection of the PDU session establishment, the type of the registration response message may be determined to be a registration reject message.

Advantageous Effects

According to the embodiments of the disclosure, it is possible to establish a PDU session using a registration procedure.

Further, according to the embodiments of the disclosure, it is possible to prevent a UE requiring establishment/connection/configuration of a PDU session from being in RM-registered state where no PDU session is present.

Effects of the disclosure are not limited to the foregoing, and other unmentioned effects would be apparent to one of ordinary skill in the art from the following description.

BRIEF DESCRIPTION OF DRAWINGS

The accompanying drawings, which are included to provide a further understanding of the disclosure as a part of detailed descriptions, illustrate embodiment(s) of the disclosure and together with the descriptions, serve to explain the technical principles of the disclosure.

FIG. 1 illustrates an Evolved Packet System (EPS) to which the disclosure can be applied.

FIG. 2 illustrates one example of an Evolved Universal Terrestrial Radio Access Network (E-UTRAN) to which the disclosure can be applied.

FIG. 3 illustrates structures of an E-UTRAN and an EPC in a wireless communication system to which the disclosure may be applied.

FIG. 4 illustrates a radio interface protocol structure between a UE and an E-UTRAN in a wireless communication system to which the disclosure may be applied.

FIG. 5 illustrates an S1 interface protocol structure in a wireless communication system to which the disclosure may be applied.

FIG. 6 illustrates a physical channel structure in a wireless communication system to which the disclosure may be applied.

FIG. 7 illustrates an EMM and ECM states in a wireless communication system to which the disclosure may be applied.

FIG. 8 illustrates a contention-based random access procedure in a wireless communication system to which the disclosure may be applied.

FIG. 9 illustrates a 5G system architecture using reference point representation.

FIG. 10 illustrates a 5G system architecture using a service-based representation.

FIG. 11 illustrates an NG-RAN architecture to which the disclosure may be applied.

FIG. 12 illustrates a wireless protocol stack to which the disclosure may be applied.

FIG. 13 illustrates a protocol stack between a UE and a core network of 5G/NR system to which the disclosure is applicable.

FIG. 14 illustrates an RM state model to which the disclosure may be applied.

FIG. 15 illustrates a CM state model to which the disclosure may be applied.

FIG. 16 illustrates a classification and user plane marking for a QoS flow and a mapping of QoS flows to AN resources according to an embodiment of the disclosure.

FIG. 17 is a flow chart illustrating a registration procedure applicable to the disclosure.

FIG. 18 illustrates an example UE-requested PDU session establishment procedure for roaming and non-roaming with local breakout applicable to the disclosure.

FIG. 19 is a flowchart illustrating a UE's registration procedure according to an embodiment of the disclosure.

FIG. 20 is a block diagram illustrating a configuration of a communication device according to an embodiment of the disclosure.

FIG. 21 is a block diagram illustrating a configuration of a communication device according to an embodiment of the disclosure.

MODE FOR CARRYING OUT THE DISCLOSURE

In what follows, preferred embodiments according to the disclosure will be described in detail with reference to appended drawings. The detailed descriptions provided below together with appended drawings are intended only to explain illustrative embodiments of the disclosure, which should not be regarded as the sole embodiments of the disclosure. The detailed descriptions below include specific information to provide complete understanding of the disclosure. However, those skilled in the art will be able to comprehend that the disclosure can be embodied without the specific information.

For some cases, to avoid obscuring the technical principles of the disclosure, structures and devices well-known to the public can be omitted or can be illustrated in the form of block diagrams utilizing fundamental functions of the structures and the devices.

A base station in this document is regarded as a terminal node of a network, which performs communication directly with a UE. In this document, particular operations regarded to be performed by the base station may be performed by a upper node of the base station depending on situations. In other words, it is apparent that in a network consisting of a plurality of network nodes including a base station, various operations performed for communication with a UE can be performed by the base station or by network nodes other than the base station. The term Base Station (BS) can be replaced with a fixed station, Node B, evolved-NodeB (eNB), Base Transceiver System (BTS), or Access Point (AP). Also, a terminal can be fixed or mobile; and the term can be replaced with User Equipment (UE), Mobile Station (MS), User Terminal (UT), Mobile Subscriber Station (MSS), Subscriber Station (SS), Advanced Mobile Station (AMS), Wireless Terminal (WT), Machine-Type Communication (MTC) device, Machine-to-Machine (M2M) device, or Device-to-Device (D2D) device.

In what follows, downlink (DL) refers to communication from a base station to a terminal, while uplink (UL) refers to communication from a terminal to a base station. In downlink transmission, a transmitter can be part of the base station, and a receiver can be part of the terminal. Similarly, in uplink transmission, a transmitter can be part of the terminal, and a receiver can be part of the base station.

Specific terms used in the following descriptions are introduced to help understanding the disclosure, and the specific terms can be used in different ways as long as it does not leave the technical scope of the disclosure.

The technology described below can be used for various types of wireless access systems based on Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), or Non-Orthogonal Multiple Access (NOMA). CDMA can be implemented by such radio technology as Universal Terrestrial Radio Access (UTRA) or CDMA2000. TDMA can be implemented by such radio technology as Global System for Mobile communications (GSM), General Packet Radio Service (GPRS), or Enhanced Data rates for GSM Evolution (EDGE). OFDMA can be implemented by such radio technology as the IEEE 802.11 (WI-FI), the IEEE 802.16 Worldwide Interoperability for Microwave Access (WIMAX), the IEEE 802-20, or Evolved UTRA (E-UTRA). UTRA is part of the Universal Mobile Telecommunications System (UMTS). The 3rd Generation Partnership Project (3GPP) Long Term Evolution (LTE) is part of the Evolved UMTS (E-UMTS) which uses the E-UTRA, employing OFDMA for downlink and SC-FDMA for uplink transmission. The LTE-A (Advanced) is an evolved version of the 3GPP LTE system.

Embodiments of the disclosure can be supported by standard documents disclosed in at least one of wireless access systems including the IEEE 802, 3GPP, and 3GPP2 specifications. In other words, among the embodiments of the disclosure, those steps or parts omitted for the purpose of clearly describing technical principles of the disclosure can be supported by the documents above. Also, all of the terms disclosed in this document can be explained with reference to the standard documents.

To clarify the descriptions, this document is based on the 3GPP LTE/LTE-A, but the technical features of the disclosure are not limited to the current descriptions.

Terms used in this document are defined as follows.

Universal Mobile Telecommunication System (UMTS): the 3rd generation mobile communication technology based on GSM, developed by the 3GPP Evolved Packet System (EPS): a network system comprising an Evolved Packet Core (EPC), a packet switched core network based on the Internet Protocol (IP) and an access network such as the LTE and UTRAN. The EPS is a network evolved from the UMTS.

NodeB: the base station of the UMTS network. NodeB is installed outside and provides coverage of a macro cell.

eNodeB: the base station of the EPS network. eNodeB is installed outside and provides coverage of a macro cell.

Home NodeB: It is installed indoors as a based station, and the coverage is a micro cell scale.

Home eNodeB: It is installed indoors as a base station of the EPS network, and the coverage is a micro cell scale.

User Equipment (UE): A UE can be called a terminal, Mobile Equipment (ME), or Mobile Station (MS). A UE can be a portable device such as a notebook computer, mobile phone, Personal Digital Assistant (PDA), smart phone, or a multimedia device; or a fixed device such as a Personal Computer (PC) or vehicle-mounted device. The term UE may refer to an MTC terminal in the description related to MTC.

IP Multimedia Subsystem (IMS): a sub-system providing multimedia services based on the IP International Mobile Subscriber Identity (IMSI): a globally unique subscriber identifier assigned in a mobile communication network Machine Type Communication (MTC): communication performed by machines without human intervention. It may be called Machine-to-Machine (M2M) communication.

MTC terminal (MTC UE or MTC device or MRT apparatus): a terminal (e.g., a vending machine, meter, and so on) equipped with a communication function (e.g., communication with an MTC server through PLMN) operating through a mobile communication network and performing the MTC functions.

MTC server: a server on a network managing MTC terminals. It can be installed inside or outside a mobile communication network. It can provide an interface through which an MTC user can access the server. Also, an MTC server can provide MTC-related services to other servers (in the form of Services Capability Server (SCS)) or the MTC server itself can be an MTC Application Server.

(MTC) application: services (to which MTC is applied) (for example, remote metering, traffic movement tracking, weather observation sensors, and so on)

(MTC) Application Server: a server on a network in which (MTC) applications are performed MTC feature: a function of a network to support MTC applications. For example, MTC monitoring is a feature intended to prepare for loss of a device in an MTC application such as remote metering, and low mobility is a feature intended for an MTC application with respect to an MTC terminal such as a vending machine.

MTC user: an MTC user uses a service provided by an MTC server.

MTC subscriber: an entity having a connection relationship with a network operator and providing services to one or more MTC terminals.

MTC group: an MTC group shares at least one or more MTC features and denotes a group of MTC terminals belonging to MTC subscribers.

Services Capability Server (SCS): an entity being connected to the 3GPP network and used for communicating with an MTC InterWorking Function (MTC-IWF) on a Home PLMN (HPLMN) and an MTC terminal. The SCS provides the capability for a use by one or more MTC applications.

External identifier: a globally unique identifier used by an external entity (for example, an SCS or an Application Server) of the 3GPP network to indicate (or identify) an MTC terminal (or a subscriber to which the MTC terminal belongs). An external identifier comprises a domain identifier and a local identifier as described below.

Domain identifier: an identifier used for identifying a domain in the control region of a mobile communication network service provider. A service provider can use a separate domain identifier for each service to provide an access to a different service.

Local identifier: an identifier used for deriving or obtaining an International Mobile Subscriber Identity (IMSI). A local identifier should be unique within an application domain and is managed by a mobile communication network service provider.

Radio Access Network (RAN): a unit including a Node B, a Radio Network Controller (RNC) controlling the Node B, and an eNodeB in the 3GPP network. The RAN is defined at the terminal level and provides a connection to a core network.

Home Location Register (HLR)/Home Subscriber Server (HSS): a database provisioning subscriber information within the 3GPP network. An HSS can perform functions of configuration storage, identity management, user state storage, and so on.

RAN Application Part (RANAP): an interface between the RAN and a node in charge of controlling a core network (in other words, a Mobility Management Entity (MME)/Serving GPRS (General Packet Radio Service) Supporting Node (SGSN)/Mobile Switching Center (MSC)).

Public Land Mobile Network (PLMN): a network formed to provide mobile communication services to individuals. The PLMN can be formed separately for each operator.

Non-Access Stratum (NAS): a functional layer for exchanging signals and traffic messages between a terminal and a core network at the UMTS and EPS protocol stack. The NAS is used primarily for supporting mobility of a terminal and a session management procedure for establishing and maintaining an IP connection between the terminal and a PDN GW.

Service Capability Exposure Function (SCEF): an entity in 3GPP architecture for the service capability exposure that provides a means for safely exposing a service and a capability provided by 3GPP network interface.

MME (Mobility Management Entity): A network node in an EPS network, which performs mobility management and session management functions PDN-GW (Packet Data Network Gateway): A network node in the EPS network, which performs UE IP address allocation, packet screening and filtering, and charging data collection functions.

Serving GW (Serving Gateway): A network node in the EPS network, which performs functions such as mobility anchor, packet routing, idle mode packet buffering, and triggering paging for the ME of MME Policy and Charging Rule Function (PCRF): A node in the EPS network, which performs policy decision to dynamically apply differentiated QoS and billing policies for each service flow Open Mobile Alliance Device Management (OMA DM): A protocol designed to manage mobile devices such as mobile phones, PDAs, and portable computers, which performs such functions as device configuration, firmware upgrade, and error report Operation Administration and Maintenance (OAM): A network management function group which provides network fault indication, performance information, and data and diagnostic functions NAS configuration MO (Management Object): A Management Object (MO) used to configure the UE with the parameters associated with the NAS functionality.

PDN (Packet Data Network): A network in which a server supporting a specific service (e.g., MMS server, WAP server, etc.) is located.

PDN connection: A connection from the UE to the PDN, that is, the association (connection) between the UE represented by the IP address and the PDN represented by the APN.

APN (Access Point Name): A string that refers to or identifies the PDN. It is a name (string) (e.g., internet.mnc012.mcc345.gprs) predefined in the network when the P-GW is accessed to access the requested service or network (PDN).

Home Location Register (HLR)/Home Subscriber Server (HSS): A database (DB) that represents subscriber information in the 3GPP network.

NAS (Non-Access-Stratum): The upper stratum of the control plane between the UE and the MME. It supports mobility management, session management and IP address maintenance between the UE and the network.

AS (Access-Stratum): It includes the protocol stack between the UE and the radio (or access) network and is responsible for transmitting data and network control signals.

In what follows, the disclosure will be described based on the terms defined above.

Overview of System to which the Disclosure can be Applied

FIG. 1 illustrates an Evolved Packet System (EPS) to which the disclosure can be applied.

The network structure of FIG. 1 is a simplified diagram restructured from an Evolved Packet System (EPS) including Evolved Packet Core (EPC).

The EPC is a main component of the System Architecture Evolution (SAE) intended for improving performance of the 3GPP technologies. SAE is a research project for determining a network structure supporting mobility between multiple heterogeneous networks. For example, SAE is intended to provide an optimized packet-based system which supports various IP-based wireless access technologies, provides much more improved data transmission capability, and so on.

More specifically, the EPC is the core network of an IP-based mobile communication system for the 3GPP LTE system and capable of supporting packet-based real-time and non-real time services. In the existing mobile communication systems (namely, in the 2nd or 3rd mobile communication system), functions of the core network have been implemented through two separate sub-domains: a Circuit-Switched (CS) sub-domain for voice and a Packet-Switched (PS) sub-domain for data. However, in the 3GPP LTE system, an evolution from the 3rd mobile communication system, the CS and PS sub-domains have been unified into a single IP domain. In other words, in the 3GPP LTE system, connection between UEs having IP capabilities can be established through an IP-based base station (for example, eNodeB), EPC, and application domain (for example, IMS). In other words, the EPC provides the architecture essential for implementing end-to-end IP services.

The EPC comprises various components, where FIG. 1 illustrates part of the EPC components, including a Serving Gateway (SGW or S-GW), Packet Data Network Gateway (PDN GW or PGW or P-GW), Mobility Management Entity (MME), Serving GPRS Supporting Node (SGSN), and enhanced Packet Data Gateway (ePDG).

The SGW operates as a boundary point between the Radio Access Network (RAN) and the core network and maintains a data path between the eNodeB and the PDN GW. Also, in case the UE moves across serving areas by the eNodeB, the SGW acts as an anchor point for local mobility. In other words, packets can be routed through the SGW to ensure mobility within the E-UTRAN (Evolved-UMTS (Universal Mobile Telecommunications System) Terrestrial Radio Access Network defined for the subsequent versions of the 3GPP release 8). Also, the SGW may act as an anchor point for mobility between the E-UTRAN and other 3GPP networks (the RAN defined before the 3GPP release 8, for example, UTRAN or GERAN (GSM (Global System for Mobile Communication)/EDGE (Enhanced Data rates for Global Evolution) Radio Access Network).

The PDN GW corresponds to a termination point of a data interface to a packet data network. The PDN GW can support policy enforcement features, packet filtering, charging support, and so on. Also, the PDN GW can act as an anchor point for mobility management between the 3GPP network and non-3GPP networks (for example, an unreliable network such as the Interworking Wireless Local Area Network (I-WLAN) or reliable networks such as the Code Division Multiple Access (CDMA) network and WIMAX.

In the example of a network structure as shown in FIG. 1, the SGW and the PDN GW are treated as separate gateways; however, the two gateways can be implemented according to single gateway configuration option.

The MME performs signaling for the UE's access to the network, supporting allocation, tracking, paging, roaming, handover of network resources, and so on; and control functions. The MME controls control plane functions related to subscribers and session management. The MME manages a plurality of eNodeBs and performs signaling of the conventional gateway's selection for handover to other 2G/3G networks. Also, the MME performs such functions as security procedures, terminal-to-network session handling, idle terminal location management, and so on.

The SGSN deals with all kinds of packet data including the packet data for mobility management and authentication of the user with respect to other 3GPP networks (for example, the GPRS network).

The ePDG acts as a security node with respect to an unreliable, non-3GPP network (for example, I-WLAN, WiFi hotspot, and so on).

As described with respect to FIG. 1, a UE with the IP capability can access the IP service network (for example, the IMS) that a service provider (namely, an operator) provides, via various components within the EPC based not only on the 3GPP access but also on the non-3GPP access.

Also, FIG. 1 illustrates various reference points (for example, S1-U, S1-MME, and so on). The 3GPP system defines a reference point as a conceptual link which connects two functions defined in disparate functional entities of the E-UTAN and the EPC. Table 1 below summarizes reference points shown in FIG. 1. In addition to the examples of FIG. 1, various other reference points can be defined according to network structures.

TABLE 1

| Reference point | Description |
| --- | --- |
| S1-MME | Reference point for the control plane protocol between E-UTRAN and MME |
| S1-U | Reference point between E-UTRAN and Serving GW for the per bearer user plane tunneling and inter eNodeB path switching during handover |
| S3 | It enables user and bearer information exchange for inter 3GPP access network mobility in idle and/or active state. This reference point can be used intra-PLMN or inter-PLMN (e.g. in the case of Inter-PLMN HO). |
| S4 | It provides related control and mobility support between GPRS core and the 3GPP anchor function of Serving GW. In addition, if direct tunnel is not established, it provides the user plane tunneling. |
| S5 | It provides user plane tunneling and tunnel management between Serving GW and PDN GW. It is used for Serving GW relocation due to UE mobility if the Serving GW needs to connect to a non-collocated PDN GW for the required PDN connectivity. |
| S11 | Reference point for the control plane protocol between MME and SGW |
| SGi | It is the reference point between the PDN GW and the packet data network. Packet data network may be an operator external public or private packet data network or an intra-operator packet data network (e.g., for provision of IMS services). This reference point corresponds to Gi for 3 GPP accesses. |

Among the reference points shown in FIG. 1, S2a and S2b corresponds to non-3GPP interfaces. S2a is a reference point which provides reliable, non-3GPP access, related control between PDN GWs, and mobility resources to the user plane. S2b is a reference point which provides related control and mobility resources to the user plane between ePDG and PDN GW.

FIG. 2 illustrates one example of an Evolved Universal Terrestrial Radio Access Network (E-UTRAN) to which the disclosure can be applied.

The E-UTRAN system has evolved from an existing UTRAN system and may be the 3GPP LTE/LTE-A system, for example. A communication system is disposed over a wide area to provide various communication services including voice communication through IMS and packet data (for example, VoIP (Voice over Internet Protocol)).

Referring to FIG. 2, an E-UMTS network comprises an E-UTRAN, EPC, and one or more UEs. The E-UTRAN comprises eNBs providing a UE with a control plane and user plane protocols, where the eNBs are connected to each other through X2 interface.

The X2 user plane interface (X2-U) is defined among the eNBs. The X2-U interface provides non-guaranteed delivery of the user plane Packet Data Unit (PDU). The X2 control plane interface (X2-CP) is defined between two neighboring eNBs. The X2-CP performs the functions of context delivery between eNBs, control of user plane tunnel between a source eNB and a target eNB, delivery of handover-related messages, uplink load management, and so on.

The eNB is connected to the UE through a radio interface and is connected to the Evolved Packet Core (EPC) through the S1 interface.

The S1 user plane interface (S1-U) is defined between the eNB and the Serving Gateway (S-GW). The S1 control plane interface (S1-MME) is defined between the eNB and the Mobility Management Entity (MME). The S1 interface performs the functions of EPS bearer service management, NAS signaling transport, network sharing, MME load balancing management, and so on. The S1 interface supports many-to-many-relation between the eNB and the MME/S-GW.

An MME is capable of performing various functions such as NAS signaling security, AS (Access Stratum) security control, inter-CN (Core Network) signaling for supporting mobility among 3GPP access networks, IDLE mode UE reachability (including performing and controlling retransmission of a paging message), TAI (Tracking Area Identity) management (for IDLE and active mode UEs), PDN GW and SGW selection, MME selection for handover in which MMEs are changed, SGSN selection for handover to a 2G or 3G 3GPP access network, roaming, authentication, bearer management function including dedicated bearer establishment, and support for transmission of a PWS (Public Warning System) (including Earthquake and Tsunami Warning System (ETWS) and Commercial Mobile Alert System (CMAS)) message.

FIG. 3 illustrates structures of an E-UTRAN and an EPC in a wireless communication system to which the disclosure may be applied.

Referring to FIG. 3, an eNB is capable of performing functions such as selection of a gateway (for example, MME), routing to a gateway during RRC (Radio Resource Control) activation, scheduling and transmission of a BCH (Broadcast Channel), dynamic resource allocation for a UE in uplink and downlink transmission, and mobility control connection in an LTE ACTIVE state. As described above, a gateway belonging to an EPC is capable of performing functions such as paging origination, LTE IDLE state management, ciphering of a user plane, SAE (System Architecture Evolution) bearer control, and ciphering of NAS signaling and integrity protection.

FIG. 4 illustrates a radio interface protocol structure between a UE and an E-UTRAN in a wireless communication system to which the disclosure can be applied.

FIG. 4(a) illustrates a radio protocol structure for the control plane, and FIG. 4(b) illustrates a radio protocol structure for the user plane.

With reference to FIG. 4, layers of the radio interface protocol between the UE and the E-UTRAN can be divided into a first layer (L1), a second layer (L2), and a third layer (L3) based on the lower three layers of the Open System Interconnection (OSI) model, widely known in the technical field of communication systems. The radio interface protocol between the UE and the E-UTRAN consists of the physical layer, data link layer, and network layer in the horizontal direction, while in the vertical direction, the radio interface protocol consists of the user plane, which is a protocol stack for delivery of data information, and the control plane, which is a protocol stack for delivery of control signals.

The control plane acts as a path through which control messages used for the UE and the network to manage calls are transmitted. The user plane refers to the path through which the data generated in the application layer, for example, voice data, Internet packet data, and so on are transmitted. In what follows, described will be each layer of the control and the user plane of the radio protocol.

The physical layer (PHY), which is the first layer (L1), provides information transfer service to upper layers by using a physical channel. The physical layer is connected to the Medium Access Control (MAC) layer located at the upper level through a transport channel through which data are transmitted between the MAC layer and the physical layer. Transport channels are classified according to how and with which features data are transmitted through the radio interface. And data are transmitted through the physical channel between different physical layers and between the physical layer of a transmitter and the physical layer of a receiver. The physical layer is modulated according to the Orthogonal Frequency Division Multiplexing (OFDM) scheme and employs time and frequency as radio resources.

A few physical control channels are used in the physical layer. The Physical Downlink Control Channel (PDCCH) informs the UE of resource allocation of the Paging Channel (PCH) and the Downlink Shared Channel (DL-SCH); and Hybrid Automatic Repeat reQuest (HARQ) information related to the Uplink Shared Channel (UL-SCH). Also, the PDCCH can carry a UL grant used for informing the UE of resource allocation of uplink transmission. The Physical Control Format Indicator Channel (PCFICH) informs the UE of the number of OFDM symbols used by PDCCHs and is transmitted at each subframe. The Physical HARQ Indicator Channel (PHICH) carries a HARQ ACK (ACKnowledge)/NACK (Non-ACKnowledge) signal in response to uplink transmission. The Physical Uplink Control Channel (PUCCH) carries uplink control information such as HARQ ACK/NACK with respect to downlink transmission, scheduling request, Channel Quality Indicator (CQI), and so on. The Physical Uplink Shared Channel (PUSCH) carries the UL-SCH.

The MAC layer of the second layer (L2) provides a service to the Radio Link Control (RLC) layer, which is an upper layer thereof, through a logical channel. Also, the MAC layer provides a function of mapping between a logical channel and a transport channel; and multiplexing/demultiplexing a MAC Service Data Unit (SDU) belonging to the logical channel to the transport block, which is provided to a physical channel on the transport channel.

The RLC layer of the second layer (L2) supports reliable data transmission. The function of the RLC layer includes concatenation, segmentation, reassembly of the RLC SDU, and so on. To satisfy varying Quality of Service (QoS) requested by a Radio Bearer (RB), the RLC layer provides three operation modes: Transparent Mode (TM), Unacknowledged Mode (UM), and Acknowledge Mode (AM). The AM RLC provides error correction through Automatic Repeat reQuest (ARQ). Meanwhile, in case the MAC layer performs the RLC function, the RLC layer can be incorporated into the MAC layer as a functional block.

The Packet Data Convergence Protocol (PDCP) layer of the second layer (L2) performs the function of delivering, header compression, ciphering of user data in the user plane, and so on. Header compression refers to the function of reducing the size of the Internet Protocol (IP) packet header which is relatively large and includes unnecessary control to efficiently transmit IP packets such as the IPv4 (Internet Protocol version 4) or IPv6 (Internet Protocol version 6) packets through a radio interface with narrow bandwidth. The function of the PDCP layer in the control plane includes delivering control plane data and ciphering/integrity protection.

The Radio Resource Control (RRC) layer in the lowest part of the third layer (L3) is defined only in the control plane. The RRC layer performs the role of controlling radio resources between the UE and the network. To this purpose, the UE and the network exchange RRC messages through the RRC layer. The RRC layer controls a logical channel, transport channel, and physical channel with respect to configuration, re-configuration, and release of radio bearers. A radio bearer refers to a logical path that the second layer (L2) provides for data transmission between the UE and the network. Configuring a radio bearer indicates that characteristics of a radio protocol layer and channel are defined to provide specific services; and each individual parameter and operating methods thereof are determined. Radio bearers can be divided into Signaling Radio Bearers (SRBs) and Data RBs (DRBs). An SRB is used as a path for transmitting an RRC message in the control plane, while a DRB is used as a path for transmitting user data in the user plane.

The Non-Access Stratum (NAS) layer in the upper of the RRC layer performs the function of session management, mobility management, and so on.

A cell constituting the base station is set to one of 1.25, 2.5, 5, 10, and 20 MHz bandwidth, providing downlink or uplink transmission services to a plurality of UEs. Different cells can be set to different bandwidths.

Downlink transport channels transmitting data from a network to a UE include a Broadcast Channel (BCH) transmitting system information, PCH transmitting paging messages, DL-SCH transmitting user traffic or control messages, and so on. Traffic or a control message of a downlink multi-cast or broadcast service can be transmitted through the DL-SCH or through a separate downlink Multicast Channel (MCH). Meanwhile, uplink transport channels transmitting data from a UE to a network include a Random Access Channel (RACH) transmitting the initial control message and a Uplink Shared Channel (UL-SCH) transmitting user traffic or control messages.

A logical channel lies above a transmission channel and is mapped to the transmission channel. The logical channel may be divided into a control channel for delivering control area information and a traffic channel for delivering user area information. The control channel may include a BCCH (Broadcast Control Channel), PCCH (Paging Control Channel), CCCH (Common Control Channel), DCCH (Dedicated Control Channel), and MCCH (Multicast Control Channel). The traffic channel may include a DTCH (Dedicated Traffic Channel) and MTCH (Multicast Traffic Channel). The PCCH is a downlink channel for delivering paging information and is used when a network does not know the cell to which a UE belongs. The CCCH is used by a UE that does not have an RRC connection to a network. The MCCH is a point-to-multipoint downlink channel used for delivering MBMS (Multimedia Broadcast and Multicast Service) control information from a network to a UE. The DCCH is a point-to-point bi-directional channel used by a UE with an RRC connection delivering dedicated control information between a UE and a network. The DTCH is a point-to-point channel dedicated to one UE for delivering user information that may exist in an uplink and downlink. The MTCH is a point-to-multipoint downlink channel for delivering traffic data from a network to a UE.

In the case of an uplink connection between a logical channel and a transport channel, the DCCH may be mapped to a UL-SCH, and the DTCH may be mapped to a UL-SCH, and the CCCH may be mapped to a UL-SCH. In the case of a downlink connection between a logical channel and a transport channel, the BCCH may be mapped to a BCH or DL-SCH, the PCCH may be mapped to a PCH, the DCCH may be mapped to a DL-SCH, the DTCH may be mapped to a DL-SCH, the MCCH may be mapped to an MCH, and the MTCH may be mapped to the MCH.

FIG. 5 illustrates an S1 interface protocol structure in a wireless communication system to which the disclosure can be applied.

FIG. 5(a) illustrates the control plane protocol stack in the S1 interface, and FIG. 5(b) illustrates the user plane interface protocol structure in the S1 interface.

With reference to FIG. 5, the S1 control plane interface (S1-MME) is defined between the eNB and the MME. Similar to the user plane, the transport network layer is based on IP transmission. However, to ensure reliable transmission of message signaling, the transport network layer is added to the Stream Control Transmission Protocol (SCTP) layer which sits on top of the IP layer. The application layer signaling protocol is called S1 Application Protocol (S1-AP).

The SCTP layer provides guaranteed delivery of application layer messages.

The transport IP layer employs point-to-point transmission for Protocol Data Unit (PDU) signaling transmission.

For each S1-MME interface instance, single SCTP association uses a pair of stream identifiers for the S-MME common procedure. Only part of stream identifier pairs is used for the S1-MME dedicated procedure. The MME communication context identifier is allocated by the MME for the S1-MME dedicated procedure, and the eNB communication context identifier is allocated by the eNB for the S1-MME dedicated procedure. The MME communication context identifier and the eNB communication context identifier are used for identifying a UE-specific S1-MME signaling transmission bearer. The communication context identifier is delivered within each S1-AP message.

In case the S1 signaling transport layer notifies the S1AP layer of disconnection of signaling, the MME changes the state of the UE which has used the corresponding signaling connection to ECM-IDLE state. And the eNB releases RRC connection of the corresponding UE.

The S1 user plane interface (S1-U) is defined between eNB and S-GW. The S1-U interface provides non-guaranteed delivery of the user plane PDU between the eNB and the S-GW. The transport network layer is based on IP transmission, and the GPRS Tunneling Protocol User Plane (GTP-U) layer is used on top of the UDP/IP layer to deliver the user plane PDU between the eNB and the S-GW.

FIG. 6 illustrates a physical channel structure in a wireless communication system to which the disclosure may be applied.

Referring to FIG. 6, a physical channel delivers signaling and data by using a radio resource comprising one or more subcarriers in the frequency domain and one or more symbols in the time domain.

One subframe having a length of 1.0 ms comprises a plurality of symbols. A specific symbol(s) of a subframe (for example, a first symbol of a subframe) may be used for a PDCCH. The PDCCH carries information about dynamically allocated resources (for example, resource block and MCS (Modulation and Coding Scheme)).

EMM and ECM State

In what follows, EPS Mobility Management (EMM) and EPS Connection Management (ECM) states will be described.

FIG. 7 illustrates an EMM and ECM states in a wireless communication system to which the disclosure can be applied.

With reference to FIG. 7, to manage mobility of the UE in the NAS layer defined in the control planes of the UE and the MME, EMM-REGISTERED and EMM-DEREGISTERED states can be defined according to the UE is attached to or detached from a network. The EMM-REGISTERED and the EMM-DEREGISTERED states can be applied to the UE and the MME.

Initially, the UE stays in the EMM-DEREGISTERED state as when the UE is first powered on and performs registering to a network through an initial attach procedure to connect to the network. If the connection procedure is performed successfully, the UE and the MME makes transition to the EMM-REGISTERED state. Also, in case the UE is powered off or the UE fails to establish a radio link (namely, a packet error rate for a radio link exceeds a reference value), the UE is detached from the network and makes a transition to the EMM-DEREGISTERED state.

In addition, to manage signaling connection between the UE and the network, ECM-CONNECTED and ECM-IDLE states can be defined. The ECM-CONNECTED and ECM-IDLE states can also be applied to the UE and the MME. ECM connection consists of RRC connection formed between the UE and the eNB; and S1 signaling connection formed between the eNB and the MME. In other words, establishing/releasing an ECM connection indicates that both of the RRC connection and S1 signaling connection have been established/released.

The RRC state indicates whether the RRC layer of the UE is logically connected to the RRC layer of the eNB. In other words, in case the RRC layer of the UE is connected to the RRC layer of the eNB, the UE stays in the RRC CONNECTED state. If the RRC layer of the UE is not connected to the RRC layer of the eNB, the UE stays in the RRC IDLE state.

The network can identify the UE staying in the ECM-CONNECTED state at the level of cell unit and can control the UE in an effective manner.

On the other hand, the network is unable to know the existence of the UE staying in the ECM-IDLE state, and a Core Network (CN) manages the UE on the basis of a tracking area unit which is an area unit larger than the cell. While the UE stays in the ECM-IDLE state, the UE performs Discontinuous Reception (DRX) that the NAS has configured by using the ID allocated uniquely in the tracking area. In other words, the UE can receive a broadcast signal of system information and paging information by monitoring a paging signal at a specific paging occasion for each UE-specific paging DRX cycle.

When the UE is in the ECM-IDLE state, the network does not carry context information of the UE. Therefore, the UE staying in the ECM-IDLE state can perform a mobility-related procedure based on the UE such as cell selection or cell reselection without necessarily following an order of the network. In case the location of the UE differs from the location recognized by the network while the UE is in the ECM-IDLE state, the UE can inform the network of the corresponding location of the UE through a Tracking Area Update (TAU) procedure.

On the other hand, when the UE is in the ECM-CONNECTED state, mobility of the UE is managed by an order of the network. While the UE stays in the ECM-CONNECTED state, the network knows to which cell the UE currently belongs. Therefore, the network can transit and/or receiver data to or from the UE, control mobility of the UE such as handover, and perform cell measurement with respect to neighboring cells.

As described above, the UE has to make a transition to the ECM-CONNECTED state in order to receive a general mobile communication service such as a voice or data communication service. As when the UE is first powered on, the UE in its initial state stays in the ECM-IDLE state as in the EMM state, and if the UE successfully registers to the corresponding network through an initial attach procedure, the UE and the MEE make a transition to the ECM connection state. Also, in case the UE has already registered to the network but radio resources are not allocated as traffic is not activated, the UE stays in the ECM-IDLE state, and if new uplink or downlink traffic is generated for the corresponding UE, the UE and the MME make a transition to the ECM-CONNECTED state through a Service Request procedure.

Random Access Procedure

In what follows, a random access procedure provided by the LTE/LTE-A system will be described.

A UE employs the random access procedure to obtain uplink synchronization with an eNB or to have uplink radio resources. After being powered up, the UE acquires downlink synchronization with an initial cell and receives system information. From the system information, the UE obtains a set of available random access preambles and information about a radio resource used for transmission of a random access preamble. The radio resource used for transmission of a random access preamble may be specified by a combination of at least one or more subframe indices and indices on the frequency domain. The UE transmits a random access preamble selected in a random fashion from the set of random access preambles, and the eNB receiving the random access preamble transmits a TA (Timing Alignment) value for uplink synchronization through a random access response. By using the procedure above, the UE obtains uplink synchronization.

The random access procedure is common to FDD (Frequency Division Duplex) and TDD (Time Division Duplex) scheme. The random access procedure is independent of a cell size and is also independent of the number of serving cells in case CA (Carrier Aggregation) is configured.

First, a UE performs the random access procedure in the following cases.

The case in which a UE performs initial access in an RRC idle state in the absence of an RRC connection to an eNB The case in which a UE performs an RRC connection re-establishment procedure The case in which a UE connects to a target cell for the first time while performing a handover procedure The case in which a random access procedure is requested by a command from an eNB The case in which downlink data are generated while uplink synchronization is not met in the RRC connected state The case in which uplink data are generated while uplink synchronization is not met in the RRC connected state or a designated radio resource used for requesting a radio resource is not allocated The case in which positioning of a UE is performed while timing advance is needed in the RRC connected state The case in which a recovery process is performed at the time of a radio link failure or handover failure The 3GPP Rel-10 specification takes into account applying a TA (Timing Advance) value applicable to one specific cell (for example, P cell) commonly to a plurality of cells in a wireless access system. However, a UE may combine a plurality of cells belonging to different frequency bands (namely separated with a large distance in the frequency domain) or a plurality of cells having different propagation characteristics. Also, in the case of a specific cell, if the UE performs communication with the eNB (namely macro eNB) through one cell and performs communication with the SeNB through other cell while a small cell such as an RRH (Remote Radio Header) (namely repeater), femto-cell, or pico-cell or a secondary eNB (SeNB) is disposed within the cell for coverage expansion or removal of a coverage hole, a plurality of cells may have different propagation delays. In this case, when the UE performs uplink transmission so that one TA value is applied commonly to a plurality of cells, synchronization of uplink signals transmitted among the plurality of cells may be seriously influenced. Therefore, it may be preferable to have multiple TA values under the CA mode in which a plurality of cells are aggregated. The 3GPP Rel-11 specification takes into account allocating a TA value separately for each specific cell group to support multiple TA values. This is called a TA group (TAG); a TAG may have one or more cells, and the same TA value may be applied commonly to one or more cells belonging to the TAG. To support the multiple TA values, a MAC TA command control element is composed of a 2-bit TAG Identity (ID) and a 6-bit TA command field.

The UE on which a carrier aggregation is configured performs the random access procedure in case that the random access procedure previously described is required in connection with PCell. In case of TAG (that is, primary TAG (pTAG)) to which PCell belongs, the TA, which is determined based on PCell same as the existing case, or regulated through the random access procedure that accompanies PCell, can be applied to all the cells within the pTAG. Meanwhile, in case of TAG (that is, secondary TAG (sTAG)) that is configured with SCells only, the TA, which is determined based on a specific SCell within sTAG, can be applied to all the cells within the corresponding sTAG, and in this time, the TA may be acquired through the random access procedure by being initiated by the eNB. Particularly, the SCell in the sTAG is set to be a (Random Access Channel) RACH resource, and the eNB requests a RACH access in SCell for determining TA. That is, the eNB initiates the RACH transmission on the SCells by PDCCH order that is transmitted from PCell. The response message for the SCell preamble is transmitted through PCell by using RA-RNTI. The TA that is determined based on SCell that successfully completes the random access can be applied to all the cells in the corresponding sTAG by the UE. Like this, the random access procedure may be performed in SCell as well in order to acquire timing alignment of the sTAG to which the corresponding SCell belongs.

In a process of selecting a random access preamble (RACH preamble), the LTE/LTE-A system supports both of a contention based random access procedure and a non-contention based random access procedure. In the former procedure, a UE selects one arbitrary preamble from a specific set, while, in the latter procedure, the UE uses the random access preamble that an eNB has allocated only to the specific UE. It should be noted, however, that the non-contention based random access procedure may be confined to the handover process described above, a case requested by a command from the eNB, and UE positioning and/or timing advance alignment for sTAG. After the random access procedure is completed, a normal uplink/downlink transmission occurs.

Meanwhile, a relay node (RN) also support both of the contention based random access procedure and the non-contention based random access procedure. When a relay node performs the random access procedure, RN subframe configuration is suspended. That is, this means that the RN subframe configuration is temporarily discarded. Thereafter, the RN subframe structure is resumed at the time when the random access procedure is successfully completed.

FIG. 8 illustrates a contention-based random access procedure in a wireless communication system to which the disclosure may be applied.

(1) Msg 1 (Message 1)

First, a UE selects one random access preamble (RACH preamble) randomly from a set of random access preambles indicated by system information or a handover command. The UE then selects a PRACH (Physical RACH) resource capable of transmitting the random access preamble and transmits the random access preamble by using the PRACH resource.

A random access preamble is transmitted in six bits on the RACH transmission channel, where the six bit comprises a 5-bit random identity for identifying a UE which transmits a RACH preamble and 1 bit for representing additional information (for example, indicating size of Msg 3).

An eNB which has received a random access preamble from a UE decodes the preamble and obtains RA-RNTI. A time-frequency resource of a random access preamble transmitted by the corresponding UE determines the RA-RNTI related to a PRACH to which a random access preamble is transmitted.

(2) Msg 2 (Message 2)

The eNB transmits a random access response to the UE, where the RA-RNTI obtained by using the preamble on Msg 1 addresses the random access response. A random access response may include an RA preamble index/identifier, UL grant indicating a uplink radio resource, Temporary Cell RNTI (TC-RNTI), and Time Alignment Command (TAC). A TAC indicates a time synchronization value that the eNB transmits to the UE to maintain uplink time alignment. The UE updates uplink transmission timing by using the time synchronization value. If the UE updates time synchronization, the UE initiates or restarts a time alignment timer. The UL grant includes uplink resource allocation and TPC (Transmit Power Command) used for transmitting a scheduling message (Msg 3) described later. The TPC is used to determine the transmission power for a scheduled PUSCH.

The UE attempts to receive a random access response within a random access response window indicated by the eNB through system information or a handover command, detects a PDCCH masked with an RA-RNTI corresponding to the PRACH, and receives a PDSCH indicated by the detected PDCCH. The random access response information may be transmitted in the form of a MAC PDU (MAC Packet Data Unit) and the MAC PDU may be transmit through the PDSCH. It is preferable that the PDCCH should include information of the UE that has to receive the PDSCH, frequency and time information of a radio resource of the PDSCH, and transmission format of the PDSCH. As described above, once the UE succeeds to detect the PDCCH transmitted to itself, it may properly receive a random access response transmitted to the PDSCH according to the information of the PDCCH.

The random access response window refers to a maximum time interval in which the UE transmitting a preamble waits to receive a random access response message. The random access response window has a length of 'ra-ResponseWindowSize' starting from a subframe after three subframes in the last subframe transmitting a preamble. In other words, the UE waits to receive a random access response during a random access window secured after three subframes from the subframe completed transmission of the preamble. The UE may obtain the random access window size ('ra-ResponseWindowsize') parameter through system information, and the random access window size is determined to be a value between 2 to 10.

If receiving a random access response having the same random access preamble delimiter/identity as that of the random access preamble transmitted to the eNB, the UE stops monitoring the random access response. On the other hand, if failing to receive a random access response message until a random access response window is terminated or failing to receive a valid random access response having the same random access preamble identity as that of the random access preamble transmitted to the eNB, the UE may consider reception of the random access response as having failed and then perform retransmission of the preamble.

As described above, the reason why a random access preamble identity is needed for a random access response is that one random access response may include random access response information for one or more UEs and thus it is necessary to indicate to which UE the UL grant, TC-RNTI, and TAC is valid.

(3) Msg 3 (Message 3)

Receiving a valid random access response, the UE separately processes the information included in the random access response. In other words, the UE applies the TAC and stores the TC-RNTI. Also, by using the UL grant, the UE transmits the data stored in its buffer or newly generated data to the eNB. In case the UE is connected for the first time, an RRC Connection request generated at the RRC layer and transmitted through a CCCH may be included in the Msg 3 and transmitted. And in the case of an RRC Connection Re-establishment procedure, an RRC Connection Re-establishment request generated at the RRC layer and transmitted through the CCCH may be included in the Msg 3 and transmitted. Also, a NAS connection request message may be included in the Msg 3.

The Msg 3 has to include a UE identity. In the case of a contention based random access procedure, the eNB is unable to determine which UEs perform the random access procedure. Thus, the eNB needs the UE identity for each UE to avoid potential contention.

There are two methods for including UE identities. In the first method, if the UE already has a valid cell identity (C-RNTI) allocated by the corresponding cell before performing the random access procedure, the UE transmits its cell identity though a uplink transmission signal corresponding to the UL grant. On the other hand, if the UE has not received a valid cell identity before performing the random access procedure, the UE transmits its unique identity (for example, S(SAE)-TMSI or a random number). In most cases, the unique identity is longer than the C-RNTI.

The UE uses UE-specific scrambling for transmission on UL-SCH. In case the UE has received a C-RNTI, the UE may perform scrambling by using the C-RNTI. In case the UE has not received a C-RNTI yet, the UE is unable to perform C-RNTI based scrambling but uses a TC-RNTI received from a random access response instead. If having received data corresponding to the UL grant, the UE initiates a contention resolution timer for resolving contention.

(4) Msg 4 (Message 4)

Receiving the C-RNTI of a UE through the Msg 3 from the corresponding UE, the eNB transmits a Msg 4 to the UE by using the receiving C-RNTI. On the other hand, in case the eNB receives the unique identity (namely S-TMSI or a random number) through the Msg 3, the eNB transmit the Msg 4 to the UE by using a TC-RNTI allocated to the corresponding UE from a random access response. As one example, the Msg 4 may include an RRC Connection Setup message.

After transmitting data including an identity through a UL grant included in the random access response, the UE waits for a command from the eNB to resolve contention. In other words, two methods are available for a method for receiving the PDCCH, too. As described above, in case the identity in the Msg 3 transmitted in response to the UL grant is the C-RNTI, the UE attempts to receive the PDCCH by using its C-RNTI. In case the identity is a unique identity (in other words, S-TMSI or a random number), the UE attempts to receive the PDCCH by using the TC-RNTI included in the random access response. Afterwards, in the former case, if the UE receives the PDCCH though its C-RNTI before the contention resolution timer expires, the UE determines that the random access procedure has been performed normally and terminates the random access procedure. In the latter case, if the UE receives the PDCCH through the TC-RNTI before the contention resolution timer is completed, the UE checks the data transmitted by the PDSCH indicated by the PDCCH. If the data includes a unique identity of the UE, the UE determines that the random access procedure has been performed successfully and terminates the random access procedure. The UE obtains the C-RNTI through the Msg 4, after which the UE and the network transmit and receive a UE dedicated message by using the C-RNTI.

Next, a method for resolving contention during random access will be described.

The reason why contention occurs during random access is that the number of random access preambles is, in principle, finite. In other words, since the eNB is unable to assign random access preambles unique to the respective UEs, a UE selects and transmits one from among common random access preambles. Accordingly, although there are cases where two or more UEs select and transmit the same random access preamble by using the same radio resource (PRACH resource), the eNB considers the random access preamble as the one transmitted from a single UE. Thus, the eNB transmits a random access response to the UE and expects that only one UE receive the random access response. However, as described above, because of the possibility of contention, two or more UEs receive the same random access response, and each receiving UE performs an operation due to the random access response. In other words, a problem occurs where two or more UEs transmit different data to the same radio resource by using one UL grant included in the random access response. Accordingly, transmission of the data may all fail, or the eNB may succeed to receive only the data from a specific UE depending on the positions of transmission power of UEs. In the latter case, since two or more UEs assume that they all have succeeded to transmit their data, the eNB has to inform those UEs that have failed in the contention about their failure. In other words, contention resolution refers to the operation of informing a UE about whether it has succeeded or failed.

Two methods are used for contention resolution. One of the methods employs a contention resolution timer and the other method employs transmitting an identity of a successful UE to other UEs. The former case is used when a UE already has a unique C-RNTI before performing a random access process. In other words, a UE that already has a C-RNTI transmits data including its C-RNTI to the eNB according to a random access response and operates a contention resolution timer. And if the UE receives a PDCCH indicated by its C-RNTI before the contention resolution timer expires, the UE determines that it has won the contention and finishes random access normally. On the other hand, if the UE fails to receive a PDCCH indicated by its C-RNTI before the contention resolution timer expires, the UE determines that it has lost the contention and performs the random access process again or inform a upper layer of the failure. The latter contention resolution method, namely the method for transmitting an identity of a successful UE, is used when a UE does not have a unique cell identity before performing the random access process. In other words, in case the UE has no cell identity, the UE transmits data by including an upper identity (S-TMSI or a random number) higher than a cell identity in the data according to the UL grant information included in a random access response and operates a contention resolution timer. In case the data including the upper identity of the UE is transmitted to a DL-SCH before the contention resolution timer expires, the UE determines that the random access process has been performed successfully. On the other hand, in case the data including the upper identity of the UE is not transmitted to the DL-SCH before the contention resolution data expires, the UE determines that the random access process has failed.

Meanwhile, different from the contention based random access process illustrated in FIG. 11, a non-contention based random access process finishes its procedures only by transmitting the Msg 1 and 2. However, before the UE transmits a random access preamble to the eNB as the Msg 1, the eNB allocates a random access preamble to the UE. The random access procedure is terminated as the UE transmits the allocated random access preamble to the eNB as the Msg 1 and receives a random access response from the eNB.

Next Generation System (NGS)

To design a next mobile network, i.e., 5G core network, the 3GPP has been defining service requirements by studies on the services and markets technology enablers (SMARTER). SA2 proceeds with a study on architecture for next generation system (FS_NextGen) based thereupon.

The following definitions have been made on NGS in TR 23.799.

- Evolved packet system (EPS): a network system constituted of an evolved packet core (EPC) which is an Internet protocol (IP)-based packet switched core network and an access network, e.g., LTE or UTRAN. A network evolved from the Universal mobile telecommunications system (UMTS);
- eNodeB: a base station of the EPS network. Installed outdoors and has the coverage of a macro cell;
- International mobile subscriber identity (IMSI): a user identifier internationally and uniquely allocated from a mobile communication network;
- Public land mobile network (PLMN): a network configured for the purpose of providing mobile communication services to individuals. Configurable separately per operator;
- Evolved UTRA (E-UTRA): An RAT evolved from the E-UTRA radio interface to be operated in the NextGen system;
- Network capability: a 3GPP specific feature used as a component that may be attached to the remote communication service provided to the "end user" although typically unused as a separate or standalone "end user service" and a provided network (e.g., typically, location services are not used for an "end user" to simply query about the location of other UEs. As a feature or network capability, a location service is used (e.g., by a tracking application), and it is provided as an "end user service." The network capability may be used internally in the network and/or may be exposed to outside users (called "3rd parties").);
- Network function: is a function adopted by the 3GPP or a processing function defined by the 3GPP in the network. This defines functional behaviors and an interface defined by the 3GPP. The network function is a network element over dedicated hardware and may be implemented as a software instance executed on the dedicated hardware or a virtual function instantiated over a proper platform (e.g., in a cloud infrastructure);
- NextGen UE: means a next generation in the disclosure;
- NextGen core network; a core network connected to a NextGen access network;
- NextGen RAN (NG RAN): indicates a radio access network supporting one or more of the following options:
  2) Standalone new radio
  4) Standalone new radio is an anchor having an evolved E-UTRA extension
  5) Evolved E-UTRA
  7) Evolved E-UTRA is an anchor with a new radio extension
  has a common feature in that it interfaces with a next generation core;
- NextGen access network (NG AN): means a NextGen RAN or non-3GPP access network. This interfaces with a next generation core;
- NextGen System (NG system): means a NextGen system including a NextGen access network (NG AN) and a NextGen core;
- NextGen UE: a UE connected to a NextGen system;
- PDU connectivity service: a service to provide PDU exchange between a UE and a data network
- PDU session: an association between a UE and a data network providing a PDU connection service. Association types include an IP type, an Ethernet type, and a non-IP type; an association between a UE providing a PDU connectivity service and a data network. The association type may be an Internet protocol (IP), Ethernet, or unstructured;
- IP-type PDU session: an association between a UE and an IP data network;
- Service continuity: a user experience with no service discontinuity including a change in the IP address and/or anchor point;
- Session continuity: the continuity of a PDU session. The "session continuity" for an IP-type PDU session means that the IP address is preserved during the lifespan of the PDU session;
- 5G system (5GS): a system constituted of a 5G access network (AN), a 5G core network, and a user equipment (UE)
- 5G access network (5G-AN) (or AN): an access network constituted of a non-5G access network (non-5G-AN) and/or a 5G radio access network (5G-RAN) connected to a 5G core network. 5G-RAN may be called a next generation access network (NG-RAN).
- 5G radio access network (5G-RAN) (or RAN): has a common feature in that it connects to a 5GC and is a radio access network that supports one or more of the following options.
  1) Standalone new radio.
  2) New radio which is an anchor supporting an E-UTRA extension.
  3) Standalone E-UTRA (e.g., eNodeB).
  4) Anchor supporting a new radio extension
- 5G core network (5GC): a core network connected to a 5G access network
- Network function (NF): means a processing function defined by the 3GPP or adopted by the 3GPP in the network. This processing function encompasses functional behaviors defined and an interface defined by the 3GPP.

NF service: a function exposed by the NF via a service-based interface and consumed by other authenticated NF(s)

Network slice: a logical network providing a specific network capability(ies) and a network feature(s)

Network slice instance: a set of resource(s) (e.g., computation, storage, and networking resources) required and NF instance(s) forming a network slice deployed Packet data unit (PDU) connectivity service: a service to provide exchange of PDU(s) between a UE and a data network.

PDU connectivity service: a service to provide exchange of PDU(s) between a UE and a data network.

Non-access stratum (NAS): a functional layer for exchanging traffic messages and signaling between a UE and a core network in the EPS, 5GS protocol stack. Functions primarily to support the mobility of UE and the session management procedure.

5G System Architecture to which the Disclosure May be Applied

A 5G system is a technology advanced from the 4th generation LTE mobile communication technology and a new radio access technology (RAT) through the evolution of the existing mobile communication network structure or a clean-state structure and an extended technology of long term evolution (LTE), and it supports extended LTE (eLTE), non-3GPP (e.g., WLAN) access and so on.

A 5G system is defined based on a service, and an interaction between network functions (NFs) within architecture for a 5G system may be expressed by two methods as follows.

Reference point representation (FIG. 9): indicates an interaction between NF services within NFs described by a point-to-point reference point (e.g., N11) between two NFs (e.g., AMF and SMF).

Service-based representation (FIG. 10): network functions (e.g., AMFs) within a control plane (CP) permit other authenticated network functions to access its own service. If this representation is necessary, it also includes a point-to-point reference point.

FIG. 9 is a diagram illustrating 5G system architecture using a reference point representation.

Referring to FIG. 9, the 5G system architecture may include various elements (i.e., a network function (NF)). This drawing illustrates an authentication server function (AUSF), a (core) access and mobility management function (AMF), a session management function (SMF), a policy control function (PCF), an application function (AF), united data management (UDM), a data network (DN), a user plane function (UPF), a (radio) access network ((R)AN) and a user equipment (UE) corresponding to some of the various elements.

Each of the NFs supports the following functions.

AUSF stores data for the authentication of a UE.

AMF provides a function for access of a UE unit and mobility management and may be basically connected to one AMF per one UE.

Specifically, the AMF supports functions, such as signaling between CN nodes for mobility between 3GPP access networks, the termination of a radio access network (RAN) CP interface (i.e., N2 interface), the termination (N1) of NAS signaling, NAS signaling security (NAS ciphering and integrity protection), AS security control, registration area management, connection management, idle mode UE reachability (including control and execution of paging retransmission), mobility management control (subscription and policy), intra-system mobility and inter-system mobility support, the support of network slicing, SMF selection, lawful interception (for an AMF event and an interface to an LI system), the provision of transfer of a session management (SM) message between a UE and an SMF, a transparent proxy for SM message routing, access authentication, access authorization including a roaming right check, the provision of transfer of an SMS message between a UE and an SMSF (SMS(Short Message Service) function), a security anchor function (SEA) and/or security context management (SCM).

Some or all of the functions of the AMF may be supported within a single instance of one AMF.

DN means an operator service, Internet access or a 3rd party service, for example. The DN transmits a downlink protocol data unit (PDU) to an UPF or receives a PDU, transmitted by a UE, from a UPF.

PCF provides a function for receiving information about a packet flow from an application server and determining a policy, such as mobility management and session management. Specifically, the PCF supports functions, such as the support of a unified policy framework for controlling a network behavior, the provision of a policy rule so that a CP function(s) (e.g., AMF or SMF) can execute a policy rule, and the implementation of a front end for accessing related subscription information in order to determine a policy within user data repository (UDR).

SMF provides a session management function and may be managed by a different SMF for each session if a UE has a plurality of sessions.

Specifically, the SMF supports functions, such as session management (e.g., session setup, modification and release including the maintenance of a tunnel between a UPF and an AN node), UE IP address allocation and management (optionally including authentication), the selection and control of the UP function, a traffic steering configuration for routing traffic from the UPF to a proper destination, the termination of an interface toward policy control functions, the execution of the control part of a policy and QoS, lawful interception (for an SM event and an interface to an LI system), the termination of the SM part of an NAS message, downlink data notification, the initiator of AN-specific SM information (transferred to an AN through N2 via the AMF), the determination of an SSC mode of a session, and a roaming function.

Some or all of the functions of the SMF may be supported within a single instance of one SMF.

UDM stores the subscription data of a user, policy data, etc. UDM includes two parts, that is, an application front end (FE) and user data repository (UDR).

The FE includes a UDM FE responsible for the processing of location management, subscription management and credential and a PCF responsible for policy control. The UDR stores data required for functions provided by the UDM-FE and a policy profile required by the PCF. Data stored within the UDR includes user subscription data, including a subscription ID, security credential, access and mobility-related subscription data and session-related subscription data, and policy data. The UDM-FE supports functions, such as access to subscription information stored in the UDR, authentication credential processing, user identification handling, access authentication, registration/mobility management, subscription management, and SMS management.

UPF transfers a downlink PDU, received from a DN, to a UE via an (R)AN and transfers an uplink PDU, received from a UE, to a DN via an (R)AN.

Specifically, the UPF supports functions, such as an anchor point for intra/inter RAT mobility, the external PDU session point of interconnection to a data network, packet routing and forwarding, a user plane part for the execution of packet inspection and a policy rule, lawful interception, a traffic usage report, an uplink classifier for supporting the routing of traffic flow of a data network, a branching point for supporting a multi-home PDU session, QoS handling (e.g., the execution of packet filtering, gating and an uplink/downlink rate) for a user plane, uplink traffic verification (SDF mapping between a service data flow (SDF) and a QoS flow), transport level packet marking within the uplink and downlink, downlink packet buffering, and a downlink data notification triggering function. Some or all of the functions of the UPF may be supported within a single instance of one UPF.

AF interoperates with a 3GPP core network in order to provide services (e.g., support functions, such as an application influence on traffic routing, network capability exposure access, an interaction with a policy framework for policy control).

(R)AN collectively refers to a new radio access network supporting all of evolved E-UTRA (E-UTRA) and new radio (NR) access technologies (e.g., gNB), that is, an advanced version of the 4G radio access technology.

The network node in charge of transmission/reception of wireless signals with the UE is the gNB, and plays the same role as the eNB.

The gNB supports functions for radio resource management (i.e., radio bearer control and radio admission control), connection mobility control, the dynamic allocation (i.e., scheduling) of resources to a UE in the uplink/downlink, Internet protocol (IP) header compression, the encryption and integrity protection of a user data stream, the selection of an AMF upon attachment of a UE if routing to the AMF has not been determined based on information provided to the UE, the selection of an AMF upon attachment of a UE, user plane data routing to an UPF(s), control plane information routing to an AMF, connection setup and release, the scheduling and transmission of a paging message (generated from an AMF), the scheduling and transmission of system broadcast information (generated from an AMF or operation and maintenance (O&M)), a measurement and measurement report configuration for mobility and scheduling, transport level packet marking in the uplink, session management, the support of network slicing, QoS flow management and mapping to a data radio bearer, the support of a UE that is an inactive mode, the distribution function of an NAS message, an NAS node selection function, radio access network sharing, dual connectivity, and tight interworking between an NR and an E-UTRA.

UE means a user device. A user apparatus may be called a term, such as a terminal, a mobile equipment (ME) or a mobile station (MS). Furthermore, the user apparatus may be a portable device, such as a notebook, a mobile phone, a personal digital assistant (PDA), a smartphone or a multimedia device, or may be a device that cannot be carried, such as a personal computer (PC) or a vehicle-mounted device.

In the drawings, for the clarity of description, an unstructured data storage network function (UDSF), a structured data storage network function (SDSF), a network exposure function (NEF) and an NF repository function (NRF) are not shown, but all of the NFs shown in this drawing may perform mutual operations along with the UDSF, NEF and NRF, if necessary.

NEF provides means for safely exposing services and capabilities provided by 3GPP network functions, for example, for a 3rd party, internal exposure/re-exposure, an application function, and edge computing. The NEF receives information from other network function(s) (based on the exposed capability(s) of other network function(s)). The NEF may store information received as structured data using a standardized interface as a data storage network function. The stored information is re-exposed to other network function(s) and application function(s) by the NEF and may be used for other purposes, such as analysis.

NRF supports a service discovery function. It receives an NF discovery request from an NF instance and provides information of a discovered NF instance to an NF instance. Furthermore, it maintains available NF instances and services supported by the available NF instances.

SDSF is an optional function for supporting a function of storing and retrieving information as structured data by any NEF.

UDSF is an optional function for supporting a function of storing and retrieving information as unstructured data by any NF.

In the 5G system, a node which is responsible for wireless transmission/reception with the UE is gNB and plays the same role as the eNB in the EPS. When the UE is simultaneously connected to the 3GPP connection and the non-3GPP connection, the UE receives a service through one AMF as illustrated in FIG. 9. In FIG. 9, it is illustrated that a connection is made by the non-3GPP connection and a connection is made by the 3GPP connection are connected to one same UPF, but the connection is not particularly required and may be connected by a plurality of different UPFs.

However, when the UE selects N3IWK (also referred to as non-3GPP interworking function (N3IWF)) in the HPLMN in the roaming scenario and is connected to the non-3GPP connection, the AMF that manages the 3GPP connection may be located in the VPLMN and the AMF that manages the non-3GPP connection may be located in the HPLMN.

The non-3GPP access network is connected to the 5G core network via N3IWK/N3IWF. The N3IWK/N3IWF interfaces the 5G core network control plane function and user plane function via the N2 and N3 interfaces, respectively.

A representative example of the non-3GPP connection mentioned in the present specification may be a WLAN connection.

Meanwhile, this drawing illustrates a reference model if a UE accesses one DN using one PDU session, for convenience of description, but the disclosure is not limited thereto.

A UE may access two (i.e., local and central) data networks at the same time using multiple PDU sessions. In this case, for different PDU sessions, two SMFs may be selected. In this case, each SMF may have the ability to control both a local UPF and central UPF within a PDU session, which can be independently activated per PDU.

Furthermore, a UE may access two (i.e., local and central) data networks provided within one PDU session at the same time.

In the 3GPP system, a conceptual link that connects NFs within the 5G system is defined as a reference point. The following illustrates reference points included in 5G system architecture represented in this drawing.

N1: a reference point between a UE and an AMF
N2: a reference point between an (R)AN and an AMF
N3: a reference point between an (R)AN and a UPF
N4: a reference point between an SMF and a UPF
N5: a reference point between a PCF and an AF
N6: a reference point between a UPF and a data network
N7: a reference point between an SMF and a PCF
N24: a reference point between a PCF within a visited network and a PCF within a home network
N8: a reference point between a UDM and an AMF
N9: a reference point between two core UPFs
N10: a reference point between a UDM and an SMF
N11: a reference point between an AMF and an SMF
N12: a reference point between an AMF and an AUSF
N13: a reference point between a UDM and an authentication server function (AUSF)
N14: a reference point between two AMFs
N15: a reference point between a PCF and an AMF in the case of a non-roaming scenario and a reference point between a PCF within a visited network and an AMF in the case of a roaming scenario
N16: a reference point between two SMFs (in the case of a roaming scenario, a reference point between an SMF within a visited network and an SMF within a home network)
N17: a reference point between an AMF and an EIR
N18: a reference point between any NF and an UDSF
N19: a reference point between an NEF and an SDSF FIG. 10 is a diagram illustrating 5G system architecture using a service-based representation.

A service-based interface illustrated in this drawing shows a set of services provided/exposed by a specific NF. The service-based interface is used within a control plane. The following illustrates service-based interfaces included in the 5G system architecture represented as in this drawing.

Namf: a service-based interface exhibited by an AMF
Nsmf: a service-based interface exhibited by an SMF
Nnef: a service-based interface exhibited by an NEF
Npcf: a service-based interface exhibited by a PCF
Nudm: a service-based interface exhibited by a UDM
Naf: a service-based interface exhibited by an AF
Nnrf: a service-based interface exhibited by an NRF
Nausf: a service-based interface exhibited by an AUSF NF service is a kind of capability exposed to another NF (i.e., NF service consumer) by an NF (i.e., NF service supplier) through a service-based interface. The NF may expose one or more NF service(s). In order to define NF service, the following criteria are applied:

NF services are derived from an information flow for describing an end-to-end function.
A complete end-to-end message flow is described by the sequence of NF service invocation.
Two operations for NF(s) to provide their services through service-based interfaces are as follows:
i) "Request-response": a control plane NF_B (i.e., NF service supplier) receives a request to provide a specific NF service (including the execution of an operation and/or the provision of information) from another control plane NF_A (i.e., NF service consumer). NF_B sends NF service results based on information provided by NF_A within a request as a response.

In order to satisfy a request, NF_B may alternately consume NF services from other NF(s). In the request-response mechanism, communication is performed in a one-to-one manner between two NFs (i.e., consumer and supplier).

ii) "subscribe-notify"
A control plane NF_A (i.e., NF service consumer) subscribes to an NF service provided by another control plane NF_B (i.e., NF service supplier). A plurality of control plane NF(s) may subscribe to the same control plane NF service. NF_B notifies interested NF(s) that have subscribed to NF services of the results of the NF services. A subscription request from a consumer may include a notification request for notification triggered through periodical update or a specific event (e.g., the change, specific threshold arrival, etc. of requested information). The mechanism also includes a case where NF(s) (e.g., NF_B) implicitly subscribe to specific notification without an explicit subscription request (e.g., due to a successful registration procedure).

FIG. 11 illustrates NG-RAN architecture to which the disclosure may be applied.

Referring to FIG. 11, a new generation radio access network (NG-RAN) includes an NR NodeB (gNB)(s) and/or an eNodeB (eNB)(s) for providing the termination of a user plane and control plane protocol toward a UE.

An Xn interface is connected between gNBs and between a gNB(s) and an eNB(s) connected to 5GC. The gNB(s) and the eNB(s) are also connected to 5GC using an NG interface. More specifically, the gNB(s) and eNB(s) are also connected to an AMF using an NG-C interface (i.e., N2 reference point), that is, a control plane interface between an NG-RAN and 5GC and are connected to a UPF using an NG-U interface (i.e., N3 reference point), that is, a user plane interface between an NG-RAN and 5GC.

Radio Protocol Architecture

FIG. 12 is a diagram illustrating a radio protocol stack to which the disclosure may be applied. Specifically, FIG. 12(a) illustrates a radio interface user plane protocol stack between a UE and a gNB, and FIG. 12(b) illustrates a radio interface control plane protocol stack between the UE and the gNB.

A control plane means a passage through which control messages are transmitted in order for a UE and a network to manage a call. A user plane means a passage through which data generated in an application layer, for example, voice data or Internet packet data is transmitted.

Referring to FIG. 12(a), the user plane protocol stack may be divided into a first layer (Layer 1) (i.e., a physical layer (PHY) layer) and a second layer (Layer 2).

Referring to FIG. 12(b), the control plane protocol stack may be divided into a first layer (i.e., a PHY layer), a second layer, a third layer (i.e., a radio resource control (RRC) layer) and a non-access stratum (NAS) layer.

The second layer is divided into a medium access control (MAC) sublayer, a radio link control (RLC) sublayer, a packet data convergence protocol (PDC) sublayer, and a service data adaptation protocol (SDAP) sublayer (in the case of a user plane).

Radio bearers are classified into two groups: a data radio bearer (DRB) for user plane data and a signaling radio bearer (SRB) for control plane data Hereinafter, the layers of the control plane and user plane of the radio protocol are described.

1) The PHY layer, that is, the first layer, provides information transfer service to a higher layer using a physical channel. The PHY layer is connected to the MAC sublayer located in a high level through a transport channel. Data is transmitted between the MAC sublayer and the PHY layer through a transport channel. The transport channel is classified depending on how data is transmitted according to which characteristics through a radio interface. Furthermore, data is transmitted between different physical layers, that is, between the PHY layer of a transmission stage and the PHY layer of a reception stage through a physical channel.

2) The MAC sublayer performs mapping between a logical channel and a transport channel; the multiplexing/demultiplexing of an MAC service data unit (SDU) belonging to one logical channel or different logical channels to/from a transport block (TB) transferred to/from the PHY layer through a transport channel; a scheduling information report; error correction through a hybrid automatic repeat request (HARQ); priority handling between UEs using dynamic scheduling; priority handling between the logical channels of one UE using logical channel priority; and padding.

Different types of data transfer service provided by the MAC sublayer. Each logical channel type defines that information of which type is transferred.

Logical channels are classified into two groups: a control channel and a traffic channel.

i) The control channel is used to transfer only control plane information and is as follows.
  Broadcast control channel (BCCH): a downlink channel system for broadcasting control information.
  Paging control channel (PCCH): a downlink channel transferring paging information and system information change notification.
  Common control channel (CCCH): a channel for transmitting control information between a UE and a network. This channel is used for UEs not having an RRC connection with a network.
  Dedicated control channel (DCCH): a point-to-point bidirectional channel for transmitting dedicated control information between a UE and a network. It is used by a UE having an RRC connection.

ii) The traffic channel is used to use only user plane information:
  Dedicated traffic channel (DTCH): a point-to-point channel for transferring user information and dedicated to a single UE. The DTCH may be present in both the uplink and downlink.

In the downlink, a connection between a logical channel and a transport channel is as follows.

A BCCH may be mapped to a BCH. A BCCH may be mapped to a DL-SCH. A PCCH may be mapped to a PCH. A CCCH may be mapped to a DL-SCH. A DCCH may be mapped to a DL-SCH. A DTCH may be mapped to a DL-SCH.

In the uplink, a connection between a logical channel and a transport channel is as follows. A CCCH may be mapped to an UL-SCH. A DCCH may be mapped to an UL-SCH. A DTCH may be mapped to an UL-SCH.

3) The RLC sublayer supports three transport modes: a transparent mode (TM), an unacknowledged mode (UM) and acknowledged mode (AM).

An RLC configuration may be applied to each logical channel. In the case of an SRB, the TM or AM mode is used. In contrast, in the case of a DRB, the UM or AM mode is used.

The RLC sublayer performs the transfer a higher layer PDU; independent sequence numbering with a PDCP; error correction through an automatic repeat request (ARW); segmentation and re-segmentation; the reassembly of an SDU; RLC SDU discard; and RLC re-establishment.

4) The PDCP sublayer for a user plane performs sequence numbering; header compression and compression-decompression (corresponding to only robust header compression (RoHC)); user data transfer; reordering and duplicate detection (if there is transfer to a layer higher than the PDCP); PDCP PDU routing (in the case of a split bearer); the retransmission of a PDCP SDU; ciphering and deciphering; PDCP SDU discard; PDCP re-establishment and data recovery for RLC AM; and the duplication of a PDCP PDU.

The PDCP sublayer a control plane additionally performs sequence numbering; ciphering, deciphering and integrity protection; control plane data transfer; duplication detection; the duplication of a PDCP PDU.

When duplication for a radio bearer is configured by RRC, an additional RLC entity and an additional logical channel are added to a radio bearer in order to control a duplicated PDCP PDU(s). In the PDCP, duplication includes transmitting the same PDCP PDU(s) twice. The first one is transferred to the original RLC entity, and the second one is transferred to an additional RLC entity. In this case, the duplication corresponding to the original PDCP PDU is not transmitted to the same transport block. Different two logical channels may belong to the same MAC entity (in the case of a CA) or to different MAC entities (in the case of DC). In the former case, a logical channel mapping restriction is used to guarantee that a duplication corresponding to the original PDCP PDU is not transferred to the same transport block.

5) The SDAP sublayer performs i) mapping between a QoS flow and a data radio bearer and ii) QoS flow ID marking within a downlink and uplink packet.

One protocol entity of an SDAP is configured for each PDU session, but exceptionally in the case of dual connectivity (DC), two SDAP entities may be configured.

6) The RRC sublayer performs the broadcasting of system information related to an access stratum (AS) and a non-access stratum (NAS); paging initiated by 5GC or an NG-RAN; the establishment, maintenance and release (additionally including the modification and release of a carrier aggregation and additionally including the modification and release of dual connectivity between an E-UTRAN and an NR or within an NR) of an RRC connection between a UE and an NG-RAN; a security function including key management; the establishment, configuration, maintenance and release of an SRB(s) and a DRB(s); handover and context transfer; control of UE cell selection, re-release and cell selection/reselection; a mobility function including mobility between RATs; a QoS management function, a UE measurement report and report control; the detection of a radio link failure and recovery from a radio link failure; and the transfer of an NAS message from an NAS to a UE and the transfer of an NAS message from a UE to an NAS.

FIG. 13 illustrates a protocol stack between a UE and a core network of 5G/NR system to which the disclosure is applicable.

N1 may play a role similar to a NAS protocol of EPS, and N2 may play a role similar to S1-AP of EPS. 5G RRC and 5G AS respectively correspond to existing LTE RRC and LTE AS, or NR RRC and NR AS of NR that are newly being standardized, and RRCs of all two RATs are excepted to be based on current LTE RRC.

PLMN Selection Procedure

A PLMN selection procedure is described below. In relation to this procedure, TS 23.122 may be incorporated with the disclosure.

PLMN selection comes in two modes: automatic and manual.

An MS needs to register in the PLMN if a service requiring registration is available. In both the automatic and manual modes, the concept of registration in the PLMN may be applied. In the following cases, the MS's registration in the PLMN succeeds.

a) when the MS discovers a proper cell of the PLMN where it is to camp; and b) when a local register (LR) request from the MS is received in the registration region of the cell where the MS camps.

Registration and location registration in the selected PLMN are necessary only when the service for which the MS requests to register is available. Otherwise, the PLMN selection procedure is performed without registration.

The ME utilizes all information stored in the subscriber identification module (SIM) related to PLMN selection (e.g., a "HPLMN selector with access technology," an "operator-controlled PLMN selector with access technology," a user controlled PLMN selector with access technology," a "forbidden PLMN," an "equivalent HPLMN," etc.)

Relevant access technology for each PLMN item is included in the "HPLMN selector with access technology," "user controlled PLMN selector with access technology," and operator controlled PLMN selector with access technology" data file of the SIM. PLMN/access technology combinations may be sorted depending on priority. If an entry indicates two or more access technologies, no priority is defined as to the access technologies in the entry, and the priority applied to each access technology in the entry is an implementation issue. If the item indicates no specific access technology, all the access technologies the ME supports need to be assumed to apply to the item. Where the item indicates only access technologies not supported by the ME, the item needs to be disregarded. Where the item indicates at least one access technology the ME supports, if other references defined for a specific PLMN selection procedure are met, the item needs to be used in the PLMN selection procedure.

The mobile equipment stores an "equivalent PLMN" list. This list is replaced or deleted when the each-location update procedure, routing region update procedure, GPRS connection procedure, tracking region update procedure, and EPS attach procedure are ended. This list is deleted by the MS attached to the urgent bearer service after detached. The stored list is constituted of the equivalent PLMN list downloaded from the network and the PLMN code of the registered PLMN from which the list has been downloaded. All the PLMNs in the stored list are regarded as equivalent to each other for PLMN selection, cell selection/reselection, and handover in all the access technologies supported by the PLMNs.

If the MS reselects a cell in the shared network, and the cell is appropriate for multiple PLMN identifiers received on the BCCH or extended coverage (EC)-BCCH, an indication for the multiple PLMN identifiers is sent to the NAS. The MS needs to select one of the PLMNs. Where the registered PLMN is available among the PLMNs, the MS is forbidden from selecting other PLMNs.

The MS is forbidden from using the PLMN code included in the "HPLMN access technology selector" data file.

The home network operator may identify an alternative network ID with the HPLMN. If the equivalent HPLMN (EHPLMN) list is present and is not empty, the items in the EHPLMN list are used for the network selection procedure. Upon network selection, the highest-priority EHPLMN available needs to be chosen. Where the EHPLMN list is present but empty or is absent, a HPLMN derived from the IMSI is used for the network selection procedure.

The "HPLMN selector with access technology" data file is used only for the MS to obtain a HPLMN access technology related to the HPLMN code corresponding to the PLMN code included in the IMSI when the EHPLMN list is absent or empty. If there is an EHPLMN list, this data field applies to all the items in the EHPLMN list.

Other GSM frequency bands (e.g., 900, 1800, 1900, and 400) all are regarded as GSM access technology. If supporting two or more bands, the MS needs to scan all the supported bands upon retrieving the GSM frequency. However, the GSM COMPACT system which shares the GSM frequency band with the CBPCCH broadcast channel is regarded as a separate access technology in terms of GSM.

The EHPLMN list may include HPLMNs derived from the IMSI. The priority of the HPLMNs derived from the IMSI is provided by the position in the EHPLMN list.

The user may always request the MS to initiate reselection and registration in an available PLMN according to the following procedure depending on the operation mode.

The MS may select and attempt registration for a PLMN/access technology combination (when it is available and permitted) in all the operation bands according to the following order.

i) HPLMN (when the EHPLMN list is absent or empty) or available highest-priority EHPLMN (when there is an EHPLMN list);

ii) A PLMN/access technology combination included in the "user controlled PLMN selector with access control technology" data file (depending on priority) of the SIM except for the PLMN/access technology combination previously selected;

iii) A PLMN/access technology combination included in the "operator controlled PLMN selector with access technology" data file (depending on priority) of the SIM except for the PLMN/access technology combination previously selected;

iv) a PLMN/access technology combination different in the high-quality signal received in random order except for the PLMN/access technology combination previously selected;

v) a PLMN/access technology combination other than the PLMN/access technology combination previously selected in the order of reduced signal quality, or the PLMN/access technology combination previously selected may be selected regardless of signal quality;

vi) the PLMN/access technology combination previously selected.

The previously selected PLMN/access technology combination is a PLMN/access technology combination selected before the MS starts user reselection procedure.

If the previously selected PLMN is selected, and registration for other PLMNs is not attempted, the MS need not register because it has already registered in a PLMN.

The equivalent PLMN list should not be applied for user reselection in the automatic network selection mode.

In iv), v), and vi), the MS need to search for all available access technologies before determining a PLMN/access technology combination it is to choose.

Network Slicing 5G systems have adopted network slicing technology that provides network resources and network functions as independent slices depending on each service.

By network slicing, the operator may provide a customized network. For example, services may be provided only when there is a difference in requirements for functions (e.g., priority, claim, policy control, security and mobility), when there is a difference in performance requirements (e.g., latency, mobility, availability, reliability, and data speed), or only for specific users (e.g., multiple projections system (MPS) users, public safety users, business customers, roamers, or mobile virtual network operators (MVNO) hosting).

A network slice may provide the functions of a whole network including the functions of a radio access network and the functions of a core network (e.g., potentially from other vendors). One network may support one or more network slices.

Described below are requirements for network slicing in the 5G system.

The 5G system is required to allow the operator to create, modify, and delete network slices.

The 5G system is required to allow the operator to define and update a series of services and functions supported by the network slice.

The 5G system is required to allow the operator to set information by which the UE is associated with the network slice.

The 5G system is required to allow the operator to set information by which a service is associated with the network slice.

The 5G system is required to allow the operator to allocate the UE to a network slice, move the UE from one network slice to another, and remove the UE from the network slice depending on the subscription provided by the network slice, UE functions, the operator's policy and services.

The 5G system is required to support a mechanism by which the VPLMN allocates the UE to a network slice with a necessary service and authorized by the HPLMN or a default network slice.

The 5G system is required to simultaneously allocate the UE to two or more network slices of one operator and to allow the UE to access the services of the allocated network slices.

Traffic and services from one network slice should not affect traffic and services from another network slice in the same network.

Creation, modification, and deletion of a network slice have no or minimal influence on traffic and services from another network slice in the same network.

The 5G system is required to support adaptation of capacity (i.e., capacity elasticity of the network slice).

The 5G system allows the network operator to define a minimal available capacity for the network slice. The capacity elasticity of another network slice in the same network has no influence on the minimal available capacity of the network slice.

The 5G system allows the network operator to define a maximum available capacity for the network slice.

Where several network slices contend for resources from the same network, the 5G system is required to allow the network operator to define priority among the other network slices.

The 5G system supports a method by which network functions are added and removed to/from the network by the operator so that the network functions may be used in the network slice.

The 5G system is required to allow the operator to support a method for differentiating from the policies, functions, and capabilities provided from other network slices.

The 5G system is required to support provision of connectivity to home and roaming users in the same network slice.

In shared 5G network settings, each operator is required to apply all the above requirements to the allocated network resources.

The network slice is a complete logical network including a network function set necessary for providing a specific network function and network feature and resources corresponding thereto. Here, the 5G-AN and the 5 CN are included. Network slice instance (NSI) means a deployed network function set of transferring an intended network slice service according to the instantiation of the network slice, i.e., network slice template.

As network slicing is introduced, isolation of network functions and network resources per slice and independent management may be provided. Thus, 5G system network functions may be selected and combined depending on services or users and, thus, independent, flexible services may be provided per service or per user.

Network slice denotes a network resultant from logically integrating the access network and the core network.

A network slice may include one or more of the following:
Core network control plane and user plane functions
NG-RAN
non-3GPP interworking function (N3IWF) to non-3GPP access network Different optimization for functions and network functions supported may be applied per network slice. Multiple network slice instances (NSIs) may provide the same function to a group of different UEs.

One UE may simultaneously attach to one or more network slice instances via a 5G-AN. One UE may receive services simultaneously from up to eight network slices. The AMF instance which serves on the UE may belong to each network slice instance that services on the UE. In other words, this AMF instance may be common to the network slice serving on the UE. The CN part of the network slice instance(s) serving on the UE is selected by the CN.

AMF discovery and selection for a set of slices for the UE may be triggered by the AMF first contacted in the registration procedure and this may lead to a change of the AMF. SMF discovery and selection are initiated by the AMF when an SM message for establishing a PDU session is received by the UE. The NRF is used to assist in discovery and selection.

One PDU session belongs to only one specific network slice instance per PLMN. Different network slice instances do not share one PDU session.

One PDU session belongs to one specific network slice instance per PLMN. Although different slices are able to have a slice-specific PDU session which uses the same data name (DNN), different network slice instances do not share one PDU session.

Single network slice selection assistance information (S-NSSAI) identifies the network slice. Each S-NSSAI is assistance information used for the network to select a specific network slice instance. NSSAI is a set of S-NSSAI(s). The S-NSSAI includes the following:
Slice/service type (SST): indicates the behavior of the network slice expected in terms of function and service.
Slice differentiator (SD): is selective information that supplements SST(s) for selecting a network slice instance from a plurality of potential network slice instances that observe all of the indicated SSTs.

The S-NSSAI may have a standard value or PLMN-specific value. When having a PLMN-specific value, the S-NSSAI is associated with the PLMN ID of the PLMN allocating the PLMN-specific value. The S-NSSAI is forbidden from being used by the UE in an access stratum procedure other than in the PLMN related to the S-NSSAI.

The NSSAI is a collection of S-NSSAIs. The NSSAI has up to eight S-NSSAIs transmitted via a signaling message between the UE and the network. Each S-NSSAI assists the network in selecting a specific network slice instance.

Using different S-NSSAIs, the same network slice instance may be selected.

According to the need of operation or deployment of the operator, several network slice instances of the network slice may be deployed in the same or different regions for the same S-NSSAI. Whenever the UE is associated with the S-NSSAI, the UE may be served by only one instance at any time among multiple corresponding network slice instances.

The CN part of the network slice instance(s) serving on the UE is selected by the CN.

The (R)AN, before the 5GC notifies the (R)AN of the allowed NSSAI, may use the NSSAI requested in the access stratum signaling so as to process UE control region connection. The requested NSSAI is not used by the RAN for routing when the UE provides a temporary user ID.

If the UE successfully registers, the CN notifies the (R)AN of this by providing the whole NSSAI allowed for the control plane region.

If a PDU session is established for a specific slice instance, the CN may provide the (R)AN with the S-NSSAI corresponding to the slice instance where the PDU session belongs so that the RN may perform an access-specific function.

A standardized SST value provides a method of establishing global interoperability for slicing to allow the PLMN to support more efficient scenarios of using roaming for the slice/service type mostly commonly used.

The standardized SST value is as shown in Table 2 below.

TABLE 2

| slice/service type | SST value | feature |
| --- | --- | --- |
| eMBB(enhanced MobileBroadband) | 1 | This is useful for normal customer space mobile broadband applications, including slices appropriate for 5G eMBB processing, high- quality video streaming, and quick high-volume file transmission, but is not limited thereto. This SST targets high-traffic density specified in the "performance requirements for high data rate and traffic density scenarios" of TS 22.261 [x] Table 7.1-1 and high data rate. |
| URLLC(ultra-reliable low latency communications) | 2 | Supports the URLLC for applications including industrial automation, (remote) control systems. This SST aims to support the "performance requirements for low-latency and high-reliability services" in TS 22.261 Table 7.2.2-1" related to high-reliability and low-latency scenarios. |
| MIoT(massive IoT) | 3 | Supports a high quantity and high-density support for Internet of things (IoT) device. |

Support for all these standardized SST values is not required in the PLMN.

Subscription information includes the S-NSSAI of the network slice where the UE subscribes. One or more S-NSSAIs may be marked as default S-NSSAIs. Up to eight S-NSSAIs may be marked as default S-NSSAIs. However, the UE may subscribe to eight or more S-NSSAIs. If an S-NSSAI is marked as default, the network expects to serve on the UE with a relevant network slice even though the UE transmits no S-NSSAI to the network in a registration request.

UE subscription data may include a default DNN value for a given S-NSSAI.

The NSSAI that the UE provides in the registration request is verified for the user's subscription data.

1) Network Slice Selection Upon Initial Access

A configured NSSAI may be set for the UE by the home PLMN (HPLMN) per PLMN. The configured NSSAI is PLMN-specific, and the HPLMN indicates the PLMN(s) to which each configured NSSAI is applied.

Upon the UE's initial connection, the RAN selects an initial network slice where it is to transfer a message via the NSSAI. To that end, in the registration procedure, the UE provides a requested NSSAI to the network. At this time, when the UE provides the requested NSSAI to the network, the UE uses only S-NSSAIs belonging to the configured NSSAI of a corresponding PLMN in the predetermined PLMN.

If the UE provides no NSSAI to the RAN or the RAN fails to select a proper network slice according to a given NSSAI, the RAN may select a default network slice.

The subscription data includes the S-NSSAI(s) of the network slice(s) where the UE subscribes. One or more S-NSSAI(s) may be marked as default S-NSSAIs. If an S-NSSAI is marked as default, although the UE transmits no S-NSSAI to the network in the registration request, the network may serve on the UE in a relevant network slice. The UE subscription data may include a default DNN value for a given S-NSSAI. The NSSAI that the UE provides in the registration request is verified for the user's subscription data.

If the UE successfully registers, the CN notifies the (R)AN of this by providing a whole allowed NSSAI (including one or more S-NSSAIs). Further, when the UE's registration procedure is successfully done, the UE may obtain the allowed NSSAI for this PLMN from the AMF.

The allowed NSSAI is prioritized over the configured NSSAI for this PLMN. Thereafter, the UE uses only the S-NSSAI(s) in the allowed NSSAI corresponding to the network slice for the network slice selection-related procedure in the serving PLMN.

In each PLMN, the UE stores the configured NSSAI and allowed NSSAI (if present). When the UE receives the allowed NSSAI for PLMN, it overrides the prior allowed NSSAI stored for this PLMN.

2) Slice Change

The network may change the already-selected network slice instance depending on local policy, UE mobility, or a change in subscription information. In other words, the UE's set of network slices may be varied anytime while the UE is in registration with the network. Further, a change in the UE's network slice set may be triggered by the network or by the UE under a specific condition.

The network may alter the set of allowed network slice(s) in which the UE registered based on local policy, a change in subscription information, and/or UE mobility. The network may perform such alteration during the registration procedure, or the network may notify the UE of a change in the network slice (s) supported using a procedure for triggering the registration procedure.

When the network slice changes, the network may provide a new allowed NSSAI and tracking area list to the UE. The UE triggers reselection of a slice instance by transmitting a new NSSAI in signaling according to a mobility management procedure. As the slice instance changes, the AMF supporting the same may be changed as well.

If the UE enters an area where the network slice is no longer available, the core network releases the PDU session for the S-NSSAI corresponding to the network slice which is no longer available via a PDU session release procedure.

When the PDU session corresponding to the slice which is no longer available is released, the UE determines whether existing traffic may be routed via the PDU session belonging to another slice using the UE policy.

To Change the Set of S-NSSAI(s) Used, the UE Initiates a Registration Procedure.

3) SMF Selection

The PCF provides the UE with a network slice selection policy (NSSP). The NSSP is used by the UE so as to associate the UE with the S-NSSAI and to determine a PDU session where traffic is to be routed.

A network slice selection policy is provided per application of the UE, and this includes a rule for mapping an S-NSSAI to each UE application. The AMF selects an SMF for PDU session management using, e.g., subscriber information or local service operator policy along with the DNN information and SM-NSSAI transferred by the UE.

To allow the RAN to access a specific function of slice instance when a PDU session is established for a specific slice instance, the CN provides the (R)AN with the S-NSSAI corresponding to the slice instance where the PDU session belongs.

4) UE NSSAI Setting and NSSAI Storage Area (Aspect)

The UE may be set with the configured NSSAI per PLMN by the HPLMN. The configured NSSAI may be PLMN-specific. The HPLMN includes information as to whether the configured NSSAI applies to all the PLMNs and indicates which PLMN(s) each configured NSSAI applies to (that is, the configured NSSAI may transfer the same information regardless of the PLMN where the UE is attached (e.g., this may be possible for the NSSAIs including only standardized S-NSSAIs). Upon registration, the UE of the PLMN given when providing the requested NSSAI to the network, if the corresponding PLMN is present, needs to use only the S-NSSAI which belongs to the configured NSSAI. If the UE's registration procedure is done, the UE may obtain, from the AMF, the allowed NSSAI for the PLMN which may include one or more S-NSSAIs. The S-NSSAI may be valid for the current registration region provided by the serving AMF in which the UE registers, and may be simultaneously used by the UE (to the maximum simultaneous network slice or PDU session number).

The allowed NSSAI is prioritized over the NSSAI configured for this PLMN. The UE needs to use only the S-NSSAIs of the allowed NSSAI corresponding to the network slice for a subsequent network slice selection-related procedure of the serving PLMN.

For each PLMN, the UE needs to store the configured NSSAI and (if possible) allowed NSSAI. If the UE receives the allowed NSSAI for the PLMN, the UE needs to store the allowed NSSAI for the PLMN and override the prior allowed NSSAI stored for the PLMN.

A configuration of user plane connection for data network via the network slice instance comes in two steps:
perform an RM procedure for selecting the AMF supporting a necessary network slice; and
establish one or more PDU sessions to the data network requested via the network slice instance(s).

5) Overview of Detailed Operations

When registering in the PLMN, the UE is required to provide the configured NSSAI, authorized NSSAI, or their subset, if storing, to the network of the NAS layer and RRC.

It may be determined whether the NSSAIs of the RRC and the NAS are identical to each other. Where the NSSAI is used to select an AMF, the S-NSSAI is used to assisting in selecting a network slice instance.

The UE is required to store the configured and/or authorized NSSAI per PLMN.

The configured NSSAI is configured for the UE by the HPLMN to be used by the PLMN when no PLMN-specific authorized NSSAI is stored in the UE.

Authorized NSSAI is an NSSAI provided to the UE by the PLMN in the registration procedure, and the UE is required to use the same in the PLMN until a next registration from the PLMN. The registration authorization message may include the authorized NSSAI. The authorized NSSAI may be updated by a subsequent registration procedure.

If the UE has received the configured NSSAI for the selected PLMN, the UE needs to include the NSSAI in RRC connection establishment and NAS. The RAN routes initial access using the received NSSAI.

If the UE has not yet received any allowed NSSAI for the selected PLMN but has received the configured NSSAI for the selected PLMN, the UE may provide the configured NSSAI or sub-set to the RRC connection establishment and NAS. The RAN uses the NSSAI to route initial access for the AMF.

If the UE provides no NSSAI (whether authorized or configured) for the selected PLMN in the RRC connection establishment and NAS, the RAN transmits NAS signaling to the default AMF.

If registration is successfully done, the UE receives a globally unique temporary UE identity (GUTI) by the serving AMF. The UE includes a locally unique temporary ID in the RRC connection establishment during subsequent initial access to allow one RAN whose Temp ID is valid to route a NAS message to a proper AMF. Further, the serving PLMN may return the recently authorized NSSAI of slices allowed by the serving PLMN for the UE. The authorized NSSAI includes S-NSSAIs of slices allowed by the serving PLMN of the UE.

When the RRC receives a whole locally unique temporary ID and the NSSAI, if the RAN may reach the AMF corresponding to the locally unique temporary ID, the RAN transfers a request to the AMF. Otherwise, the RAN selects a proper AMF based on the NSSAI received by the UE and transmits the request to the selected AMF. If the RAN may not select an AMF based on the received NSSAI, the request is transmitted to the default AMF.

The network operator may provide a network slice selection policy (NSSP) to the UE. The NSSP includes one or more NSSP rules that associate each application to a specific S-NSSAI. The NSSP may also include the default rule that matches all the applications to the S-NSSAI. When the UE application associated with a specific S-NSSAI sends a request for data transmission:
where the UE has one or more PDU sessions established to the specific S-NSSAI, the UE routes user data of the application in one of the PDU sessions as long as other conditions of the UE do not prohibit use of PDU sessions. If the application provides a DNN, the UE determines a PDU session to be used considering the DNN.

If the UE has no PDU session established to the specific S-NSSAI, the UE sends a request for a new PDU session along with the DNN providable by the application and the S-NSSAI. To select a proper resource for supporting network slicing in the RAN, the RAN needs to recognize the network slice used by the UE.

Based on the local policy, subscription change, and/or UE mobility, the network may alter the network slice set used by the UE by providing the UE with an authorized NSSAI change notification indicating a new NSSAI value. This triggers a UE-initiated reregistration procedure including a new NSSAI value that is provided by the network via RRC and NAS signaling.

The change in the slice set used by the UE (whether UE-initiated or network-initiated) may result in a change of the AMF depending on the operator's policy.

If the network slice set the UE may access is changed, and such slice is not used any longer (when some slices are potentially maintained), the set of original network slices and ongoing PDU session are terminated.

During the initial registration procedure, if the network determines that the UE needs to be served by another AMF, the AMF which has first received the initial registration request may redirect the initial registration request to another AMF via direct signaling between the initial AMF and a target AMF or via the RAN. The redirection message transmitted by the AMF via the RAN needs to contain information regarding the new AMF that is to serve on the UE.

For the already registered UE, the system is required to support redirection that is initiated from the serving AMF to the target AMF by the network of the UE.

Operator policy determines whether redirection between the AMFs is allowed.

If the network determines to redirect the UE due to a change in NSSAI, the network transmits an updated/new NSSAI to the UE using an RM procedure and sends a message to instruct the UE to start a registration update procedure with the updated/new NSSAI. The UE initiates a registration update procedure with the updated/new NSSAI.

The AMF selects an SMF in the network slice instance based on the S-NSSAI, DNN, and other information (e.g., UE subscription and local operator policy). The selected SMF establishes a PDU session based on the S-NSSAI and DNN.

In a roaming scenario, a network slice-specific network function of VPLMN and HPLMN is selected based on the S-NSSAI provided by the UE during PDU connection establishment as follows:

If a standardized S-NSSAI is used, selection of a slice specific-NF instance is carried out by each PLMN based on the received S-NSSAI.

Otherwise, the VPLMN maps the S-NSSAI of the HPLMN to the S-NSSAI of the VPLMN based on a roaming agreement (including mapping to the default S-NSSAI of the VPLMN). Selection of a slice-specific NF instance in the VPLMN is performed based on the S-NSSAI of the VPLMN, and selection of a slice-specific NF instance in the HPLMN is performed based on the S-NSSAI of the HPLMN.

UE with a Configured or Allowed NSSAI for PLMN

If, when the UE registers in the PLMN, there is a configured NSSAI or allowed NSSAI for the PLMN, the UE needs to provide a requested NSSAI including S-NSSAI(s) to the network (e.g., for the UE) of the RRC and NAS layer. At this time, if a temporary user ID has been allocated to the UE, the S-NSSAI(s) may correspond to the slice(s), which the UE intends to register, in addition to the temporary user ID.

The requested NSSAI may be one of the following:

Where the UE has no allowed NSSAI for the current PLMN, the configured NSSAI or its sub-set as described thereunder; or Where the UE has an allowed NSSAI for the current PLMN, the allowed NSSAI or its sub-set as described thereunder; or The allowed NSSAI or its subset as described thereunder, and the corresponding S-NSSAI in the allowed NSSAI are absent, and one or more S-NSSAIs from the configured NSSAI which has been previously non-rejected permanently by the network for the current tracking area.

If the S-NSSAI has permanently been rejected by the network for the current tracking area or has not previously been added by the UE in the requested NSSAI, the subset of the configured NSSAI is constituted of a S-NSSAI combination including one or more S-NSSAI(s) of the configured NSSAI applicable to the PLMN.

The subset of the allowed NSSAI is constituted of a S-NSSAI combination including one or more S-NSSAIs in the last allowed NSSAI for the PLMN.

The UE may provide the S-NSSAI from the configured NSSAI that the UE has previously provided to the serving PLMN in the current registration area.

The UE needs to include the requested NSSAI in the RRC connection establishment and NAS message. The RAN needs to route the NAS signal between the UE and the selected AMF using a requested NSSAI obtained during the RRC connection establishment. Where the RAN may not select an AMF based on the requested NSSAI, NAS signaling may be routed from a set of default AMFs to the AMF.

Unless the UE provides the requested NSSAI, the operation of the network is identical to what is described below in relation to the 'UE with no NSSAI for the PLMN.'

When registration succeeds, the UE receives a temporary ID from the serving AMF. The UE needs to include the temporary ID in all RRC connection establishments during subsequent initial access to be able to route the NAS signaling between the UE and a proper AMF.

The serving PLMN may also return a new allowed NSSAI for identifying the allowed network slice by the serving PLMN for the UE in the current registration area provided by the serving AMF considering the subscription information, RAN capability in the registration area, and other locally available information. The UE may store the new allowed NSSAI and override the same on the prior allowed NSSAI stored for the PLMN.

The network may individually reject the S-NSSAIs provided by the UE in the requested NSSAI which has the cause of the rejection. The network may also indicate whether the rejection is permanent (e.g., the S-NSSAI is not supported by the PLMN at least in the current registration area) or temporary (e.g., the network slice corresponding to the S-NSSAI is temporarily unavailable).

If the RAN may reach the AMF corresponding to the temporary ID when the RRC receives the requested NSSAI and the temporary ID, the RAN transfers a request to the AMF. Otherwise, the RAN selects a proper AMF based on the requested NSSAI received by the UE and transmits the request to the selected AMF. If the RAN may not select an AMF based on the requested NSSAI, the request is transmitted to the default AMF.

UE with No NSSAI for PLMN

If the UE has no configured NSSAI or allowed NSSAI for the PLMN when registering in the PLMN, the RAN needs to route all NAS signaling to/from the default AMF from/to the UE. Absent any configured NSSAI or allowed NSSAI for the PLMN, the UE should not indicate any NSSAI in the RRC connection establishment or initial NAS message. If registration succeeds, the UE may receive not only the temporary ID by the AMF in the PLMN but also an allowed NSSAI for identifying the allowed slice by the serving PLMN for the UE which is part of the default S-NSSAI(s).

The UE needs to include the temporary ID in all RRC connection establishments during subsequent initial access to be able to route the NAS signaling between the UE and a proper AMF.

Modification of Network Slice Set for UE

The set of network slices for the UE may be modified anytime while the UE is in registration with the network, it may be initiated by the network or UE under a specific condition as set forth below. It is assumed herein that a registration area allocated to the UE by the AMF should have homogeneous resources for the network slices.

The network may alter the set of allowed network slice(s) in which the UE registered based on local policy, a change in subscription information, and/or UE mobility. During the registration procedure, the network may perform such modification or trigger a notification to the UE regarding the network slice modification supported using an RM procedure (which may trigger the registration procedure). The network provides the UE with the new allowed NSSAI and tracking area list.

If the UE enters an area where the network slice is not available any longer, the CN may release the PDU session with the S-NSSAI corresponding to the slice, which is no longer available, via a network-triggered PDU session release procedure.

When the PDU session corresponding to the slice which is no longer available is released, the UE determines whether existing traffic may be routed via the PDU session belonging to another slice using the UE policy.

To change the set of S-NSSAI(s) used, the UE needs to initiate a registration procedure.

The change in the S-NSSAI set where the UE has been registered (whether UE-initiated or network-initiated) may result in a change of the AMF depending on the operator's policy.

AMF Relocation Due to Support of Network Slice

Where the network determines that the network should be served by a different AMF in terms of network slice during the PLMN registration procedure, the AMF which first receives a registration request needs to retransmit the registration request to another AMF via direct signaling between the initial AMF and target AMF or via the RAN. The redirection message transmitted by the AMF via the RAN needs to contain information for selecting a new AMF for serving ion the UE.

In the case of the already registered UE, the system needs to support redirection initiated from the serving AMF to the target AMF by the network of the UE due to network slice considerations. The operator policy may determine whether redirection is allowed between AMFs.

PDU Session Connection Establishment for Necessary Network Slice Instance(s)

In the network slice, establishment of a PDU session for the DN allows data transmission in the network slice. The data network is associated with the S-NSSAI and DNN.

The network operator may provide a network slice selection policy (NSSP) to the UE. The NSSP includes one or more NSSP rules, and each NSSP rule associates a specific S-NSSAI with an application. The NSSP may also include the default rule that matches all the applications to the S-NSSAI. When the UE application associated with a specific S-NSSAI sends a request for data transmission:

where the UE has one or more PDU sessions configured corresponding to the specific S-NSSAI, the UE routes user data of the application in one of the PDU sessions as long as other conditions of the UE do not prohibit use of PDU sessions. If the application provides a DNN, the UE determines a PDU session to be used considering the DNN.

If the UE has no PDU session established to the specific S-NSSAI, the UE sends a request for a new PDU session corresponding to the DNN providable by the application and the S-NSSAI. To select a proper resource for supporting network slicing in the RAN, the RAN needs to recognize the network slice used by the UE.

When the UE triggers establishment of a PDU session, the AMF selects an SMF in the network slice instance based on the S-NSSAI, DNN, and other information (e.g., UE subscription information and local operator policy). The selected SMF establishes a PDU session based on the S-NSSAI and DNN.

Slice Privacy Considerations

To support network-controlled privacy of slice information about the slice accessed by the UE when the UE recognizes that privacy considerations apply to the NSSAI or they are configured:

UE is not allowed to include NSSAI in NAS signaling as long as it has no NAS security context.

UE is forbidden from including NSSAI in unprotected RRC signaling.

Session Management

5GC supports a PDU connectivity service, that is, a service that provides the exchange of PDU(s) between a UE and a DN identified by a data network name (DNN) (or an access point name (APN)). The PDU connectivity service is also supported through a PDU session established upon request from the UE.

Each PDU session supports a single PDU session type. That is, when the PDU session is established, it supports the exchange of PDUs of a single type requested by a UE. The following PDU session types are defined. IP version 4 (IPv4), IP version 6 (IPv6), Ethernet, and unstructured. In this case, the type of PDUs exchanged between a UE and a DN are completely transparent in a 5G system.

A PDU session is established using NAS SM signaling exchanged between a UE and an SMF through N1 (upon UE request), modified (upon UE and 5GC request), and released (upon UE and 5GC request). Upon request from an application server, 5GC may trigger a specific application within a UE. When the UE receives a trigger message, it transfers the corresponding message to an identified application. The identified application may establish a PDU session with a specific DNN.

An SMF checks whether a UE request complies with user subscription information. To this end, the SMF obtains SMF level subscription data from UDM. Such data may indicate an accepted PDU session type for each DNN:

A UE registered through a plurality of accesses selects access for setting up a PDU session.

A UE may request to move a PDU session between 3GPP and non-3GPP access. A determination for moving the PDU session between 3GPP and non-3GPP access is made for each PDU session. That is, the UE may have a PDU session using 3GPP access while another PDU session uses non-3GPP access.

Within a PDU session setup request transmitted by a network, a UE provides a PDU session identity (ID). Furthermore, the UE may provide a PDU session type, slicing information, a DNN, service and a session continuity (SSC) mode.

A UE may establish a plurality of PDU sessions with the same DN or different DNs at the same time via 3GPP access and/or via non-3GPP access.

A UE may establish a plurality of PDU sessions with the same DN served by a different UPF end N6.

A UE having a plurality of established PDU sessions may be served by different SMFs.

The user plane path of a different PDU sessions belonging to the same UE (the same or different DNNs) may be fully separated between an UPF and AN interfacing with a DN.

5G system architecture can satisfy various continuity requirements of different application/services within a UE by supporting a session and service continuity (SCC). A 5G system supports different SSC modes. An SSC mode associated with a PDU session anchor is not changed while a PDU session is established.

In the case of a PDU session to which SSC Mode 1 is applied, a network maintains continuity service provided to a UE. In the case of a PDU session of an IP type, an IP address is maintained.

If SSC Mode 2 is used, a network may release continuity service delivered to a UE. Furthermore, the network may release a corresponding PDU session. In the case of a PDU session of an IP type, a network may release an IP address(es) allocated to a UE.

If SSC Mode 3 is used, a change of a user plane can be aware by a UE, but a network guarantees that the UE does not lose connectivity. In order to permit better service continuity, a connection through a new PDU session anchor point is established before a previous connection is terminated. In the case of a PDU session of an IP type, an IP address is not maintained while an anchor is deployed again.

An SSC mode selection policy is used to determine the type of SSC mode associated with an application (or application group) of a UE. An operator may previously configure an SSC mode selection policy in a UE. The policy includes one or more SSC mode selection policy rules which may be used for a UE to determine the type of SSC mode associated with an application (or a group of applications). Furthermore, the policy may include a default SSC mode selection policy rule which may be applied to all of applications of a UE.

If a UE provides an SSC mode when it requests a new PDU session, an SMF selects whether it will accept the requested SSC mode or whether it will modify the requested SSC mode based on subscription information and/or a local configuration. If a UE does not provide an SSC mode when it requests a new PDU session, an SMF selects a default SSC mode for data networks listed within subscription information or applies a local configuration for selecting an SSC mode.

An SMF notifies a UE of an SSC mode selected for a PDU session.

Mobility Management

Registration management (RM) is used to register or deregister a UE/user with/from a network and to establish user context within a network.

1) Registration Management

A UE/user needs to register a network in order to receive service that requests registration. Once the UE/user is registered, the UE may update its own registration with the network in order to periodically maintain reachability (periodical registration update) if applicable, upon moving (mobility registration update), or in order to update its own capability or negotiate a protocol parameter again.

An initial registration procedure includes the execution of a network access control function (i.e., user authentication and access authentication based on a subscription profile within UDM). As the results of the registration procedure, the ID of a serving AMF within the UDM is registered.

FIG. 13 illustrates RM state models to which the disclosure may be applied. Specifically, FIG. 13(a) shows an RM state model within a UE, and FIG. 13(b) shows an RM state model within an AMF.

Referring to FIG. 13, in order to reflect the registration state of a UE within a selected PLMN, two RM states of RM-DEREGISTERED and RM-REGISTERED are used within the UE and the AMF.

In the RM-DEREGISTERED state, the UE is not registered with a network. The valid location or routing information of UE context within the AMF is not maintained. Accordingly, the UE is not reachable by the AMF. However, for example, in order to prevent an authentication procedure from being executed for each registration procedure, some UE context may be still stored in the UE and the AMF.

In the RM-DEREGISTERED state, if the UE needs to receive service that requests registration, the UE attempts registration with a selected PLMN using the initial registration procedure. Alternatively, upon initial registration, when the UE receives a Registration Reject, the UE remains in the RM DEREGISTERED state. In contrast, when the UE receives the Registration Accept, it enters the RM-REGISTERED state.

In the RM-DEREGISTERED state, if applicable, the AMF accepts the initial registration of the UE by transmitting a Registration Accept to the UE, and enters the RM-REGISTERED state. Alternatively, if applicable, the AMF rejects the initial registration of the UE by transmitting a Registration Reject to the UE.

In the RM-REGISTERED state, the UE is registered with the network. In the RM-REGISTERED state, the UE may receive service that requests registration with the network.

In the RM-REGISTERED state, if the tracking area identity (TAI) of a current serving cell is not present within a list of TAIs that has been received by the UE from a network, the registration of the UE is maintained. The UE performs a mobility registration update procedure so that the AMF can page the UE. Alternatively, in order to notify a network that the UE is still in the active state, the UE performs a periodic registration update procedure when a periodical update timer expires. Alternatively, in order to update its own capability information or negotiate a protocol parameter with a network again, the UE performs a registration update procedure. Alternatively, if the UE does no longer require registration with a PLMN, the UE performs a deregistration procedure and enters the RM-DEREGISTERED state. The UE may determine deregistration from the network at any time. Alternatively, when the UE receives a Registration Reject message, a Deregistration message or performs a local deregistration procedure without the initiation of any signaling, it enters the RM-DEREGISTERED state.

In the RM-REGISTERED state, when the UE does no longer need to be registered with the PLMN, the AMF performs a deregistration procedure and enters the RM-DEREGISTERED state. The AMF may determine the deregistration of the UE at any time. Alternatively, after an implicit deregistration timer expires, the AMF performs implicit deregistration at any time. The AMF enters the RM-DEREGISTERED state after the implicit deregistration. Alternatively, the AMF performs local deregistration for the UE that has negotiated deregistration at the end of communication. The AMF enters the RM-DEREGISTERED state after local deregistration. Alternatively, if applicable, the AMF accepts or rejects registration update from the UE. The AMF may reject UE registration when it rejects the registration update from the UE.

Registration area management includes a function for allocating or re-allocating a registration area to the UE. The registration area is managed for each access type (i.e., 3GPP access or non-3GPP access).

When the UE is registered with a network through 3GPP access, the AMF allocates a set of tracking area (TA)(s) within a TAI list to the UE. When the AMF allocates a registration area (i.e., a set of TAs within the TAI list), the AMF may consider various types of information (e.g., a mobility pattern and an accepted/non-accepted area). The AMP having the whole PLMN or all of PLMNs as a serving area may allocate the whole PLMN, that is, a registration area, to the UE in the MICO mode.

A 5G system supports the allocation of a TAI list including different 5G-RAT(s) within a single TAI list.

When the UE is registered with a network through non-3GPP access, a registration area for the non-3GPP access corresponds to a unique reserved TAI value (i.e., dedicated to the non-3GPP access). Accordingly, there is a unique TA for the non-3GPP access to 5GC, which is called an N3GPP TAI.

When the TAI list is generated, the AMF includes only a TAI(s) applicable to access through which the TAI list has been transmitted.

2) Connection Management

Connection management (CM) is used to establish and release a signaling connection between the UE and the AMF. CM includes a function of establishing and releasing a signaling connection between the UE and the AMF through N1. The signaling connection is used to enable an NAS signaling exchange between the UE and a core network. The signaling connection includes both an AN signaling connection for the UE between the UE and the AN and an N2 connection for the UE between the AN and the AMF.

FIG. 14 illustrates CM state models to which the disclosure may be applied. Specifically, FIG. 14 (a) illustrates a CM state shift within a UE, and FIG. 14 (b) shows a CM state shift within an AMF.

Referring to FIG. 14, in order to reflect the NAS signaling connection of the UE with the AMF, two CM states of CM-IDLE and CM-CONNECTED are used.

The UE in the CM-IDLE state is the RM-REGISTERED state and does not have an NAS signaling connection established with the AMF through N1. The UE performs cell selection, cell reselection and PLMN selection.

An AN signaling connection, an N2 connection and an N3 connection for the UE in the CM-IDLE state are not present.

In the CM-IDLE state, if the UE is not in the MICO mode, it responds to paging by performing a Service Request procedure (if it has received it). Alternatively, when the UE has uplink signaling or user data to be transmitted, it performs a Service Request procedure. Alternatively, whenever an AN signaling connection is established between the UE and the AN, the UE enters the CM-CONNECTED state. Alternatively, the transmission of an initial NAS message (Registration Request, Service Request or Deregistration Request) starts to shift from the CM-IDLE state to the CM-CONNECTED state.

In the CM-IDLE state, if the UE is not in the MICO mode, when the AMF has signaling or the mobile-terminated data to be transmitted to the UE, it performs a network-triggered service request procedure by transmitting a paging request to the corresponding UE. Whenever an N2 connection for a corresponding UE between the AN and the AMF is established, the AMF enters the CM-CONNECTED state.

The UE in the CM-CONNECTED state has an NAS signaling connection with the AMF through N1.

In the CM-CONNECTED state, whenever the AN signaling connection is released, the UE enters the CM-IDLE state.

In the CM-CONNECTED state, whenever an N2 signaling connection and N3 connection for the UE are released, the AMF enters the CM-IDLE state.

When an NAS signaling procedure is completed, the AMF may determine to release the NAS signaling connection of the UE. When the AN signaling connection release is completed, the CM state within the UE changes to the CM-IDLE. When an N2 context release procedure is completed, the CM state for the UE within the AMF changes to the CM-IDLE.

The AMF may maintain the UE in the CM-CONNECTED state until the UE is deregistered from a core network.

The UE in the CM-CONNECTED state may be an RRC Inactive state. When the UE is in the RRC Inactive state, UE reachability is managed by an RAN using assistant information from a core network. Furthermore, when the UE is in the RRC Inactive state, UE paging is managed by the RAN. Furthermore, when the UE is in the RRC Inactive state, the UE monitors paging using the CN and RAN ID of the UE.

The RRC Inactive state is applied to an NG-RAN (i.e., applied to an NR and E-UTRA connected to 5G CN).

The AMF provides assistant information to the NG-RAN in order to assist the determination of the NG-RAN regarding whether the UE will be changed to the RRC Inactive state based on a network configuration.

The RRC Inactive assistant information includes a UE-specific discontinuous reception (DRX) value for RAN paging during the RRC Inactive state and a registration area provided to the UE.

CN assistant information is provided to a serving NG RAN node during N2 activation (i.e., registration, a service request or path switch).

The state of an N2 and the N3 reference point is not changed by the UE that enters the CM-CONNECTED state accompanied by RRC Inactive. The UE in the RRC Inactive state is aware of an RAN notification area.

When the UE is the CM-CONNECTED state accompanied by RRC Inactive, the UE may resume an RRC connection due to uplink data pending, a mobile-initiated signaling procedure (i.e., periodical registration update), a response to RAN paging, or when the UE notifies a network that it has deviated from the RAN notification area.

When the connection of the UE in a different NG-RAN node within the same PLMN resumes, UE AS context is recovered from an old NG RAN node, and the procedure is triggered toward a CN.

When the UE is in the CM-CONNECTED state accompanied by RRC Inactive, the UE performs cell selection on a GERAN/UTRAN/EPS and complies with an idle mode procedure.

Furthermore, the UE in the CM-CONNECTED state accompanied by RRC Inactive enters the CM-IDLE mode and complies with an NAS procedure related to the following cases.

If an RRC resumption procedure fails,

If a movement to the CM-IDLE mode of the UE is required within a failure scenario that cannot be solved in the RRC Inactive mode.

The NAS signaling connection management includes a function for establishing and releasing an NAS signaling connection.

The NAS signaling connection establishment function is provided by the UE and the AMF in order to establish the NAS signaling connection of the UE in the CM-IDLE state.

When the UE in the CM-IDLE state needs to transmit an NAS message, the UE initiates a service request or registration procedure in order to establish a signaling connection to the AMF.

The AMF may maintain the NAS signaling connection until the UE is deregistered from a network based on the preference of the UE, UE subscription information, a UE mobility pattern and a network configuration.

The procedure of releasing the NAS signaling connection is initiated by a 5G (R)AN node or the AMF.

When the UE detects the release of an AN signaling connection, the UE determines that the NAS signaling connection has been released. When the AMF detects that N2 context has been released, the AMF determines that the NAS signaling connection has been released.

3) UE Mobility Restriction

A mobility restriction restricts the service access or mobility control of a UE within a 5G system. A mobility restriction function is provided by a UE, an RAN and a core network.

The mobility restriction is applied to only 3GPP access, but is not applied to non-3GPP access.

In the CM-IDLE state and the CM-CONNECTED state accompanied by RRC Inactive, a mobility restriction is performed by a UE based on information received from a core network. In the CM-CONNECTED state, a mobility restriction is performed by an RAN and a core network.

In the CM-CONNECTED state, a core network provides a handover restriction list for a mobility restriction to an RAN.

The mobility restriction includes an RAT restriction, a forbidden area and a service area restriction as follows:
  RAT restriction: the RAT restriction is defined as a 3GPP RAT(s) whose access of a UE is not permitted. A UE within a restricted RAT is not allowed to initiate any communication with a network based on subscription information.
  Forbidden area: a UE is not allowed to initiate any communication with a network based on subscription information within a forbidden area under a specific RAT.
  Service area restriction: it defines an area in which a UE can initiate cannot initiate communication with a network as follows:
  Allowed area: if a UE is allowed by subscription information within an allowed area under a specific RAT, the UE is allowed to initiate communication with a network.
  Non-allowed area: a service area for a UE is restricted based on subscription information within a non-allowed area under a specific RAT. The UE and the network are not allowed to initiate session management signaling for obtaining a service request or user service (both the CM-IDLE state and the CM-CONNECTED state). The RM procedure of the UE is the same as that in the allowed area. A UE within a non-allowed area responds to the paging of a core network as a service request.

In a specific UE, a core network determines a service area restriction based on UE subscription information. Optionally, an allowed area may be fine-tuned by a PCF (e.g., based on a UE location, a permanent equipment identifier (PEI) or a network policy). The service area restriction may be changed due to subscription information, a location, a PEI and/or a policy change, for example. The service area restriction may be updated during a registration procedure.

If a UE has an RAT restriction, a forbidden area, an allowed area, a non-allowed area or an area overlapping between them, the UE performs an operation according to the following priority:
  The evaluation of the RAT restriction has precedence over the evaluation of any other mobility restriction;
  The evaluation of the forbidden area has precedence over the evaluation of the allowed area and the non-allowed area; and
  The evaluation of the non-allowed area has precedence over the evaluation of the allowed area.

4) Mobile Initiated Connection Only (MICO) Mode

A UE may indicate the preference of the MICO mode during initial registration or registration update. The AMF determines whether the MICO mode is permitted for the UE based on a local configuration, the preference indicated by the UE, UE subscription information and a network policy or a combination of them, and notifies the UE of the results during a registration procedure.

A UE and a core network re-initiates or exits from the MICO mode in the following registration signaling. If the MICO mode is not clearly indicated within a registration procedure and a registration procedure is successfully completed, the UE and the AMF do not use the MICO mode. That is, the UE operates as a general UE, and the network also treats a corresponding UE as a general UE.

The AMF allocates a registration area to a UE during a registration procedure. When the AMF indicates the MICO mode for the UE, the registration area is not restricted as a paging area size. If the AMF serving area is the whole PLMN, the AMF may provide the UE with the "whole PLMN" registration area. In this case, re-registration with the same PLMN attributable to mobility is not applied. If a mobility restriction is applied to a UE in the MICO mode, the AMF allocates an allowed area/non-allowed area to the UE.

When the AMF indicates the MICO mode for the UE, the AMF considers that the UE is always unreachable during the CM-IDLE state. The AMF rejects any request for downlink data transfer for a corresponding UE that is in the MICO mode and the CM-IDLE state. The AMF also delays downlink transport, such as SMS or location service through the NAS. A UE in the MICO mode may be reachable for mobile-terminated data or signaling only when the UE is in the CM-CONNECTED mode.

The AMF may provide an RAN node with pending data indication when a UE in the MICO mode can immediately transport mobile-terminated data and/or signaling when the UE switches to the CM-CONNECTED mode. When the RAN node receives the indication, the RAN node considers the information when it determines user inactivity.

A UE in the MICO mode does not need to listen to paging during the CM-IDLE state. The UE in the MICO mode may stop any AS procedure within the CM-IDLE state until it starts switching from the CM-IDLE to the CM-CONNECTED mode due to one of the following reasons.
  If a change (e.g., configuration change) within the UE requires registration update to a network
  If a periodic registration timer expires
  If MO data is pending
  If MO (Mobile Originating) signaling is pending
  Quality of Service (QoS) Model QoS is a technology for the smooth transfer service of various traffic (mail, data transmission, audio and video) to a user depending on each character.

A 5G QoS model supports a framework-based QoS flow. The 5G QoS model supports both a QoS flow that requires a guaranteed flow bit rate (GFBR) and a QoS flow that does not require the GFBR.

The QoS flow is the finest granularity for QoS classification in a PDU session.

A QoS flow ID (QFI) is used to identify a QoS flow within a 5G system. The QFI is unique within a PDU session. User plane traffic having the same QFI within a PDU session receives the same traffic transfer processing (e.g., scheduling and an admission threshold). The QFI is transferred within an encapsulation header on N3 (and N9). The QFI may be applied to a different payload type of a PDU (i.e., an IP packet, unstructured packet and Ethernet frame).

In this specification, for convenience of description, "QoS" and a "QoS flow" are interchangeably used. Accordingly, in this specification, "QoS" may be construed as meaning a "QoS flow", and "QoS" may be construed as meaning a "QoS flow."

Within a 5G system, QoS flows may be controlled by an SMF upon PDU session setup or QoS flow establishment/ modification.

If applicable, all of QoS flows have the following characteristics:

QoS profile previously configured in the AN or provided from the SMF to the AN via the AMF through the N2 reference point;

One or more networks provided from the SMF to the UE via the AMF through the N1 reference point—provided QoS rule(s) and/or one or more UE-derived QoS rule(s)

SDF classification provided from the SMF to the UPF through the N4 reference point and QoS-related information (e.g., session-aggregate maximum bit rate (AMBR)).

The QoS flow may become a "guaranteed bit rate (GBR)" or a "non-guaranteed bit rate (non-GBR)" depending on the QoS profile. The QoS profile of the QoS flow includes the following QoS parameters:

i) With respect to each of QoS flows, QoS parameters may include the followings:

5G QoS indicator (5QI): the 5QI is a scalar for referring to 5G QoS characteristics (i.e., control QoS transfer handling access node-specific parameters for a QoS flow, for example, scheduling weight, an admission threshold, a queue management threshold and a link layer protocol configuration).

Allocation and retention priority (APR): the ARP includes a priority level, a pre-emption capability and pre-emption vulnerability. The priority level defines the relative importance of a resource request. This is used to determine whether a new QoS flow will be accepted or rejected if resources are restricted and is used to determine whether the existing QoS flow will pre-empt resources while the resources are restricted.

ii) Furthermore, only in the case of each GBR QoS flow, QoS parameters may further include the followings:

GFBR—the uplink and downlink;

Maximum flow bit rate (MFBR)—the uplink and downlink; and

Notification control.

iii) Only in the case of a non-GBR QoS flow, QoS parameters may further include the following: Reflective QoS attribute (RQA)

There are supported methods of controlling the following QoS flows:

1) In the case of the non-GBR QoS flow: if a standardized 5QI or a previously configured 5QI is used, a 5QI value is used as the QFI of the QoS flow and a default ARP is previously configured in the AN;

2) In the case of the GBR QoS flow: if a standardized 5QI or a previously configured 5QI is used, a 5QI value is used as the QFI of the QoS flow. A default ARP is transmitted to the RAN when a PDU session is established. Whenever the NG-RAN is used, the user plane (UP) of the PDU session is activated;

3) In the case of the GBR and non-GBR QoS flow: an allocated QFI is used. A 5QI value may be standardized, previously configured or not standardized. The QoS profile and QFI of the QoS flow may be provided to the (R)AN through N2 when a PDU session is established or when a QoS flow is established/changed. Whenever the NG-RAN is used, the user plane (UP) of the PDU session is activated.

A UE may perform the marking and classification (i.e., the association of UL traffic for a QoS flow) of UL user plane traffic based on a QoS rule. Such rules may be explicitly provided to the UE (when a PDU session is established or a QoS flow is established) or may have been previously configured in the UE or may be implicitly derived by the UE by applying reflective QoS.

The QoS rule may include a unique QoS rule ID within a PDU session, the QFI of an associated QoS flow, and one or more packet filters and precedence value. Additionally, with respect to an allocated QFI, the QoS rule may include QoS parameters related to a UE. One or more QoS rules associated with the same QoS flow (i.e., having the same QFI) may be present.

The default QoS rule may be necessary for all of PDU sessions. The default QoS rule may be a unique QoS rule of a PDU session that may not include a packet filter (In this case, the highest precedence value (i.e., the lowest priority) should be used). If the default QoS rule does not include a packet filter, the default QoS rule defines the processing of packets not matched with another QoS rule in a PDU session.

The SMF performs binding between SDFs for a QoS flow depending on the QoS of an SDF and service requirements. The SMF allocates a QFI to a new QoS flow, and derives the QoS parameter of the new QoS flow from information provided by the PCF. If applicable, the SMF may provide an (R)AN with a QFI along with a QoS profile. The SMF provides an SDF template (i.e., a set of packet filters associated with the SDF received from the PCF) along with SDF priority, QoS-related information and corresponding packet marking information (i.e., a QFI, a differentiated services code point (DSCP) value and optionally enables the classification, bandwidth application and marking of user plane traffic using reflective QoS indication for a UPF). If applicable, the SMF generates QoS rule(s) for a PDU session by allocating unique QoS rule IDs within a PDU session to which the QFI of a QoS flow has been added, configuring packet filter(s) for the UL part of the SDF template, and setting QoS rule priority in the SDF priority. The QoS rule is provided to a UE that enables the classification and marking of UL user plane traffic.

FIG. 15 illustrates classification and user plane marking for a QoS flow and the mapping of a QoS flow to AN resources according to an embodiment of the disclosure.

1) Downlink

An SMF allocates a QFI for each QoS flow. Furthermore, the SMF derives QoS parameters from information provided by a PCF.

The SMF provides an (R)AN with the QFI along with a QoS profile including the QoS parameters of a QoS flow. Furthermore, when a PDU session or QoS flow is established, the QoS parameters of the QoS flow is provided to the (R)AN as the QoS profile through N2. Furthermore, whenever an NG-RAN is used, a user plane is activated. Furthermore, QoS parameters may be previously configured in the (R)AN for a non-GBR QoS flow.

Furthermore, the SMF provides an UPF with an SDF template (i.e., a set of packet filters associated with the SDF received from the PCF) along with SDF preference and a corresponding QFI so that the UPF can perform the classification and marking of a downlink user plane packet.

Downlink inflow data packets are classified based on the SDF template according to the SDF preference (without the initiation of additional N4 signaling). A CN classifies user plane traffic belonging to a QoS flow through N3 (and N9) user plane marking using the QFI. The AN binds the QoS flow with AN resources (i.e., a DRB in the case of the 3GPP RAN). In this case, a relation between the QoS flow and the AN resources is not restricted to 1:1. The AN may configure the AN resources necessary to map a QoS flow to a DRB so that a UE may receive the QFI (and reflective QoS may be applied).

If matching is not discovered, when all of QoS flows are related to one or more DL packet filters, the UPF may discard a DL data packet.

Characteristics applied to process downlink traffic are as follows:

The UPF maps user plane traffic to the QoS flow based on the SDF template.

The UPF performs session-AMBR execution and performs PDU counting for charging support.

The UPF may transmit the PDUs of a PDU session in a single tunnel between 5GC and the (A)AN, and the UPF may include the QFI in an encapsulation header.

The UPF performs transmission level packet marking in the downlink (e.g., sets DiffServ code in an outer IP header). Transmission level packet marking is based on 5QI and the ARP of an associated QoS flow.

The (R)AN maps PDUs from a QoS flow to access-specific resources based on a QFI, related 5G QoS characteristics and parameters by considering an N3 tunnel associated with a downlink packet.

If reflective QoS is applied, a UE may generate a new derived QoS rule (or may be called a "UE-derived QoS rule"). A packet filter within the derived QoS rule may be derived from a DL packet (i.e., the header of the DL packet). The QFI of the derived QoS rule may be configured depending on the QFI of the DL packet.

2) Uplink

The SMF generates QoS rule(s) for a PDU session by allocating a QoS rule ID, adding the QFI of a QoS flow, setting packet filter(s) in the uplink part of an SDF template, and setting QoS rule precedence in SDF precedence. The SMF may provide a UE with the QoS rules in order for the UE to perform classification and marking.

The QoS rule includes a QoS rule ID, the QFI of a QoS flow, one or more packet filters and preference values. The same QFI (i.e., the same QoS flow) and one or more QoS rules may be associated.

A default QoS rule is required for each PDU session. The default QoS rule is the QoS rule of a PDU session not including a packet filter (In this case, the highest precedence value (i.e., the lowest priority) is used). If the default QoS rule does not include a packet filter, the default QoS rule defines the processing of a packet not matched with any another QoS rule within the PDU session.

The UE performs the classification and marking of uplink user plane traffic. That is, the UE associates uplink traffic with the QoS flow based on the QoS rule. The rule may be explicitly signaled through N1 (when a PDU session is established or when a QoS flow is established or may be previously configured in the UE or may be implicitly derived by the UE from reflected QoS.

In the UL, the UE evaluates an UL packet with respect to the packet filter of the QoS rule based on the precedence value of the QoS rule (i.e., in order of increasing precedence value) until a matching QoS rule (i.e., the packet filter is matched with the UL packet) is discovered. The UE binds the UL packet to the QoS flow using a QFI in the corresponding matching QoS rule. The UE binds the QoS flow and the AN resources.

If matching is not discovered and a default QoS rule includes one or more UL packet filters, the UE may discard an UL data packet.

Characteristics applied to process uplink traffic are as follows:

A UE may use stored QoS rules in order to determine mapping between UL user plane traffic and a QoS flow. The UE may mark an UL PDU with the QFI of a QoS rule including a matching packet filter, and may transmit the UL PDU using corresponding access-specific resources for a QoS flow based on mapping provided by an RAN.

The (R)AN transmits the PDU through an N3 tunnel with respect to an UPF. When an UL packet passes through a CN from the (R)AN, the (R)AN includes a QFI in the encapsulation header of the UL PDU and selects the N3 tunnel.

The (R)AN may perform transmission level packet marking in the uplink. The transmission level packet marking may be based on the ARP of a QoS flow associated with a 5QI.

A UPF checks whether the QFIs of UL PDUs are provided to the UE or are aligned (e.g., in the case of reflective QoS) with QoS rules implicitly derived by the UE.

The UPF performs session-AMBF execution and counts a packet for charging.

In the case of an UL classifier PDU session, UL and DL session-AMBRs need to be performed on an UPF that supports an UL classifier function. Furthermore, the DL session-AMBR needs to be separately performed in all of UPFs that terminate an N6 interface (i.e., an interaction between UPFs is not required).

In the case of a multi-home PDU session, UL and DL session-AMBRs are applied to an UPF that supports a branch point function. Furthermore, the DL session-AMBR needs to be separately performed in all of UPFs that terminate the N6 interface (i.e., an interaction between UPFs is not required).

The (R)AN needs to perform a maximum bit rate (UE-AMBR) restriction in the UL and DL for each non-GBR QoS flow. When the UE receives a session-AMBR, it needs to perform a PDU session-based UL rate restriction for non-GBR traffic using the session-AMBR. The rate restriction execution for each PDU session is applied to a flow that does not require a guaranteed flow bit rate. The MBR per SDF is mandatory to a GBR QoS flow, but is optional for a non-GBR QoS flow. The MBR is performed in the UPF.

QoS control for an unstructured PDU is performed in a PDU session level. When the PDU session is established for the transmission of the unstructured PDU, the SMF provides the UPF and the UE with a QFI to be applied to any packet of the PDU session.

MM/SM Separation

In a core network of 5th generation system (5GS), a network node (AMF) managing a mobility and a network node (SMF) managing a session have been divided as separate functions. If MME has played a main role of a control plane in the existing EPC, etc., entity/node has been modularized and divided per main function in 5GC. That is, in the 5GS, it may be considered that the existing MME has been divided into an AMF responsible for a mobility management function and a SMF responsible for a session management function.

The SMF managing each session is responsible for SM related NAS layer message and procedure, and the AMF is responsible for an overall mobility management (MM) including a registration management (RM) and a connection management (CM) of the UE itself. The roles of the AMF and the SMF currently defined in TS 23.501 are as follows.

1. AMF

The AMF includes the following functionality. Some or all of the AMF functionalities may be supported in a single instance of the AMF:

Termination of RAN CP interface (N2)
Termination of NAS (N1), NAS ciphering and integrity protection
Registration management
Connection management
Reachability management
Mobility management
Lawful intercept (for AMF events and interface to LI System)
Transparent proxy for routing SM messages
Access authentication
Access authorization
Security Anchor Function (SEA): The SEA interacts with the AUSF and the UE and receives an intermediate key that is established as a result of the UE authentication process. In case of USIM based authentication, the AMF retrieves the security material from the AUSF.
Security Context Management (SCM): The SCM receives a key from the SEA that it uses to derive access-network specific keys.
Regardless of the number of network functions, there is only one NAS interface instance per access network between the UE and the CN, and terminated at one of the Network functions that implements at least NAS security and mobility management.

In addition to the functionalities of the AMF described above, the AMF may include the following functionality to support non-3GPP access networks:

Support of N2 interface with N3IWF. Over this interface, some information (e.g., 3GPP cell identification) and procedures (e.g., hand-over related) defined over 3GPP access may not apply, and non-3GPP access specific information may be applied that do not apply to 3GPP accesses.
Support of NAS signaling with a UE over N3IWF. Some procedures supported by NAS signaling over 3GPP access may be not applicable to untrusted non-3GPP (e.g., paging) access.
Support of authentication of UEs connected over N3IWF.
Management of mobility and authentication/security context state(s) of a UE connected via non-3GPP access or connected via 3GPP and non-3GPP accesses simultaneously.
Support of a coordinated RM management context valid over 3GPP and non-3GPP accesses.
Support of dedicated CM management contexts for the UE for connectivity over non-3GPP access.

Not all of the functionalities are required to be supported in an instance of a network slice.

2. SMF

The session management function (SMF) includes the following functionality. Some or all of the SMF functionalities may be supported in a single instance of a SMF:

Session management (e.g., session establishment, modification, and release, including tunnel maintenance between the UPF and an AN node.
UE IP address allocation and management (including optional authorization).
Selection and control of UP function.
Configuring traffic steering at UPF to route traffic to proper destination.
Termination of interfaces towards policy control functions.
Controlling part of policy enforcement and QoS.
Lawful intercept (for SM events and interface to LI System).
Termination of SM parts of NAS messages.
Downlink data notification.
Initiator of AN specific SM information, sent via AMF over N2 to AN.
Determining SSC mode of a session (for IP type PDU session)
Roaming functionality:
Handling local enforcement to apply QoS SLAB (VPLMN).
Charging data collection and charging interface (VPLMN).
Lawful intercept (in VPLMN for SM events and interface to LI System).
Support for interaction with external DN for transport of signaling for PDU session authorization/authentication by external DN.

Not all of the functionalities are required to be supported in an instance of a network slice.

In order to start a SM procedure, in the same manner as the existing procedure, a CM-CONNECTED state, i.e., secure signaling connection between the UE and the CN should be necessarily established. A SM NAS message shall go through the AMF, but the SM NAS message is transparent to the AMF. That is, the AMF cannot decrypt or recognize the contents of the SM NAS message itself passing through the AMF. Thus, if there are several SMFs, the AMF needs to be separately instructed as to which SMF forwards/routes the NAS message. To this end, information for separate forwarding/routing may be added to the outside of the SM NAS message.

If a PDU session has been already created, a PDU session ID of the corresponding PDU session may be represented in a part (particularly, outside the SM NAS message) that the AMF can decrypt, and the AMF can find/recognize the SMF to forward/route the message based on this. In this instance, a mapping table scheme, etc. may be used. If a PDU session is not created, the AMF may perform a SMF selection function in consideration of information such as DNN and S-NSSAI, in order to select an appropriate SMF. Information that is used for the AMF to select the appropriate SMF may be represented, by the UE, in the part that the AMF can decrypt/recognize and may be provided to the AMF.

Registration Procedure

For 4th generation communication, the attach TAU procedure (in TS 23.401) is performed to register a UE in the EPS/LTE system or to maintain the registered state. In 5G systems, a unified registration procedure for the attach procedure and TAU procedure is carried out which is defined in TS 23.502 as follows. However, the registration procedure may be divided into/called an initial registration procedure (attach), registration update procedure (TAU), or periodic registration update procedure (p-TAU).

Whether it is possible to establish a session during the registration procedure is currently under discussion. There may be a scheme in which an SM procedure is entered immediately after an RM procedure ends and a scheme in which transmission is performed with an SM message piggybacked like in EPS technology.

The registration procedure currently specified in TS 23.502 V0.2.0 is as shown in FIG. 17.

FIG. 17 is a flowchart illustrating a registration procedure applicable to the disclosure.

1. UE to (R)AN: AN message (AN parameter, registration request (registration type, subscriber permanent identifier (SUPI) or temporary user ID, security parameter, NSSAI, UE SGCN capability, PDU session state)).

In the case of 5G-RAN, the AN parameter includes, e.g., the SUPI, temporary user ID, selected network and/or NSSAI.

The reregistration type may indicate whether the UE desires to perform "initial registration (i.e., the UE is in the non-registered state)," "mobility registration update (i.e., the UE is in the registered state and initiates the registration procedure due to mobility)," or "periodic registration update (i.e., the UE is in the registered state and initiates the registration procedure due to expiration of the periodic update timer)." If included, the temporary user ID may indicate the last serving AMF. Where the UE has already been registered in a PLMN other than the 3GPP access PLMN via non-3GPP access, the UE should not use the UE temporary ID allocated by the AMF during the registration procedure via non-3GPP access.

The security parameter is used for authentication and integrity protection. The NSSAI indicates network slice selection assistance information. The PDU session state indicates PDU sessions (previously established) available to the UE.

2. Where the SUPI is included or the temporary user ID does not indicate a valid AMF and/or (R)AN, an AMF is selected based on the (R)AT and NSSAI. The (R)AN selects an AMF as described in TS 23.501. Where the (R)AN is unable to select an AMF, a registration request is transferred to the default AMF. The default AMF is in charge of selection of a proper AMF for the UE. The relocation between the default AMF and the selected AMF is described in Chapter 4.2.2.2.3, and the initial AMF refers to the default AMF, and the target AMF refers to the selected AMF.

3. From (R)AN to AMF: N2 message (N2 parameter, registration request (registration type, subscriber permanent identifier or temporary user ID, security parameter, NSSAI)).

When a 5G-RAN is used, the N2 parameter includes location information related to the cell where the UE is camping, cell identifier, and RAT type.

If the registration type indicated by the UE is periodic registration update, steps 4 to 17 may be omitted.

4. [Conditional] From new AMF to old AMF: Information request (complete registration request).

Where the UE's temporary user ID is included in the registration request, and the serving AMF is changed after the last registration, the new AMF may transmit an information request containing a complete registration request information element (IE) to request the UE's SUPI and MM context.

5. [Conditional] From old AMF to new AMF: Information response (SUPI, MM context, SMF information). The old AMF responds to the new AMF including the UE's SUPI and MM context by information response. Where the old AMF has information about an activated PDU session, the old AMF includes SMF information containing the SMF ID and PDU session ID.

6. [Conditional] From AMF to UE: Identification request ( ).

If no SUPI is provided by the UE or is retrieved from the old AMF, an identification request procedure is initiated by the AMF which transmits an identification request message to the UE.

7. [Conditional] From UE to AMF: Identification response ( ).

The UE responds by an identification response message containing the SUPI.

8. The AMF may determine to invoke the AUSF. In this case, the AMF may select the AUSF based on the SUPI.

9. The AUSF needs to initiate the authentication of UE and NAS security function.

An AMF relocation procedure (e.g., due to network slicing) may occur after step 9.

10. [Conditional] From new AMF to old AMF: Information reception acknowledgement (acknowledged) ( ).

When the AMF is changed, the new AMF acknowledges receipt of transfer of the UE MM context. If the authentication/security procedure fails, registration is rejected, and the new AMF sends a rejection indication to the old AMF. The old AMF continues the procedure as if no information request has been received.

11. [Conditional] From AMF to UE: Identification request ( ).

If no PEI is provided by the UE or is retrieved from the old AMF, an identification request procedure is initiated as the AMF sends an identification request message for retrieving the PEI to the UE.

12. Optionally, the AMF initiates ME identification. PEI identification is performed as described in Chapter 4.7.

13. Where step 14 is performed, the AMF selects a UDM based on the SUPI.

The AMF selects a UDM as described in TS 23.501.

14. If the AMF is changed after the last registration, the AMF lacks a valid subscription context for the UE, or the UE provides a SUPI that does not refer to a valid context in the AMF, the AMF may initiate a location update procedure. This includes the case where the UDM initiates a 'cancel location' for the old AMF. The old AMF removes the MM context and notifies of all possible associated SMF(s), and the new AMF, after obtaining AMF-related subscription data from the UDM, may create an MM context for the UE. The update location procedure may be carried out as per TS 23.501.

The PEI is provided to the UDM in the update location procedure.

15. Conditionally, the AMF selects a PCF based on the SUPI. The AMF selects a PCF as described in TS 23.501 [2].

16. [Optional] From AMF to PCF: UE context establishment request ( ).

The AMF requests the PCF to apply the operator policy for the UE.

17. From PCF to AMF: UE context establishment acknowledgement ( ).

The PCF responds to the UE context establishment request message by acknowledgement.

18. [Conditional] From AMF to SMF: N11 request ( ).

If the AMF is changed, the new AMF notifies each SMF of the new AMF that serves on the UE.

The AMF verifies the PDU session state from the UE with available SMF information. Where the AMF is changed, available SMF information may be received from the old AMF. The AMF may request the SMF to release all network resources related to the PDU session which is not in the active state in the UE.

19. From SMF to AMF: N11 response ( ).

The SMF may determine to trigger, e.g., UPF relocation. If the registration type indicated by the UE is periodic registration update, steps 20 to 21 may be omitted.

20. [Conditional] From AMF to PCF: UE context termination request ( ).

Where the old AMF has previously requested establishment of the UE context in the PCF, the old AMF terminates the UE context in the PCF.

21. From AMF to PCF: UE context termination acknowledgement ( ).

22. From AMF to UE: Registration authorization (temporary user ID, registration area, mobility restriction, PDU session state, NSSAI, periodic registration update timer).

The AMF transmits a registration authorization message, which indicates that registration has been approved, to the UE. Where the AMF allocates a new temporary user ID, a temporary user ID is included. Where mobility restriction applies to the UE, a mobility restriction is included. The AMF indicates the PDU session state to the UE. The UE removes any internal resources related to the PDU session which is not marked as active in the received PDU session state. If PDU session state information is in the registration request, the AMF needs to indicate the PDU session state to the UE. The NSSAI includes authorized S-NSSAIs.

23. [Conditional] From UE to AMF: Registration complete ( ).

To identify whether a new temporary user ID has been allocated, the UE transmits a registration complete message to the AMF.

PDU Session Establishment for 5G

For a PDU session configuration procedure, two types of PDU session configurations are present.

UE-initiated PDU session establishment procedure

Network-initiated PDU session establishment procedure

In this case, the network transmits a device trigger message to the application(s) of the UE. The trigger payload contained in the device trigger request message contains information predicted for the application of the UE to trigger a PDU session establishment request. The application(s) of the UE triggers a PDU session establishment procedure based on the information.

If the UE is simultaneously registered in non-3GPP access via the N3IWF located in a PLMN other than the PLMN of 3GPP access, the functional entity of the next procedure is located in the PLMN of 3GPP access for non-roaming and LBO scenario.

FIG. 18 illustrates an example UE-requested PDU session establishment procedure for roaming and non-roaming with a local breakout applicable to the disclosure.

The instant procedure specifies PDU session establishment in roaming and non-roaming with a local breakout. This procedure is used to override the existing PDU session between 3GPP access and non-3GPP access as well as to establish a new PDU session.

In the case of roaming, the AMF determines whether a PDU session is established in local breakout (LBO) or home routing. In the case of LBO, the procedure is identical to that for non-roaming except that the SMF, UPF, and PCF are located in the visited network.

The instant procedure assumes that the UE has already been registered in the AMF and the AMF has retrieved user subscription data from the UDM.

1. From UE to AMF: NAS message (S-NSSAI, DNN, PDU session ID, request type, N1 SM information).

To establish a new PDU session, the UE creates a new PDU session ID.

The UE initiates a UE-requested PDU session establishment procedure by sending out a NAS message containing a PDU session establishment request in the N1 SM information. The PDU session establishment request may include a PDU type, SSC mode, or protocol configuration option.

The request type indicates an "initial request" if the PDU session establishment is a request to establish a new PDU session and an "existing PDU session" if the request indicates the existing PDU session between 3GPP access and non-3GPP access.

The NAS message transmitted by the UE is encapsulated by the AN into an N2 message for the AMF which needs to include user location information and access technology type information.

The N1 SM information may include an SM PDU DN request container that contains information about assigning a PDU session authority by an external DN.

The AMF receives, from the AN, a NAS SM message (created in step 1) along with user location information (e.g., cell ID in the case of RAN).

2. As the request type indicates an "initial request," the message corresponds to a request for the new PDU session, and the AMF may determine a PDU session ID not used by any existing PDU session of the UE. If the NAS message includes no S-NSSAI, the AMF may determine the default S-NSSAI for the requested PDU session according to the UE subscription information. The AMF selects an SMF. The AMF stores an association between the PDU session ID and the SMF ID.

If the request type indicates the "existing PDU session," and the AMF fails to recognize the PDU session ID or the subscription context of UDM lacks the SMF ID corresponding to the DNN, an error occurs.

3. From AMF to SMF: SM request (subscriber permanent ID, DNN, S-NSSAI, PDU session ID, AMF ID, N1 SM information (PDU session ID, PDU session configuration request), user location information, access technology type, PEI).

The AMF ID uniquely identifies the AMF which serves on the UE. The N1 SM information includes a PDU session establishment request received from the UE.

4a. From SMF to UDM: subscription information data request (subscriber permanent ID, DNN).

Where the request type of step 3 indicates "existing PDU session," the SMF determines that the request is one resulting from handover between 3GPP access and non-3GPP access. The SMF identifies the existing PDU session based on the PDU session ID.

Where the SMF has not yet retrieved the SM-related subscription data for the UE related to the DNN, the SMF sends a request for subscription data.

4b. From UDM to SMF: subscription information data response.

The subscription information data includes an authenticated PDS type, authenticated SSC mode, and default QoS profile.

The SMF inspects whether a UE request is compatible with user subscription and local policy. Unless compatible, the SMF rejects the UE request via NAS SM signaling (including the relevant cause of SM rejection) relayed by the AMF, and the SMF instructs the AMF to regard the PDU session ID as released and skip the remaining procedure.

5. From SMF through UPF to DN

Where the SMF needs to authorize/authenticate PDU session establishment, the SMF selects a UPF and triggers PDU session establishment authorization/authentication.

If PDU session establishment authorization/authentication fails, the SMF terminates the PDU session establishment procedure and indicates rejection to the UE.

6a. If dynamic policy and charging control (PCC) is distributed, the SMF performs PCF selection.

6b. The SMF may start to establish a PDU-CAN session towards the PCF to obtain a default PCC rule for PDU session. If the request type of step 3 indicates the "existing PDU session," the PCF instead starts PDU-CAN session modification.

Step 5 aims to receive a PCC rule before selecting a UPF. If no PCC rule is needed as an input for UPF selection, step 5 may be skipped.

7. If the request type of step 3 indicates "initial request," the SMF selects an SSC mode for the PDU session. Unless step 5 is carried out, the SMF selects a UPF. In the case of PDU type IPv4 or IPv6, the SMF allocates an IP address/prefix for PDU session. In the case of unstructured PDU type, the SMF may allocate IPv6 prefix and N6 point-to-point tunneling (UDP/IPv6-based) for the PDU session.

8. Where a dynamic PCC is distributed and PDU-CAN session establishment is not complete yet, the SMF starts to establish a PDU-CAN session towards the PCF to obtain a default PCC rule for the PDU session. Otherwise, where the request type is "initial request," the dynamic PCC is distributed, and the PDU type is IPv4 or IPv6, the SMF starts PDU-CAN session modification and provides the allocated UE IP address/prefix to the PCF.

9. Where the request type indicates "initial request," and step 5 has not been performed, the SMF starts an N4 session establishment procedure with the selected UPF and, otherwise, starts an N4 session modification procedure with the selected UPF.

9a. The SMF sends an N4 session establishment/modification request to the UPF and provides packet detection, enforcement and reporting rule which are installed in the UPF for the PDU session. If the SMF allocates CN tunnel information, the CN tunnel information is provided to the UPF in this step.

9b. The UPF acknowledges receipt by sending an N4 session establishment/modification response. If CN tunnel information is allocated by the UPF, the CN tunnel information is provided to the SMF in this step.

10. From SMF to AMF: SM response (cause, N2 SM information (PDU session ID, QoS profile, CN tunnel information), N1 SM information (PDU session establishment authorization (approved QoS rule, SSC mode, S-NSSAI, allocated IPv4 address))).

The N2 SM information contains information that the AMF needs to transfer to the (R)AN and that includes the following.

The CN tunnel information contains the core network address of the N3 tunnel corresponding to the PDU session.

The QoS profile provides mapping between the QoS parameter and the QoS flow identifier to the (R)AN. Multiple QoS profiles may be provided to the (R)AN.

The PDU session ID may be used to indicate to the UE the association between the PDU session and the AN resource for the UE by AN signaling for the UE.

The N1 SM information includes a PDU session establishment authorization that the AMF needs to provide to the UE.

A plurality of authorized QoS rules may be contained in the PDU session establishment authorization in the N1 SM information and the N2 SM information.

The SM response includes information for determining which access is used for the target UE as well as the target UE, AMF and PDU session ID.

The access information deals with the cases where the UE is simultaneously accessed via 3GPP and non-3GPP access.

11. From AMF to (R)AN: N2 PDU session request (N2 SM information, NAS message (PDU session ID, PDU session establishment authorization)).

The AMF transmits, to the (R)AN, a NAS message containing a PDU session establishment authorization and PDU session ID towards the UE and N2 SM information received from the SMF in the N2 PDU session request.

12. From (R)AN to UE: The (R)AN may generate a specific signaling exchange with the UE which is related to information received from the SMF. For example, in the case of 3GPP RANs, an RRC connection reconfiguration may occur in which the UE establishes necessary RAN resources related to the QoS rule authorized for the PDU session request received in step 10.

The (R)AN allocates (R)AN N3 tunnel information to the PDU session.

The (R)AN forwards the NAS message (PDU session ID, N1 SM information (PDU session establishment authorization) provided in step 10 to the UE. The (R)AN should provide the NAS message to the UE only when a necessary RAN resource is established and allocation of (R)AN tunnel information is successful.

13. From (R)AN to AMF: N2 PDU session response (PDU session ID, cause, N2 SM information (PDU session ID, (R)AN tunnel information, allowed/rejected QoS profile list)).

The (R)AN tunnel information corresponds to the access network address of the N3 tunnel corresponding to the PDU session.

14. From AMF to SMF: SM request (N2 SM information).

The AMF transfers the N2 SM information received from the (R)AN to the SMF.

15a. Where an N4 session for the PDU session has not yet been established, the SMF, along with the UPF, starts an N4 session establishment procedure. Otherwise, the SMF starts an N4 session modification procedure using the UPF. The SMF provides AN tunnel information and CN tunnel information. The CN tunnel information is provided only when the SMF selects the CN tunnel information in step 8.

If the PDU session establishment request stems from mobility between 3GPP and non-3GPP access, the downlink data path is switched to the target access in this step.

15b. The UPF provides an N4 session establishment/modification response to the SMF.

16. From SMF to AMF: SM response (cause).

If this step ends, the AMF transfers a relevant event to the SMF. This occurs upon handover when the (R)AN tunnel information is modified or the AMF is relocated.

17. From SMF through UPF to UE: In the case of PDU type IPv6, the SMF creates an IPv6 route advertisement and sends the same to the UE via N4 and UPF.

18. If the PDU session establishment request is attributed to handover between 3GPP access and non-3GPP access, i.e., when the request type is set to "existing PDU session," the SMF performs a specific step to release the user plane through source access (3GPP or non-3GPP access).

An exact reference to the steps of the PDU session release procedure started by the network is defined when the procedure is available.

19. Where the SMF ID is not included in step 4b by the UDM of the DNN subscription context, the SMF invokes a "UF_Register UE NF" service including the SMF address and the DNN. The UDM stores the SMF ID, address, and relevant DNN.

If the PDU session establishment is unsuccessful during the procedure, the SMF notifies the AMF of the same. If the AMF associates the SMF to the PDU session ID, the SMF automatically subscribes to the notification of received (incoming) N1 signaling related to the PDU session ID. The notification automatically provides any user location information and access type that the AMF has received from the (R)AN in relation to N1 signaling.

MM/SM Separation

In a 5th generation system (5GS) core network, a network node (AMF) which manages mobility and a network node (SMF) which manages sessions have been separated as separate functions. Where in conventional EPC, the MME plays a major role in the control plane, entities/nodes are modularized and separated per major function in 5GC. In other words, the conventional MME may be said to have been separated into an AMF in charge of mobility management and an SMF in charge of session management in 5GS.

The SMF which manages each session is in charge of SM-related NAS layer messages and procedures, and the AMF is in charge of the overall mobility management (MM) including registration management (RM) and connection management (CM) for the UE itself. The roles of the AMF and SMF currently defined in TS 23.501 are as follows.

1. AMF

AMF has the following functions. All or some of the AMF functions may be supported in a single instance of the AMF:
   termination of RAN CP interface (N2)
   termination of NAS (N1), NAS cyphering and integrity protection
   Registration management
   Connectivity management
   Reachability management
   Mobility management
   Lawful intercept (for interfacing with AMF event and LI system)
   Transparent proxy for SM message routing
   Access authentication
   Access authorization
   Security anchor function (SEA): SEA interacts with AUSF and UE and, as a result of UE authentication procedure, receives an established intermediate key. In the case of USIM-based authentication, the AMF retrieves security material from the AUSF.
   Security context management (SCM): SCM receives a key used to extract an access-network specific key from SEA.

Regardless of the number of network functions, there may be only one NAS interface instance per access network between UE and CN and is terminated in one of the network functions implementing, at least, NAS security and mobility management.

In addition to the above-described AMF functions, the AMF may include the following functions to support the non-3GPP access network:
   Support of N2 interface with N3IWF. Partial information (e.g., 3GPP cell identification) defined via 3GPP access and procedure (e.g., related to handover) may not apply via this interface, and non-3GPP access specific information not applied to 3GPP access is applicable.
   Support of NAS signaling to UE via N3IWF. Some procedures supported by NAS signaling via 3GPP access may not be applied to non-3GPP (e.g., paging) access which is unreliable.
   Support of authentication of UE connected via N3IWF.
   Management of mobility and authentication/security context state(s) of UE connected via 3GPP and non-3GPP access or accessed via non-3GPP access.
   Support of valid, coordinated RM management context via 3GPP and non-3GPP access
   Support of dedicated CM management context for UE for connection via non-3GPP access.

All functions need not be supported in the instance of the network slice.

2. SMF

The SMF has the following functions. All or some of the SMF functions may be supported in a single instance of the SMF:
   Session management (e.g., session establishment including maintaining a tunnel between UPF and AN nodes, modification, and release)
   UE IP address allocation and management (including selective authorization).
   Selection and control of UP function.
   Configures traffic steering in UPF to route traffic to a proper target.
   Termination of interface for policy control function.
   Controls part of QoS and policy enforcement.
   Lawful intercept (for interfacing with SM event and LI system)
   SM part termination of NAS message.
   Downlink data notification.
   Initiator of AN-specific SM information transmitted via AMF and N2 to AN.
   SSC mode determination of session (in the case of IP type PDU session)
   Roaming function:
   Handles local enforcement (VPLMN) for applying QoS SLA.
   Charging data gathering and charging interface (VPLMN).
   Lawful intercept (for interfacing with SM event and LI system in VPLMN)
   Supports interaction with external DN for transfer of signaling for PDU session authentication/authorization by external DN.

All functions need not be supported in the instance of the network slice.

Initiating an SM procedure requires a CM-connected state, i.e., a state in which secure signaling connection has been established between the UE and the CN, like in the conventional art. The SM NAS message needs to pass through the AMF. At this time, the SM NAS message is transparent to the AMF. In other words, the AMF is unable to interpret or recognize the content of the SM NAS message passing through the AMF. Thus, where there are several SMFs, the AMF needs to receive a separate indication as to which SMF the NAS message needs to be forwarded/routed. To that end, separate information for forwarding/routing may be added to the outside of the SM NAS message.

If a PDU session has already been created, the PDU session ID of the PDU session may be displayed in the portion where the AMF is interpretable (in particular, outside of the SM NAS message), and the AMF may discover/recognize the SMF for forwarding/routing of the message based on the same. At this time, a mapping table scheme may be used, for example. If no PDU session is created, the AMF may perform an SMF selection function considering information, such as DNN and S-NSSAI, to select a proper SMF. The information for the AMF to select a proper SMF may be displayed in the portion where the AMF is interpretable/recognizable and provided to the AMF.

Interaction Between AMF and SMF

N1-related interactions are as follows:
One N1 NAS connection is used for each UE access connection.
The single N1 NAS connection is used for registration management and connectivity management (RM/CM) and UE-related SM-related messages and procedures. A single N1 termination point is in the AMF. The AMF transfers SM-related NAS information to the SMF. Further, N1 SM NAS exchanges (e.g., SM NAS message responses) for NAS signaling received by the AMF via access (e.g., 3GPP access or non-3GPP access) are transmitted via the same access.
Where the UE is served by the single AMF while the UE is in linkage via multiple (3GPP/non-3GPP) access connections, there are N1 NAS connections per access. In this case, the serving PLMN may allow for transmission, via the same access, of more SM NAS exchanges (e.g., SM NAS message responses) for the N1 NAS signals received by the AMF via access (e.g., 3GPP access or non-3GPP access).
AMF handles the registration management and connectivity management parts of NAS signaling exchanged with UE. SMF handles the session management part of NAS signaling exchanged with UE.
As the RM/CM NAS message, SM NAS message, and the corresponding procedure are separated, it may easily be figured out whether one NAS message is routed to the SMF in the NAS routing function inside the AMF or is required to be locally processed in the AMF. This may transmit the SM NAS message along with the RM/CM NAS message.
AMF needs to postpone the SM procedures among the registration procedures until the AMF determines whether to authorize the registration request.
AMF may determine whether to authorize the RM/CM parts of the NAS request without recognizing the connected SM part of the same NAS signal content.
If an SMF is selected to provide a specific PDU session, the AMF needs to ensure that all NAS signaling related to the PDU session is handled by the same SMF instance.
The AMF reports reachability of the UE based on the subscription information from the SMF (e.g., for the UE location for LADN availability area).
SMF notifies the AMF when the PDU session is released.
When a PDU session is successfully established, the AMF stores the identifier of the serving SMF of the UE, and the SMF stores the identifier of the serving AMF of the UE.

N2-related interactions are as follows:
N2 signaling related to the UE is terminated in the AMF. In other words, there is a unique N2 termination for the given UE regardless of the number of PDU sessions of the UE (which may be zero).
Some N2 signaling may require operations of the AMF and the SMF. In this case, the AMF is responsible for guaranteeing coordination between the AMF and the SMF.

N3-related interactions are as follows:
Where the UE has multiple established PDU sessions using multiple UPFs, the SMF supports independent activation of UE-CN user plane connection per PDU session.

N4-related interactions are as follows:
SMF supports inter-termination control function for PDU session (including an N4 interface for controlling UPF).
If the UPF recognizes what DL data has arrived for the UE without downlink N3 tunnel information, the SMF triggers activation of the user plane resources for the PDU session as long as it does not recognize that DL data notification need not be transmitted to the AMF and the UE is unreachable. If the UE is in the CM-IDLE state but not in the MICO mode, the AMF may trigger UE paging from the AN (depending on the type of AN). If the UE is in the MICO mode, the AMF may notify the SMF that the UE is unreachable and DL data notification need not be transmitted to the AMF.

RM and SM Procedure Handling

Problem 1.

In the legacy EPS, at least one PDN connection needs to be configured/established when the UE performs a procedure for attaching to the network under the presumption of always on IP connectivity. To that end, upon starting an attach procedure, the UE piggybacks a PDN connection request message in the attach request message and transmits the same, and the network, when the PDN connection procedure fails, determines that the attach procedure fails and sends an attach rejection to the UE. At this time, the network may indicate (e.g., #19 ESM failure) that the rejection is attributed to an SM layer issue, rather than MM layer issue, for the reject cause, along with the PDN connection reject message.

One exception is EMM-REGISTERED with PDN connection or attach without PDN connection as a feature of the CIoT. If a PDN connection-free IoT UE (e.g., a UE using only SMS) has PDN connection-free attach capability, no PDN connection may be requested in the attach procedure. If the network also has the capability and the UE is allowed to use the feature/capability, the network may also allow attaching without creating a PDN connection.

Also in 5G, decoupling between the MM or RM process and the SM process is under discussion. Basically, there is no need for piggybacking a PDU session establishment request message on an initial registration message corresponding to the conventional attaching as does the policy of EPS PDN connection-free attaching but, depending on whether to allow piggybacking, the subsequent operation may be varied. Although piggybacking is allowed, whether the piggybacked SM procedure/message is authorized/succeeds and whether the RM procedure/message is authorized/succeeds may be coupled or decoupled.

If a UE for which IP connection is a must (e.g., a smartphone) has performed a registration procedure to attach to the 5G system, but the RM and SM procedures are decoupled from each other, the SM request (PDU session establishment request) may fail or be unauthorized despite success/authorization of the registration procedure.

In this case, the UE may receive no service but is in the state of having been registered in the network. In this case, a UE, particularly a smartphone which essentially needs IP connection, may be subjected to the disabled state in which it simply consumes battery.

Problem 2.

The UE sends a request for requested NSSAI via a registration procedure to receive a network slice service, and the network provides the UE with the allowed NSSAI. If the UE sends a request for a necessary service, but the network is unable to support the service or is not allowed for the UE, the UE is unable to receive the requested service. In this case, the UE is subjected to the state in which, although registered, it is unable to receive the necessary service.

Problem 3.

The UE may attempt to discover a new PLMN to re-request the service rejected due to problem 1 or 2. If creation and registration of a PDU session are decoupled, the RM state may be RM-REGISTERED but it may fail to receive a necessary PDU session or necessary network slice in which case the UE may be subjected to the state in which it may receive no service. Further, the UE is subjected to a PLMN retrieval sub-state of RM-REGISTERED since it is already in the RM-REGISTERED state. However, in such a case, if the geographical area is not significantly changed although the UE retrieves again a PLMN, the PLMN where the UE is currently camping is highly likely to be the highest-priority PLMN.

Thus, methods for addressing the foregoing problems 1 to 3 are proposed in the disclosure.

1. Disclosure 1

Depending on use features/capability, the UE may essentially need a PDU session (e.g., when the UE is a smartphone), is not essentially required to have a PDU session despite its capability of using, or has no need for a PDU session (e.g., a massive IoT (mIoT) UE). Depending on the UE's features, the features of correlation between the registration procedure and PDU session establishment may differ.

Basically, when a UE attempting registration in 5GS starts a registration procedure, it is optional whether to piggyback a PDU session establishment request message. However, if needed by the UE, a PDU session establishment request message may be piggybacked and sent out. At this time, if a PDU session is inevitably required, the UE may include an indicating that generation of a PDU session is inevitable, such as "PDU session required" or "always-on PDU connectivity required," in, e.g., a specific field/IE of a specific message transmitted to the network in the registration procedure. For ease of description, such indication is referred to below as a 'PDU required info/indication/flag.' The PDU required info/indication/flag may be included and transmitted in a field/IE, such as request type, UE network capability, or SM payload type, in the registration request message or may be included and transmitted in a field/IE separately defined for the PDU required info/indication/flag.

When requested for registration, the network may perform a system registration procedure before processing the piggybacked SM request (conventionally, the requests for SM and RM/MM are simultaneously processed because the MME simultaneously manages/handles SM and MM). If the UE RM state in the AMF becomes RM-REGISTERED, the AMF may forward the SM request (PDU session establishment request) received from the UE to the SMF.

Where the registration request message contains the PDU required info/indication/flag, the network (particularly, the SMF) may optionally consider the same upon generating a PDU session for the UE. At this time, rather than immediately sending a response to the registration request, the AMF may wait until it receives a result of the PDU session establishment procedure (e.g., request message pending).

If the PDU session establishment procedure fails despite reception of the PDU required info/indication/flag, the SMF may transmit a PDU session establishment reject message to the AMF. At this time, the SMF indicates that the SM procedure failed via an N11 layer message. If the SM reject is attributed to, e.g., erroneous forwarding by the AMF, which may be addressed by updating the AMF's information, or if necessary for other reasons, the reject cause may be transferred to the AMF. In this case, the AMF regards this as failure in registration and may piggyback/include the reject cause in a registration reject message and transfer the same to the UE. At this time, the (reject) cause value of the registration reject message may be set to specify failure in PDU session creation, such as SM request failure.

In contrast, if PDU session establishment succeeds, the SMF transfers a PDU session establishment authorization message to the AMF. The AMF piggybacks/includes the same in a registration authorization message and transfers the same to the UE.

If the registration request message lacks the PDU required info/indication/flag or contains an info/indication/flag indicating that a PDU session is not required, the AMF may immediately transmit a registration authorization without waiting for a PDU session establishment procedure response (as long as registration is authorized). In this case, the network may maintain NAS signaling connection or N1 connection until an SM response comes in, but rather than immediately turning to the CM-IDLE state. Or, the AMF waits for a response for the PDU session establishment procedure and includes/piggybacks the response in a registration authorization message and transfers the same to the UE.

Although the PDU session establishment procedure fails, the network (AMF) may authorize the registration procedure in which case it may piggyback/include a PDU session establishment reject message in the registration authorization message and send the same.

In whatever case where the RM-related procedure fails regardless of session, the AMF may immediately return the registration reject to the UE rather than transferring the SM message to the SMF.

2. Disclosure 2-PLMN Re-Selection Due to the Service Unavailability

The UE may be subjected to the state in which a request for a slice for a PDU session or specific service has been sent but is rejected and, thus, the UE is in the RM-REGISTERED state but may not receive any service.

2-1) The UE may create/store/manage a list (hereinafter, denoted as a 'new list') that is excluded from candidates considerable upon PLMN selection, such as a "PLMN selection exemption list" or "service unavailable PLMN list." If all of the services requested by the UE are rejected via the registration procedure, the UE may add current PLMN and/or RAT information to the new list. At this time, the UE may store a service descriptor regarding the rejected service in the PLMN and/or RAT combination (e.g., DNN or S-NSSAI related to the rejected service). The UE may perform PLMN selection except for the PLMNs included in the 'new list' from the candidate PLMN list to be considered for PLMN selection. If a new PLMN is selected, the UE camps on the new PLMN. At this time, an explicit deregistration may be sent for the prior PLMN or implicit deregistration may proceed via UDM location update.

2-2) If the service requested by the UE is not allowed only for a predetermined time, the network may provide retry restriction timer information along with reject information to the UE. At this time, the retry restriction timer information may be indicated as an explicit timer value or as a specific range of descriptor.

The UE may not receive a desired service for a predetermined time and, where the retry restriction timer information is indicated, the UE may discover a new PLMN as in 2-1). However, in this case, the retry restriction timer information may be stored in the 'new list' suggested in 2-1). This may be implemented as an actual timer value or in the form of a timestamp according to embodiments of timer.

If the timer for the PLMN in the new list expires or the time marked in the timestamp elapses, the UE may delete the PLMN from the new list.

Although served via the new PLMN, the UE may periodically retrieve the home PLMN or higher-priority PLMN. After the PLMN which could not be served before is deleted out of the new list, reselection is possible since the PLMN is a higher-priority PLMN upon periodic PLMN retrieval.

2-3) The UE manages the PLMN selector with access technology and, by so doing, manages the priority of PLMNs except for the HPLMN and EPLMN. If the network rejects all of the services requested by the UE, the UE may update the current PLMN to have the lowest priority on the user control PLMN selector with access technology. If the current PLMN is the HPLMN or EHPLMN, the instant embodiment does not apply.

FIG. 19 is a flowchart illustrating a UE's registration procedure according to an embodiment of the disclosure. In relation to the flowchart, the above-described embodiments may apply in the same or similar manner, and no duplicate description is given. Further, at least one step may be deleted from, or a new step may be added to, the flowchart.

First, the AMF may receive a registration request message for requesting to register a UE from the UE (S1910). At this time, the registration request message may include an SM message to request to establish a PDU session for the UE and an indicator to indicate whether PDU session establishment is required. At this time, the indicator may indicate whether the requested PDU session establishment is required in a unified manner or per PDU session. Further, the indicator may be included in the request type field, user equipment (UE) network capability field, or session management (SM) payload type field in the registration request message.

Next, the AMF may transmit a registration response message to the registration request message to the UE (S1920).

Although not shown in the flowchart, the AMF may determine whether to transfer an SM message to the SMF based on a switch in the UE's RM state according to the registration request message. Specifically, where the UE's RM state switches from RM-DEREGISTERED to RM-REGISTERED by the registration request message, the AMF may transfer the SM message to the SMF. In contrast, where the UE's RM state remains RM-DEREGISTERED by the registration request message, the AMF, rather than transferring the SM message to the SMF, may transmit a registration reject message, as the registration response message, to the UE.

Where the SM message is transferred to the SMF, if the indicator indicates that PDU session establishment is required, the AMF may transmit the registration response message after receiving the SM response message to the SM message. In contrast, where the indicator indicates that PDU session establishment is not required, the AMF may transmit the registration response message regardless of whether the SM response message is received. Here, the SM response message may be configured to include information as to whether the request for PDU session establishment is authorized and/or, when the request for PDU session establishment is rejected, information about the cause for rejection.

Where the indicator indicates that PDU session establishment is required, the type of the registration response message may be determined based on the SM response message. Specifically, where the SM response message indicates authorization of PDU session establishment, the type of registration response message may be determined to be a registration accept message and, if the SM response message indicates rejection of PDU session establishment, the type of the registration response message may be determined to be a registration reject message.

Devices to which the Disclosure May Apply

FIG. 20 is a block diagram illustrating a configuration of a communication device according to an embodiment of the disclosure.

Referring to FIG. 20, a wireless communication system includes a network node 2010 and multiple UEs 2020.

The network node 2010 includes a processor 2011, a memory 2012, and a communication module 2013. The processor 2011 implements the functions, processes, and/or methods proposed above. Wired/wireless interface protocol layers may be implemented by the processor 2011. The memory 2012 is connected with the processor 2011 to store various pieces of information for driving the processor 2011. The communication module 2013 is connected with the processor 2011 to transmit and/or receive wireless signals. The network node 2010 may correspond to, e.g., a base station, MME, HSS, SGW, PGW, or application server. In particular, where the network node 2010 is a base station, the communication module 2013 may include a radio frequency (RF) unit for transmitting/receiving wireless signals.

The UE 2020 includes a processor 2021, a memory 2022, and a communication module (or RF unit) 2023. The processor 2021 implements the functions, processes, and/or methods proposed above. Wireless interface protocol layers may be implemented by the processor 2021. The memory 2022 is connected with the processor 2021 to store various pieces of information for driving the processor 2021. The communication module 2023 is connected with the processor 2021 to transmit and/or receive wireless signals.

The memory 2012 and 2022 may be positioned inside or outside the processor 2011 and 2021 and be connected with the processor 2011 and 2021 via various known means. The network node 2010 (e.g., a base station) and/or the UE 2020 may have a single antenna or multiple antennas.

FIG. 21 is a block diagram illustrating a configuration of a communication device according to an embodiment of the disclosure.

In particular, FIG. 21 illustrates in greater detail the UE of FIG. 20.

Referring to FIG. 21, the UE may include a processor (or a digital signal processor (DSP)) 2110, an RF module (or RF unit) 2135, a power management module 2105, an antenna 2140, a battery 2155, a display 2115, a keypad 2120, a memory 2130, a subscriber identification module (SIM) card 2125 (which is optional), a speaker 2145, and a microphone 2150. The UE may include a single or multiple antennas.

The processor 2110 implements the functions, processes, and/or methods proposed above. Wireless interface protocol layers may be implemented by the processor 2110.

The memory 2130 is connected with the processor 2110 to store information related to the operation of the processor 2110. The memory 2130 may be positioned inside or outside the processor 2110 and be connected with the processor 2110 via various known means.

For example, the user inputs instruction information, e.g., a phone number, by voice activation using the microphone 2150 or by pressing (or touching) a button of the keypad 2120. The processor 2110 receives the instruction information and handles performing a proper function, e.g., calling at the phone number. Operational data may be extracted from the SIM card 2125 or the memory 2130. Further, the processor 2110 may display the instruction information or operational information on the display 2115 for convenience or user's recognition.

The RF module 2135 is connected with the processor 2110 to transmit and/or receive RF signals. The processor 2110 transfers instruction information to the RF module 2135 to initiate communication, e.g., to transmit a wireless signal constituting voice communication data. The RF module 2135 includes a receiver and a transmitter for receiving and transmitting wireless signals. The antenna 2140 functions to transmit and receive wireless signals. Upon receiving a wireless signal, the RF module 2135 transfers the signal for processing by the processor 2110 and convert the signal into a base-band signal. The processed signal may be converted into readable or audible information output via the speaker 2145.

The above-described embodiments regard predetermined combinations of the components and features of the disclosure. Each component or feature should be considered as optional unless explicitly mentioned otherwise. Each component or feature may be practiced in such a manner as not to be combined with other components or features. Further, some components and/or features may be combined together to configure an embodiment of the disclosure. The order of the operations described in connection with the embodiments of the disclosure may be varied. Some components or features in an embodiment may be included in another embodiment or may be replaced with corresponding components or features of the other embodiment. It is obvious that the claims may be combined to constitute an embodiment unless explicitly stated otherwise or such combinations may be added in new claims by an amendment after filing.

The embodiments of the disclosure may be implemented by various means, e.g., hardware, firmware, software, or a combination thereof. When implemented in hardware, an embodiment of the disclosure may be implemented with, e.g., one or more application specific integrated circuits (ASICs), digital signal processors (DSPs), digital signal processing devices (DSPDs), programmable logic devices (PLDs), field programmable gate arrays (FPGAs), processors, controllers, micro-controllers, or micro-processors.

When implemented in firmware or hardware, an embodiment of the disclosure may be implemented as a module, procedure, or function performing the above-described functions or operations. The software code may be stored in a memory and driven by a processor. The memory may be positioned inside or outside the processor to exchange data with the processor by various known means.

In the disclosure, the phrase "A and/or B" may mean at least one of A and/or B.

It is apparent to one of ordinary skill in the art that the disclosure may be embodied in other specific forms without departing from the essential features of the disclosure. Thus, the above description should be interpreted not as limiting in all aspects but as exemplary. The scope of the disclosure should be determined by reasonable interpretations of the appended claims and all equivalents of the disclosure belong to the scope of the disclosure.

INDUSTRIAL AVAILABILITY

Although the disclosure has been shown and described in connection with examples applied to 3GPP LTE/LTE-A/NR (5G) systems, the disclosure may also be applicable to other various wireless communication systems than 3GPP LTE/LTE-A/NR (5G) systems.

The invention claimed is:

1. A method of registration of a UE by an access and mobility management function (AMF) in a wireless communication system, the method comprising:
   receiving a registration request message for requesting to register the UE from the UE;
   transmitting a registration response message responsive to the registration request message to the UE,
   wherein the registration request message includes a session management (SM) message for requesting to establish a packet data unit (PDU) session for the UE and an indicator indicating whether the PDU session establishment is required, and
   determining whether to transfer the SM message to a session management function (SMF) based on a switch of a registration management (RM) state of the UE according to the registration request message,
   wherein determining whether to transfer the SM message is transferring the SM message to the SWF when the RM state of the UE switches from RM-DEREGISTERED to RM-REGISTERED according to the registration request message and transferring a registration reject message, as the registration response message, rather than transferring the SM message to the SMF when the RM state of the UE remains RM-DEREGISTERED according to the registration request message, and
   wherein when the SM message is transferred to the SMF, transmitting the registration response message is performed after an SM response message responsive to the SM message is received when the indicator indicates that the PDU session establishment is required and is performed regardless of whether the SM response message is received when the indicator indicates that the PDU session establishment is not required.

2. The method of claim 1, wherein
   the SM response message includes information as to whether the PDU session establishment request is authorized and/or, when the PDU session establishment request is rejected, information regarding a cause for the rejection.

3. The method of claim 2, wherein
   when the indicator indicates that the PDU session establishment is required, a type of the registration response message is determined based on the SM response message.

4. The method of claim 3, wherein
   when the SM response message indicates authorization of the PDU session establishment, the type of the registration response message is determined to be a registration accept message and, when the SM response message indicates rejection of the PDU session establishment, the type of the registration response message is determined to be a registration reject message.

5. The method of claim 4, wherein
the indicator is included in a request type field, user equipment (UE) network capability field, or session management (SM) payload type field in the registration request message.

6. An access and mobility management function (AMF) performing a UE registration method in a wireless communication system, the AMF comprising:
a transceiver for transmitting or receiving a signal; and
a processor controlling the transceiver, wherein
the processor receives a registration request message for requesting to register a UE from the UE and transmits a registration response message responsive to the registration request message to the UE, and wherein
the registration request message includes a session management (SM) message for requesting to establish a packet data unit (PDU) session for the UE and an indicator indicating whether the PDU session establishment is required,
wherein the processor determines whether to transfer the SM message to a session management function (SMF) based on a switch of a registration management (RM) state of the UE according to the registration request message,
wherein the processor, upon determining whether to transfer the SM message, transfers the SM message to the SMF when the RM state of the UE switches from RM-DEREGISTERED to RM-REGISTERED according to the registration request message and transfers a registration reject message, as the registration response message, rather than transferring the SM message to the SMF when the RM state of the UE remains RM-DEREGISTERED according to the registration request message, and
wherein when the SM message is transferred to the SMF, the processor transmits the registration response message after an SM response message responsive to the SM message is received when the indicator indicates that the PDU session establishment is required and transmits the registration response message regardless of whether the SM response message is received when the indicator indicates that the PDU session establishment is not required.

7. The AMF of claim 6, wherein
the SM response message includes information as to whether the PDU session establishment request is authorized and/or, when the PDU session establishment request is rejected, information regarding a cause for the rejection.

8. The AMF of claim 7, wherein
when the indicator indicates that the PDU session establishment is required, a type of the registration response message is determined based on the SM response message.

9. The AMF of claim 8, wherein
when the SM response message indicates authorization of the PDU session establishment, the type of the registration response message is determined to be a registration accept message and, when the SM response message indicates rejection of the PDU session establishment, the type of the registration response message is determined to be a registration reject message.

* * * * *